US009433870B2

(12) United States Patent
Blum et al.

(10) Patent No.: US 9,433,870 B2
(45) Date of Patent: Sep. 6, 2016

(54) RIDE VEHICLE TRACKING AND CONTROL SYSTEM USING PASSIVE TRACKING ELEMENTS

(71) Applicant: Universal City Studios LLC, Universal City, CA (US)

(72) Inventors: Steven C. Blum, Orlando, FL (US); Christopher Oliver, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 14/717,701

(22) Filed: May 20, 2015

(65) Prior Publication Data

US 2015/0336015 A1  Nov. 26, 2015

Related U.S. Application Data

(60) Provisional application No. 62/001,551, filed on May 21, 2014.

(51) Int. Cl.
| A63G 31/16 | (2006.01) |
| G06K 9/00 | (2006.01) |
| A63G 33/00 | (2006.01) |
| G01J 1/02 | (2006.01) |
| G06K 9/32 | (2006.01) |

(52) U.S. Cl.
CPC ............. *A63G 33/00* (2013.01); *G01J 1/0266* (2013.01); *G01J 1/0295* (2013.01); *G06K 9/00785* (2013.01); *G06K 9/3216* (2013.01)

(58) Field of Classification Search
CPC ........ A63G 31/00; A63G 31/16; H04N 5/00; H04N 5/22; G06K 9/00; G06K 9/46
USPC ........................ 472/59–61, 130, 43; 348/370
See application file for complete search history.

(56) References Cited

U.S. PATENT DOCUMENTS

| 2,170,160 A | 8/1939 | Bailey |
| 3,743,217 A | 7/1973 | Turck |
| 4,254,433 A | 3/1981 | Dewar, Jr. et al. |
| 4,662,756 A | 5/1987 | Duran, Jr. |
| 4,855,915 A | 8/1989 | Dallaire |
| 5,682,331 A | 10/1997 | Berlin |

(Continued)

FOREIGN PATENT DOCUMENTS

| CN | 201189396 | 2/2009 |
| EP | 1578130 | 9/2005 |
| JP | 2012120648 | 6/2012 |

OTHER PUBLICATIONS

Ouchi et al., "Magic Wand: An Intuitive Gesture Remote Control for Home Appliances," May 2005.

(Continued)

*Primary Examiner* — Kien Nguyen
(74) *Attorney, Agent, or Firm* — Fletcher Yoder, P.C.

(57) ABSTRACT

A dynamic signal to noise ratio tracking system enables detection and tracking of ride vehicles within the field of view of the tracking system. The tracking system may include an emitter configured to emit electromagnetic radiation within an area, a detector configured to detect electromagnetic radiation reflected back from within the area, and a control unit configured to evaluate signals from the detector and control the ride vehicles or other equipment as a result of this evaluation.

19 Claims, 23 Drawing Sheets

(56) References Cited

U.S. PATENT DOCUMENTS

| | | |
|---|---|---|
| 5,809,161 A | 9/1998 | Auty et al. |
| 6,008,800 A | 12/1999 | Pryor |
| 6,176,837 B1 | 1/2001 | Foxlin |
| 6,474,159 B1 | 11/2002 | Foxlin et al. |
| 6,665,079 B1 | 12/2003 | Tocci et al. |
| 6,720,949 B1 | 4/2004 | Pryor et al. |
| 6,761,637 B2 | 7/2004 | Weston et al. |
| 6,784,826 B2 | 8/2004 | Kane et al. |
| 6,831,603 B2 | 12/2004 | Menache |
| 6,967,566 B2 | 11/2005 | Weston et al. |
| 7,084,859 B1 | 8/2006 | Pryor |
| 7,089,148 B1 | 8/2006 | Bachmann et al. |
| 7,098,891 B1 | 8/2006 | Pryor |
| 7,184,022 B2 | 2/2007 | Xie et al. |
| 7,257,237 B1 | 8/2007 | Luck et al. |
| 7,307,617 B2 | 12/2007 | Wilson et al. |
| 7,356,172 B2 | 4/2008 | Fan et al. |
| 7,395,181 B2 | 7/2008 | Foxlin |
| 7,401,783 B2 | 7/2008 | Pryor |
| 7,445,550 B2 | 11/2008 | Barney et al. |
| 7,466,843 B2 | 12/2008 | Pryor |
| 7,489,303 B1 | 2/2009 | Pryor |
| 7,500,917 B2 | 3/2009 | Barney et al. |
| 7,502,126 B2 | 3/2009 | Ong |
| 7,505,033 B2 | 3/2009 | Guo et al. |
| 7,519,537 B2 | 4/2009 | Rosenberg |
| 7,618,323 B2 | 11/2009 | Rothschild et al. |
| 7,623,115 B2 | 11/2009 | Marks |
| 7,671,851 B1 | 3/2010 | Pryor |
| 7,704,135 B2 | 4/2010 | Harrison, Jr. |
| 7,755,608 B2 | 7/2010 | Chang et al. |
| 7,775,439 B2 | 8/2010 | Kimber et al. |
| 7,843,429 B2 | 11/2010 | Pryor |
| 7,850,527 B2 | 12/2010 | Barney et al. |
| 7,854,655 B2 | 12/2010 | Mao et al. |
| 7,863,551 B2 | 1/2011 | Bang et al. |
| 7,874,918 B2 | 1/2011 | Osnato et al. |
| 7,896,742 B2 | 3/2011 | Weston et al. |
| 7,905,769 B1 | 3/2011 | Harrison, Jr. |
| 7,918,733 B2 | 4/2011 | Zalewski et al. |
| 7,927,216 B2 | 4/2011 | Ikeda et al. |
| 7,996,793 B2 | 8/2011 | Latta et al. |
| 8,040,328 B2 | 10/2011 | Smith et al. |
| 8,058,975 B2 | 11/2011 | Barnardo et al. |
| 8,209,134 B2 | 6/2012 | Parker et al. |
| 8,228,305 B2 | 7/2012 | Pryor |
| 8,248,367 B1 | 8/2012 | Barney et al. |
| 8,287,374 B2 | 10/2012 | Pryor |
| 8,306,635 B2 | 11/2012 | Pryor |
| 8,538,562 B2 | 9/2013 | Pryor et al. |
| 8,553,079 B2 | 10/2013 | Pryor |
| 2003/0048926 A1 | 3/2003 | Watanabe |
| 2003/0069077 A1 | 4/2003 | Koreienek et al. |
| 2004/0102247 A1 | 5/2004 | Smoot et al. |
| 2004/0166937 A1 | 8/2004 | Kopera et al. |
| 2004/0178955 A1 | 9/2004 | Menache et al. |
| 2005/0143173 A1 | 6/2005 | Barney et al. |
| 2006/0030385 A1 | 2/2006 | Barney et al. |
| 2006/0125691 A1 | 6/2006 | Menache et al. |
| 2006/0154726 A1 | 7/2006 | Weston et al. |
| 2006/0256081 A1 | 11/2006 | Zalewski et al. |
| 2006/0282873 A1 | 12/2006 | Zalewski et al. |
| 2006/0287087 A1 | 12/2006 | Zalewski et al. |
| 2007/0259594 A1 | 11/2007 | Galbiati et al. |
| 2007/0265075 A1 | 11/2007 | Zalewski |
| 2008/0013826 A1 | 1/2008 | Hillis et al. |
| 2008/0014835 A1 | 1/2008 | Weston et al. |
| 2008/0096654 A1 | 4/2008 | Mondesir et al. |
| 2008/0244468 A1 | 10/2008 | Nishihara et al. |
| 2009/0051653 A1 | 2/2009 | Barney et al. |
| 2009/0066784 A1 | 3/2009 | Stone et al. |
| 2009/0115721 A1 | 5/2009 | Aull et al. |
| 2009/0121894 A1 | 5/2009 | Wilson et al. |
| 2009/0124165 A1 | 5/2009 | Weston |
| 2009/0191968 A1 | 7/2009 | Johnson et al. |
| 2009/0215534 A1 | 8/2009 | Wilson et al. |
| 2009/0222149 A1 | 9/2009 | Murray et al. |
| 2009/0278915 A1 | 11/2009 | Kramer et al. |
| 2009/0316952 A1 | 12/2009 | Ferren et al. |
| 2010/0040292 A1 | 2/2010 | Clarkson |
| 2010/0050133 A1 | 2/2010 | Nishihara et al. |
| 2010/0134308 A1 | 6/2010 | Barnardo et al. |
| 2010/0192007 A1 | 7/2010 | Tarra et al. |
| 2010/0194762 A1 | 8/2010 | Latta et al. |
| 2010/0199228 A1 | 8/2010 | Latta et al. |
| 2010/0199230 A1 | 8/2010 | Latta et al. |
| 2010/0208129 A1 | 8/2010 | Rindfuss et al. |
| 2010/0281436 A1 | 11/2010 | Kipman et al. |
| 2010/0304868 A1 | 12/2010 | Zalewski |
| 2010/0306712 A1 | 12/2010 | Snook et al. |
| 2010/0306714 A1 | 12/2010 | Latta et al. |
| 2010/0306715 A1 | 12/2010 | Geisner et al. |
| 2010/0306716 A1 | 12/2010 | Perez |
| 2011/0081970 A1 | 4/2011 | Barney et al. |
| 2011/0118021 A1 | 5/2011 | Zalewski |
| 2011/0151974 A1 | 6/2011 | Deaguero |
| 2011/0174189 A1 | 7/2011 | Beutler |
| 2011/0183751 A1 | 7/2011 | Ueshima |
| 2012/0262366 A1 | 10/2012 | Zhu et al. |
| 2013/0177296 A1 | 7/2013 | Geisner et al. |
| 2013/0188839 A1 | 7/2013 | Abraham et al. |
| 2014/0036076 A1 | 2/2014 | Nerayoff et al. |
| 2014/0240102 A1 | 8/2014 | Kawash et al. |
| 2014/0314278 A1 | 10/2014 | Tatsuzawa et al. |

OTHER PUBLICATIONS

Retroreflection. Personal Safety Products; 3M Occupational health and Environmental Safety Division; 2005. www.3M.com/Scotchlite.

Chen, X.; "Capturing Fast Motion with Consumer Grade Unsynchronized Rolling-Shutter Cameras"; The University of British Columbia 2012, pp. 1-85.

Chung, J. et al.; "Vision Based Motion Tracking System for Interactive Entertainment Applications"; ETRI 2005, pp. 1-6.

Hargather, M. et al.; "Retroreflective Shadowgraph Technique for Large-Scale Flow Visualization"; Applied Optics vol. 48(22) 2009, pp. 4449-4457.

Sparacino, F. et al.; "Media in Performance: Interactive Spaces for Dance, Theater, Circus, and Museum Exhibits"; IBM Systems Journal vol. 39 (3&4) 2000, pp. 479-510.

PCT/US2015/032031 International Search Report and Written Opinion dated Sep. 8, 2015.

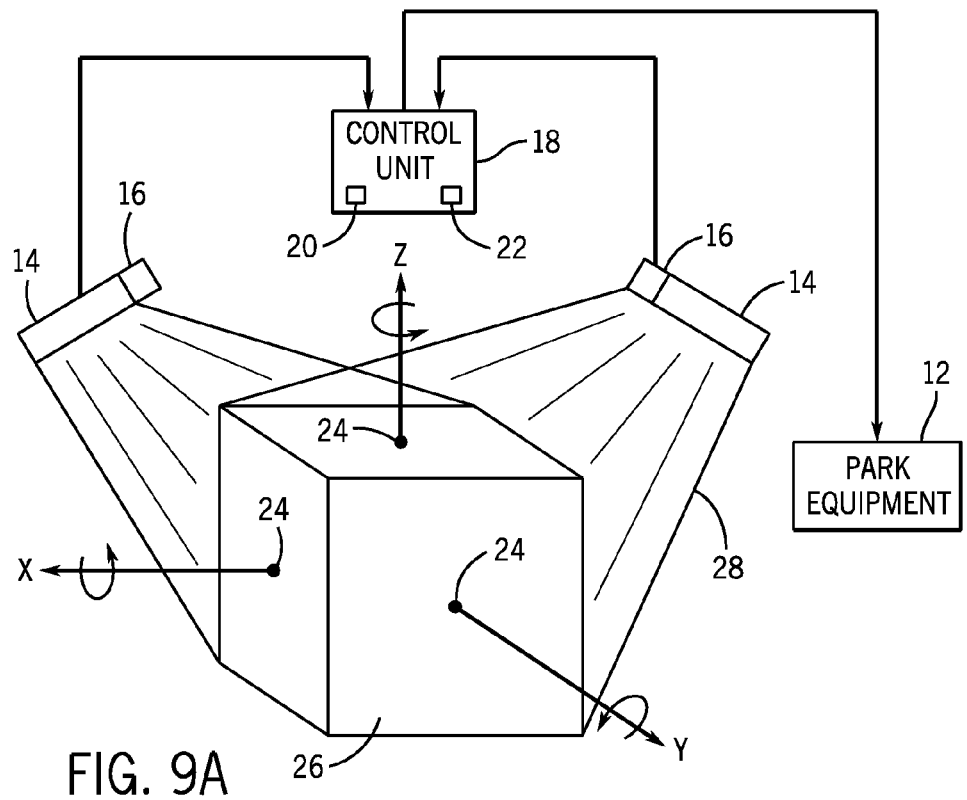
FIG. 9A
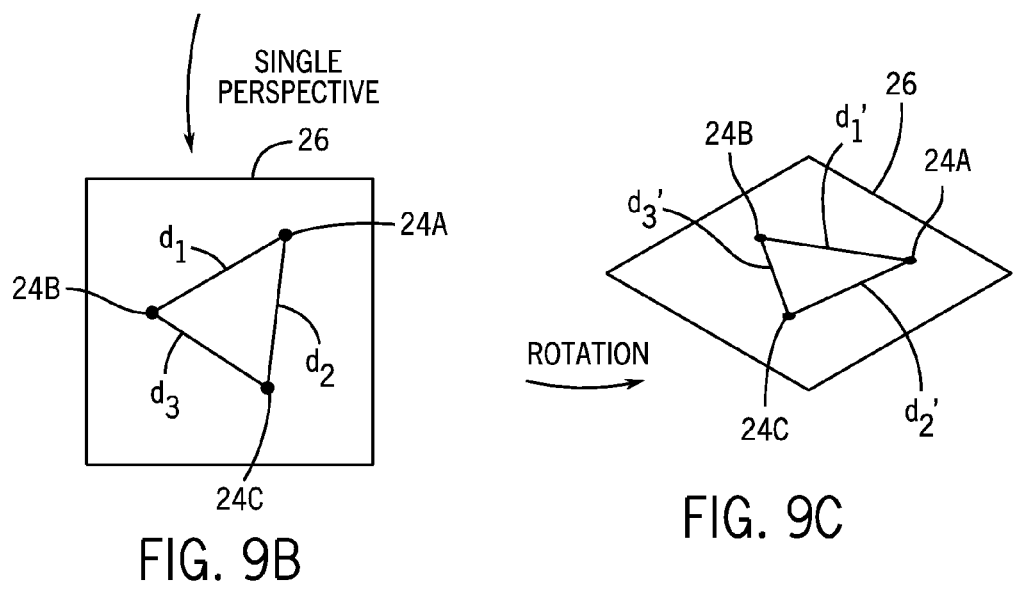
FIG. 9B
FIG. 9C

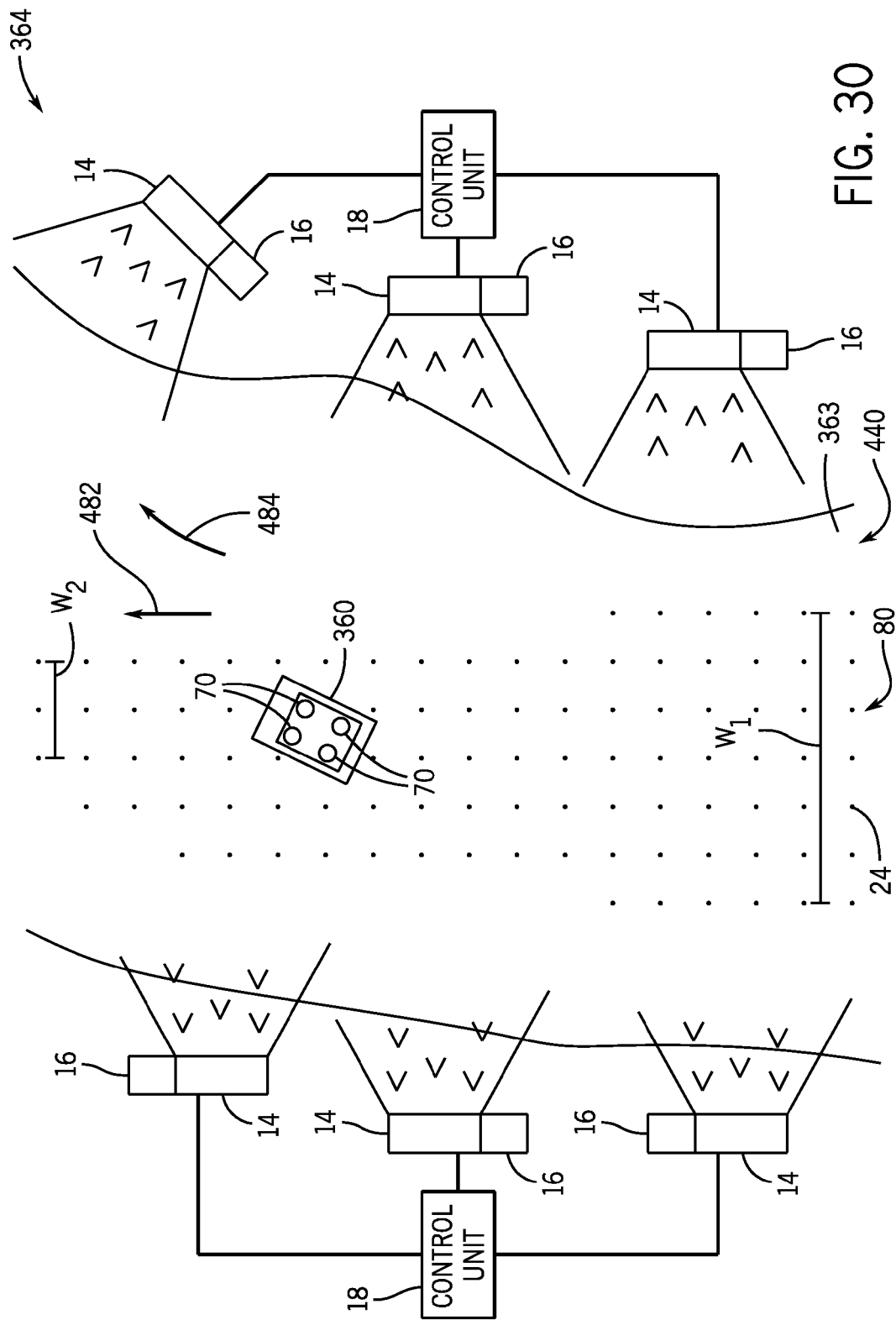

RIDE VEHICLE TRACKING AND CONTROL SYSTEM USING PASSIVE TRACKING ELEMENTS

CROSS REFERENCE TO RELATED APPLICATIONS

This application claims the benefit of U.S. Provisional Application No. 62/001,551, filed May 21, 2014, which is incorporated herein by reference in its entirety for all purposes.

BACKGROUND

The present disclosure relates generally to the field of tracking systems and, more particularly, to methods and equipment used to enable tracking of elements in a variety of contexts through a dynamic signal to noise ratio tracking system.

Tracking systems have been widely used to track motion, position, orientation, and distance, among other aspects, of objects in a wide variety of contexts. Such existing tracking systems generally include an emitter that emits electromagnetic energy and a detector configured to detect the electromagnetic energy, sometimes after it has been reflected off an object. It is now recognized that traditional tracking systems have certain disadvantages and that improved tracking systems are desired for use in a variety of contexts, including amusement park attractions, workplace monitoring, sports, fireworks displays, factory floor management, robotics, security systems, parking, and transportation, among others.

BRIEF DESCRIPTION

In accordance with an embodiment of the present disclosure, an amusement park ride system includes: a ride vehicle positioned on a ride path and configured to move along the ride path; a plurality of retro-reflective markers positioned on the ride vehicle, along the ride path, or both; an emission subsystem configured to emit electromagnetic radiation toward the plurality of retro-reflective markers; a detection subsystem configured to detect a pattern of retro-reflection of the electromagnetic radiation from the plurality of retro-reflective markers while filtering electromagnetic radiation that is not retro-reflected; and a control system communicatively coupled to the detection subsystem and having processing circuitry configured to: monitor the pattern of retro-reflection of the electromagnetic radiation from the plurality of retro-reflective markers for changes; and track movement of the ride vehicle in space and time based on changes in the pattern of retro-reflected electromagnetic radiation detected by the detection subsystem.

In accordance with another embodiment of the present disclosure, an amusement park ride system includes a ride vehicle positioned on a ride path and configured to move along the ride path; a plurality of retro-reflective markers positioned on the ride vehicle, along the ride path, or both; an emission subsystem configured to emit electromagnetic radiation toward the plurality of retro-reflective markers; a detection subsystem configured to detect a pattern of retro-reflection of the electromagnetic radiation from the plurality of retro-reflective markers while filtering electromagnetic radiation that is not retro-reflected; and a control system communicatively coupled to the detection subsystem and having processing circuitry configured to: monitor the pattern of retro-reflection of the electromagnetic radiation from the plurality of retro-reflective markers for changes; and track movement of the ride vehicle in space and time based on changes in the pattern of retro-reflected electromagnetic radiation detected by the detection subsystem.

In accordance with a further embodiment of the present disclosure, an amusement park system includes a control system comprising processing circuitry configured to receive data indicative of retro-reflection of electromagnetic radiation by a plurality of retro-reflective markers, wherein the control system is configured to monitor the retro-reflected electromagnetic radiation to track a location and movement of a ride vehicle relative to a ride vehicle path based solely on changes in the retro-reflected electromagnetic radiation.

DRAWINGS

These and other features, aspects, and advantages of the present disclosure will become better understood when the following detailed description is read with reference to the accompanying drawings in which like characters represent like parts throughout the drawings, wherein:

FIGS. 9A-9C depict the manner in which an object may be tracked in three spatial dimensions by the tracking system of FIG. 1, in accordance with an embodiment of the present disclosure;

Figure 27:
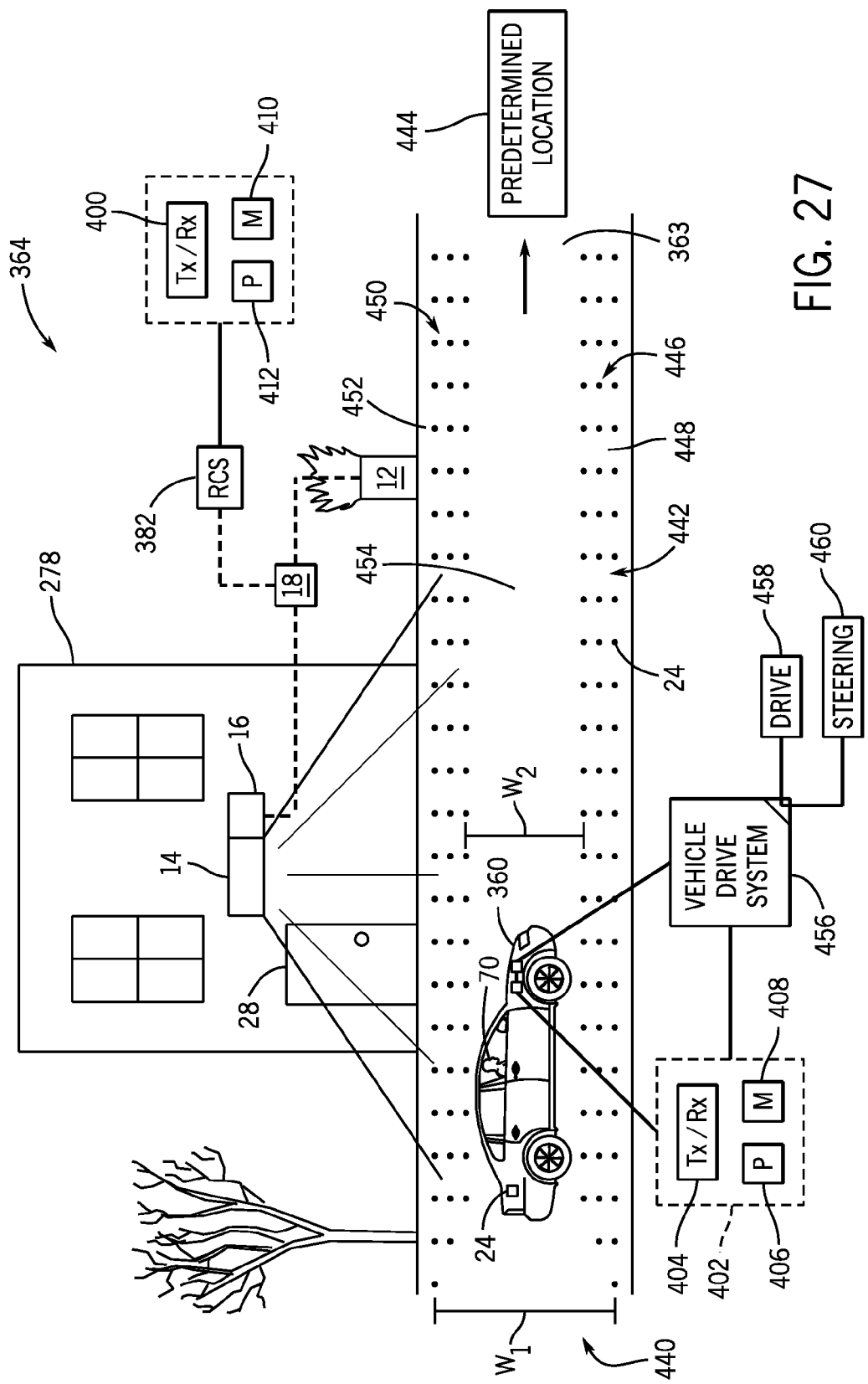
FIG. 27 is an elevational view of an embodiment of the unconstrained path of FIG. 26 in which the retro-reflective markers on the path and the tracking system of FIG. 1 are utilized to guide a ride vehicle toward a predetermined destination, in accordance with an embodiment of the present disclosure.
Figure 29:
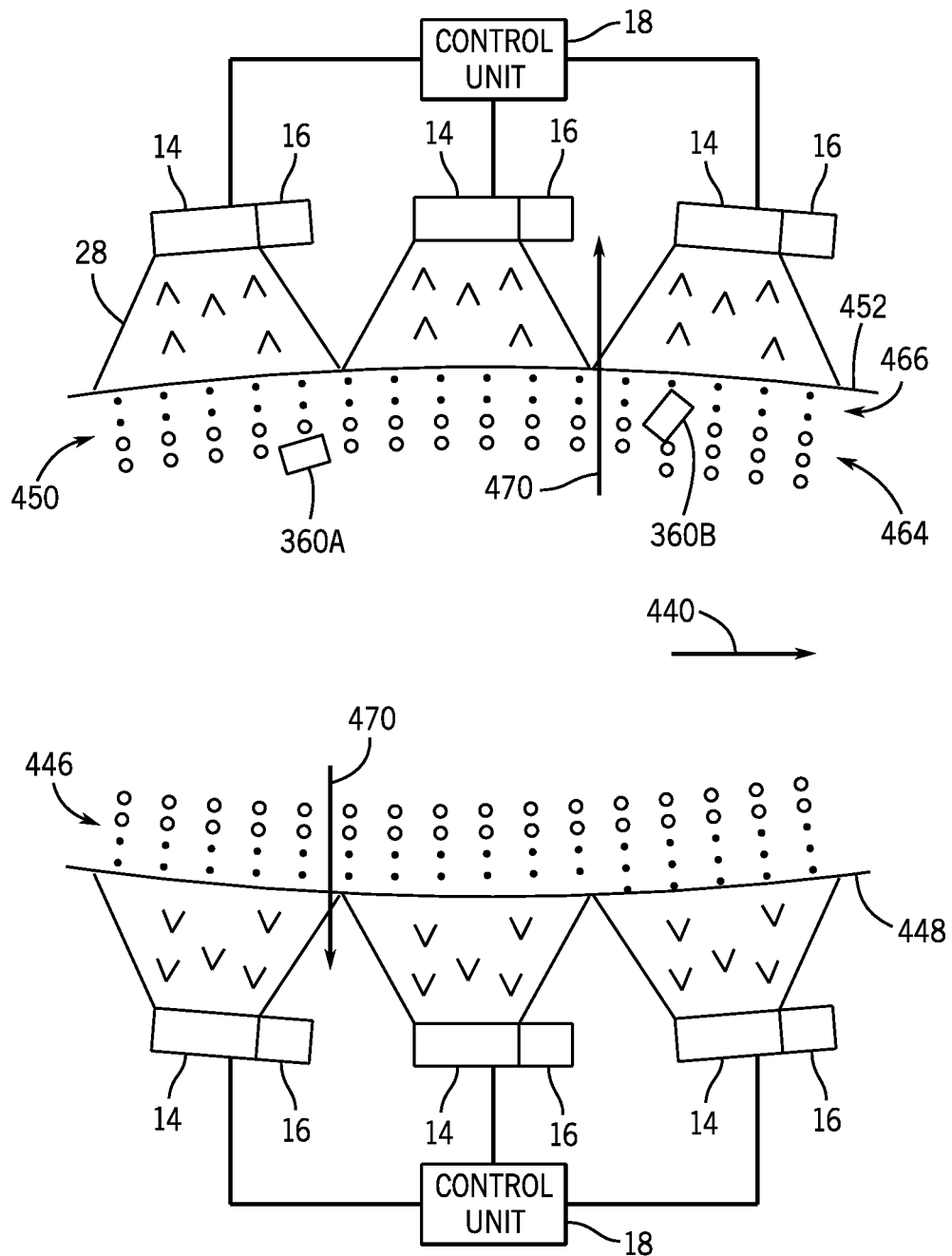

FIG. 29 is an overhead view of the path of FIG. 27 and depicting further details of the manner in which retro-reflective markers may be positioned in layers to guide the ride vehicle, in accordance with an embodiment of the present disclosure; and FIG. 30 is an overhead view of another embodiment of the path of FIG. 27 and depicting the manner in which the retro-reflective markers may be positioned to guide the ride vehicle, in accordance with an embodiment of the present disclosure.

DETAILED DESCRIPTION

Generally, tracking systems may use a wide variety of inputs obtained from a surrounding environment to track certain objects. The source of the inputs may depend, for instance, on the type of tracking being performed and the capabilities of the tracking system. For example, tracking systems may use sensors disposed in an environment to actively generate outputs received by a main controller. The controller may then process the generated outputs to determine certain information used for tracking. One example of such tracking may include tracking the motion of an object to which a sensor is fixed. Such a system might also utilize one or more devices used to bathe an area in electromagnetic radiation, a magnetic field, or the like, where the electromagnetic radiation or magnetic field is used as a reference against which the sensor's output is compared by the controller. As may be appreciated, such active systems, if implemented to track a large number of objects or even people, could be quite expensive to employ and processor-intensive for the main controller of the tracking system.

Other tracking systems, such as certain passive tracking systems, may perform tracking without providing an illumination source or the like. For instance, certain tracking systems may use one or more cameras to obtain outlines or rough skeletal estimates of objects, people, and so forth. However, in situations where background illumination may be intense, such as outside on a hot and sunny day, the accuracy of such a system may be reduced due to varying degrees of noise received by detectors of the passive tracking system.

With the foregoing in mind, it is now recognized that traditional tracking systems have certain disadvantages and that improved tracking systems are desired for use in a variety of contexts, including amusement park attractions, workplace monitoring, sports, and security systems, among others. For instance, it is presently recognized that improved tracking systems may be utilized to enhance operations in a variety of amusement park settings and other entertainment attractions.

In accordance with one aspect of the present disclosure, a dynamic signal to noise ratio tracking system uses emitted electromagnetic radiation and, in some embodiments, retroreflection, to enable detection of markers and/or objects within the field of view of the tracking system. The disclosed tracking system may include an emitter configured to emit electromagnetic radiation in a field of view, a sensing device configured to detect the electromagnetic radiation retro-reflected back from objects within the field of view, and a controller configured to perform various processing and analysis routines including interpreting signals from the sensing device and controlling automated equipment based on the detected locations of the objects or markers. The disclosed tracking system may also be configured to track several different objects at the same time (using the same emission and detection features). In some embodiments, the tracking system tracks a location of retro-reflective markers placed on the objects to estimate a location of the objects. As used herein, retro-reflective markers are reflective markers designed to retro-reflect electromagnetic radiation approximately back in the direction from which the electromagnetic radiation was emitted. More specifically, retro-reflective markers used in accordance with the present disclosure, when illuminated, reflect electromagnetic radiation back toward the source of emission in a narrow cone. In contrast, certain other reflective materials, such as shiny materials, may undergo diffuse reflection where electromagnetic radiation is reflected in many directions. Further still, mirrors, which also reflect electromagnetic radiation, do not typically undergo retro-reflection. Rather, mirrors undergo specular reflection, where an angle of electromagnetic radiation (e.g., light such as infrared, ultraviolet, visible, or radio waves and so forth) incident onto the mirror is reflected at an equal but opposite angle (away from the emission source).

Retro-reflective materials used in accordance with the embodiments set forth below can be readily obtained from a number of commercial sources. One example includes retro-reflective tape, which may be fitted to a number of different objects (e.g., environmental features, clothing items, toys). Due to the manner in which retro-reflection occurs using such markers in combination with the detectors 16 used in accordance with the present disclosure, the retro-reflective markers cannot be washed out by the sun or even in the presence of other emitters that emit electromagnetic radiation in wavelengths that overlap with the wavelengths of interest. Accordingly, the disclosed tracking system may be more reliable, especially in an outdoor setting and in the presence of other electromagnetic emission sources, compared to existing optical tracking systems.

While the present disclosure is applicable to a number of different contexts, presently disclosed embodiments are directed to, among other things, various aspects relating to tracking objects and people within an amusement park, and, in some situations, controlling amusement park equipment (e.g., automated equipment) based on information obtained from such a dynamic signal to noise ratio tracking system. Indeed, it is presently recognized that by using the disclosed tracking systems, reliable and efficient amusement park operations may be carried out, even though there are a number of moving objects, guests, employees, sounds, lights, and so forth, in an amusement park, which could otherwise create high levels of noise for other tracking systems, especially other optical tracking systems that do not use retro-reflective markers in the manner disclosed herein.

In certain aspects of the present disclosure, a control system of the amusement park (e.g., a control system associated with a particular area of the amusement park, such as a ride) may use information obtained by the dynamic signal to noise ratio tracking system to monitor and evaluate information relating to people, machines, vehicles (e.g., guest vehicles, service vehicles), and similar features in the area to provide information that may be useful in the more efficient operation of amusement park operations. For example, the information may be used to determine whether certain automated processes may be triggered or otherwise allowed to proceed. The evaluated information pertaining to vehicles in the amusement park may include, for instance, a location, a movement, a size, or other information relating to automated machines, ride vehicles, and so forth, within certain areas of the amusement park. By way of non-limiting example, the information may be evaluated to track people and machines to provide enhanced interactivity between the people and the machines, to track and control unmanned aerial vehicles, to track and control ride vehicles and any show effects associated with the ride vehicle, and so forth.

Certain aspects of the present disclosure may be better understood with reference to FIG. 1, which generally illustrates the manner in which a dynamic signal to noise ratio tracking system 10 (hereinafter referred to as "tracking system 10") may be integrated with amusement park equipment 12 in accordance with present embodiments. As illustrated, the tracking system 10 includes an emitter 14 (which may be all or a part of an emission subsystem having one or more emission devices and associated control circuitry) configured to emit one or more wavelengths of electromagnetic radiation (e.g., light such as infrared, ultraviolet, visible, or radio waves and so forth) in a general direction. The tracking system 10 also includes a detector 16 (which may be all or a part of a detection subsystem having one or more sensors, cameras, or the like, and associated control circuitry) configured to detect electromagnetic radiation reflected as a result of the emission, as described in further detail below.

To control operations of the emitter 14 and detector 16 (emission subsystem and detection subsystem) and perform various signal processing routines resulting from the emission, reflection, and detection process, the tracking system 10 also includes a control unit 18 communicatively coupled to the emitter 14 and detector 16. Accordingly, the control unit 18 may include one or more processors 20 and one or more memory 22, which may generally referred to herein as "processing circuitry." By way of specific but non-limiting example, the one or more processors 20 may include one or more application specific integrated circuits (ASICs), one or more field programmable gate arrays (FPGAs), one or more general purpose processors, or any combination thereof. Additionally, the one or more memory 22 may include volatile memory, such as random access memory (RAM), and/or non-volatile memory, such as read-only memory (ROM), optical drives, hard disc drives, or solid-state drives. In some embodiments, the control unit 18 may form at least a portion of a control system configured to coordinate operations of various amusement park features, including the equipment 12. As described below, such an integrated system may be referred to as an amusement park attraction and control system.

The tracking system 10 is specifically configured to detect a position of an illuminated component, such as a retro-reflective marker 24 having a properly correlated retro-reflective material relative to a grid, pattern, the emission source, stationary or moving environmental elements, or the like. In some embodiments, the tracking system 10 is designed to utilize the relative positioning to identify whether a correlation exists between one or more such illuminated components and a particular action to be performed by the amusement park equipment 12, such as triggering of a show effect, dispatch of a ride vehicle, closure of a gate, synchronization of security cameras with movement, and so on. More generally, the action may include the control of machine movement, image formation or adaptation, and similar processes.

As illustrated, the retro-reflective marker 24 is positioned on an object 26, which may correspond to any number of static or dynamic features. For instance, the object 26 may represent boundary features of an amusement park attraction, such as a floor, a wall, a gate, or the like, or may represent an item wearable by a guest, park employee, or similar object. Indeed, as set forth below, within an amusement park attraction area, many such retro-reflective markers 24 may be present, and the tracking system 10 may detect reflection from some or all of the markers 24, and may perform various analyses based on this detection.

Referring now to the operation of the tracking system 10, the emitter 14 operates to emit electromagnetic radiation, which is represented by an expanding electromagnetic radiation beam 28 electromagnetic radiation beam 28 for illustrative purposes, to selectively illuminate, bathe, or flood a detection area 30 in the electromagnetic radiation. Electromagnetic radiation beam 28 is intended to generally represent any form of electromagnetic radiation that may be used in accordance with present embodiments, such as forms of light (e.g., infrared, visible, UV) and/or other bands of the electromagnetic spectrum (e.g., radio waves and so forth). However, it is also presently recognized that, in certain embodiments, it may be desirable to use certain bands of the electromagnetic spectrum depending on various factors. For example, in one embodiment, it may be desirable to use forms of electromagnetic radiation that are not visible to the human eye or within an audible range of human hearing, so that the electromagnetic radiation used for tracking does not distract guests from their experience. Further, it is also presently recognized that certain forms of electromagnetic radiation, such as certain wavelengths of light (e.g., infrared) may be more desirable than others, depending on the particular setting (e.g., whether the setting is "dark," or whether people are expected to cross the path of the beam). Again, the detection area 30 may correspond to all or a part of an amusement park attraction area, such as a stage show, a ride vehicle loading area, a waiting area outside of an entrance to a ride or show, and so forth.

The electromagnetic radiation beam 28, in certain embodiments, may be representative of multiple light beams (beams of electromagnetic radiation) being emitted from different sources (all part of an emission subsystem). Further, in some embodiments the emitter 14 is configured to emit the electromagnetic radiation beam 28 at a frequency that has a correspondence to a material of the retro-reflective marker 24 (e.g., is able to be reflected by the retro-reflective elements of the marker 24). For instance, the retro-reflective marker 24 may include a coating of retro-reflective material disposed on a body of the object 26 or a solid piece of material coupled with the body of the object 26. By way of more specific but non-limiting example, the retro-reflective material may include spherical and/or prismatic reflective elements that are incorporated into a reflective material to enable retro-reflection to occur. Again, in certain embodiments many such retro-reflective markers 24 may be present, and may be arranged in a particular pattern stored in the memory 22 to enable further processing, analysis, and control routines to be performed by the control unit 18 (e.g., control system).

The retro-reflective marker 24 may reflect a majority of the electromagnetic radiation (e.g., infrared, ultraviolet, visible wavelengths, or radio waves and so forth) incident from the electromagnetic radiation beam 28 back toward the detector 16 within a relatively well-defined cone having a central axis with substantially the same angle as the angle of incidence. This reflection facilitates identification of a location of the retro-reflective marker 24 by the system 10 and correlation thereof to various information stored in the memory 22 (e.g., patterns, possible locations). This location information (obtained based on the reflected electromagnetic radiation) may then be utilized by the control unit 18 to perform various analysis routines and/or control routines, for example to determine whether to cause triggering or other control of the amusement park equipment 12.

Specifically, in operation, the detector 16 of the system 10 may function to detect the electromagnetic radiation beam 28 retro-reflected from the retro-reflective marker 24 and provide data associated with the detection to the control unit 18 via communication lines 31 for processing. The detector 16 may operate to specifically identify the marker 24 based on certain specified wavelengths of electromagnetic radiation emitted and reflected and, thus, avoid issues with false detections. For example, the detector 16 may be specifically configured to detect certain wavelengths of electromagnetic radiation (e.g., corresponding to those emitted by the emitter 14) through the use of physical electromagnetic radiation filters, signal filters, and the like. Further, the detector 16 may utilize a specific arrangement of optical detection features and electromagnetic radiation filters to capture substantially only retro-reflected electromagnetic radiation.

For example, the detector 16 may be configured to detect wavelengths of electromagnetic radiation retro-reflected by the retro-reflective markers 24 while filtering wavelengths of electromagnetic radiation not retro-reflected by the markers 24, including those wavelengths of interest. Thus, the detector 16 may be configured to specifically detect (e.g., capture) retro-reflected electromagnetic radiation while not detecting (e.g., capturing) electromagnetic radiation that is not retro-reflected. In one embodiment, the detector 16 may utilize the directionality associated with retro-reflection to perform this selective filtering. Accordingly, while the detector 16 receives electromagnetic radiation from a variety of sources (including spuriously reflected electromagnetic radiation, as well as environmental electromagnetic radiation), the detector 16 is specifically configured to filter out all or substantially all spuriously reflected signals while retaining all or substantially all intended signals. Thus, the signal-to-noise ratio of signals actually processed by the detector 16 and control unit 18 is very high, regardless of the signal-to-noise ratio that exists for the electromagnetic bands of interest outside of the detector 16.

For example, the detector 16 may receive retro-reflected electromagnetic radiation (e.g., from the retro-reflective markers 24) and ambient electromagnetic radiation from within an area (e.g., guest attraction area). The ambient electromagnetic radiation may be filtered, while the retro-reflected electromagnetic radiation, which is directional, may not be filtered (e.g., may bypass the filter). Thus, in certain embodiments, the "image" generated by the detector 16 may include a substantially dark (e.g., black or blank) background signal, with substantially only retro-reflected electromagnetic radiation producing contrast.

In accordance with certain embodiments, the retro-reflected electromagnetic radiation may include different wavelengths that are distinguishable from one another. In one embodiment, the filters of the detector 16 may have optical qualities and may be positioned within the detector such that the optical detection devices of the detector 16 substantially only receive electromagnetic wavelengths retro-reflected by the retro-reflective markers 24 (or other retro-reflective elements), as well as any desired background wavelengths (which may provide background or other landscape information). To produce signals from the received electromagnetic radiation, as an example, the detector 16 may be a camera having a plurality of electromagnetic radiation capturing features (e.g., charge-coupled devices (CCDs) and/or complementary metal oxide semiconductor (CMOS) sensors corresponding to pixels). In one example embodiment, the detector 16 may be an Amp® high dynamic range (HDR) camera system available from Contrast Optical Design and Engineering, Inc. of Albuquerque, N. Mex.

Because retro-reflection by the retro-reflective markers 24 is such that a cone of reflected electromagnetic radiation is incident on the detector 16, the control unit 18 may in turn correlate a center of the cone, where the reflected electromagnetic radiation is most intense, to a point source of the reflection. Based on this correlation, the control unit 18 may identify and track a location of this point source, or may identify and monitor a pattern of reflection by many such retro-reflective markers 24.

For instance, once the control unit 18 receives the data from the detector 16, the control unit 18 may employ known visual boundaries or an established orientation of the detector 16 to identify a location (e.g., coordinates) corresponding to the detected retro-reflective marker 24. When multiple stationary retro-reflective markers 24 are present, the control unit 18 may store known positions (e.g., locations) of the retro-reflective markers 24 to enable reflection pattern monitoring. By monitoring a reflection pattern, the control unit 18 may identify blockage (occlusion) of certain retro-reflective markers 24 by various moving objects, guests, employees, and so forth. It should also be noted that the bases for these comparisons may be updated based on, for example, how long a particular retro-reflective marker 24 has been positioned and used in its location. For instance, the stored pattern of reflection associated with one of the markers 24 may be updated periodically during a calibration stage, which includes a time period during which no objects or people are expected to pass over the marker 24. Such re-calibrations may be performed periodically so that a marker that has been employed for an extended period of time and has lost its retro-reflecting capability is not mistaken for a detected occlusion event.

In other embodiments, in addition to or in lieu of tracking one or more of the retro-reflective markers 24, the tracking system 10 may be configured to detect and track various other objects located within the detection area 30. Such objects 32 may include, among other things, ride vehicles, people (e.g., guests, employees), and other moving park equipment. For example, the detector 16 of the system 10 may function to detect the electromagnetic radiation beam 28 bouncing off of an object 32 (without retro-reflective markers 24) and provide data associated with this detection to the control unit 18. That is, the detector 16 may detect the object 32 based entirely on diffuse or specular reflection of electromagnetic energy off the object 32. In some embodiments, the object 32 may be coated with a particular coating that reflects the electromagnetic radiation beam 28 in a detectable and predetermined manner. Accordingly, once the control unit 18 receives the data from the detector 16, the control unit 18 may determine that the coating associated with the object 32 reflected the electromagnetic radiation, and may also determine the source of the reflection to identify a location of the object 32.

Whether the retro-reflective markers 24 are stationary or moving, the process of emitting the electromagnetic radiation beam 28, sensing of the reflected electromagnetic radiation from the retro-reflective markers 24 (or objects 32 with no or essentially no retro-reflective material), and determining a location of the retro-reflective marker 24 or object 32 may be performed by the control unit 18 numerous times over a short period. This process may be performed at distinct intervals, where the process is initiated at predetermined time points, or may be performed substantially continuously, such that substantially immediately after the process is completed, it is re-initiated. In embodiments where the retro-reflective markers 24 are stationary and the control unit 18 performs retro-reflective pattern monitoring to identify marker blockage, the process may be performed at intervals to obtain a single retro-reflective pattern at each interval. This may be considered to represent a single frame having a reflection pattern corresponding to a pattern of blocked and unblocked retro-reflective markers 24.

On the other hand, such procedures may essentially be performed continuously to facilitate identification of a path and/or trajectory through which the retro-reflective marker 24 has moved. The marker 24, moving within the detection area 30, would be detected over a particular timeframe or simply in continuous series. Here, the pattern of reflection would be generated and identified over a time period.

In accordance with the embodiments set forth above, the detector 16 and control unit 18 may operate on a variety of different timeframes depending on the tracking to be performed and the expected movement of the tracked object through space and time. As an example, the detector 16 and the control unit 18 may operate in conjunction to complete all logical processes (e.g., updating analysis and control signals, processing signals) in the time interval between the capture events of the detector 16. Such processing speeds may enable substantially real-time tracking, monitoring, and control where applicable. By way of non-limiting example, the detector capture events may be between approximately $\frac{1}{60}$ of a second and approximately $\frac{1}{30}$ of a second, thus generating between 30 and 60 frames per second. The detector 16 and the control unit 18 may operate to receive, update, and process signals between the capture of each frame. However, any interval between capture events may be utilized in accordance with certain embodiments.

Once a particular pattern of retro-reflection has been detected, a determination may be made by the control unit 18 as to whether the pattern correlates to a stored pattern identified by the control unit 18 and corresponding to a particular action to be performed by the amusement park equipment 12. For example, the control unit 18 may perform a comparison of a position, path, or trajectory of the retro-reflective marker 24 with stored positions, paths, or trajectories to determine an appropriate control action for the equipment 12. Additionally or alternatively, as described in further detail below, the control unit 18 may determine whether a particular pattern obtained at a particular time point correlates to a stored pattern associated with a particular action to be performed by the amusement park equipment 12. Further still, the control unit 18 may determine whether a set of particular patterns obtained at particular time points correlate to a stored pattern change associated with a particular action to be performed by the amusement park equipment 12.

While the control unit 18 may cause certain actions to be automatically performed within the amusement park in the manner set forth above, it should be noted that similar analyses to those mentioned above may also be applied to the prevention of certain actions (e.g., where the park equipment 12 blocks action or is blocked from performing an action). For example, in situations where a ride vehicle can be automatically dispatched, the control unit 18, based upon tracking changes in the retro-reflective markers 24, may halt automatic dispatching, or may even prevent dispatching by a ride operator until additional measures are taken (e.g., additional confirmations that the ride vehicle is cleared for departure). This type of control may be applied to other amusement park equipment, as well. For example, flame effects, fireworks, or similar show effects may be blocked from being triggered, may be stopped, or may be reduced in intensity, due to intervention by the control unit 18 as a result of certain pattern determinations as described herein.

Having generally described the configuration of the system 10, it should be noted that the arrangement of the emitter 14, detector 16, control unit 18, and other features may vary based on application-specific considerations and the manner in which the control unit 18 performs evaluations based on electromagnetic radiation from the retro-reflective markers 24. In the embodiment of the tracking system 10 illustrated in FIG. 1, the emitter 14 and the sensor or detector 16 are integral features such that a plane of operation associated with the detector 16 is essentially overlapping with a plane of operation associated with the emitter 14. That is, the detector 16 is located in substantially the same position as the emitter 14, which may be desirable due to the retro-reflectivity of the markers 24. However, the present disclosure is not necessarily limited to this configuration. For instance, as noted above, retro-reflection may be associated with a cone of reflection, where the highest intensity is in the middle of the reflected cone. Accordingly, the detector 16 may be positioned within an area where the reflected cone of the retro-reflective markers is less intense than its center, but may still be detected by the detector 16.

Figure 2:
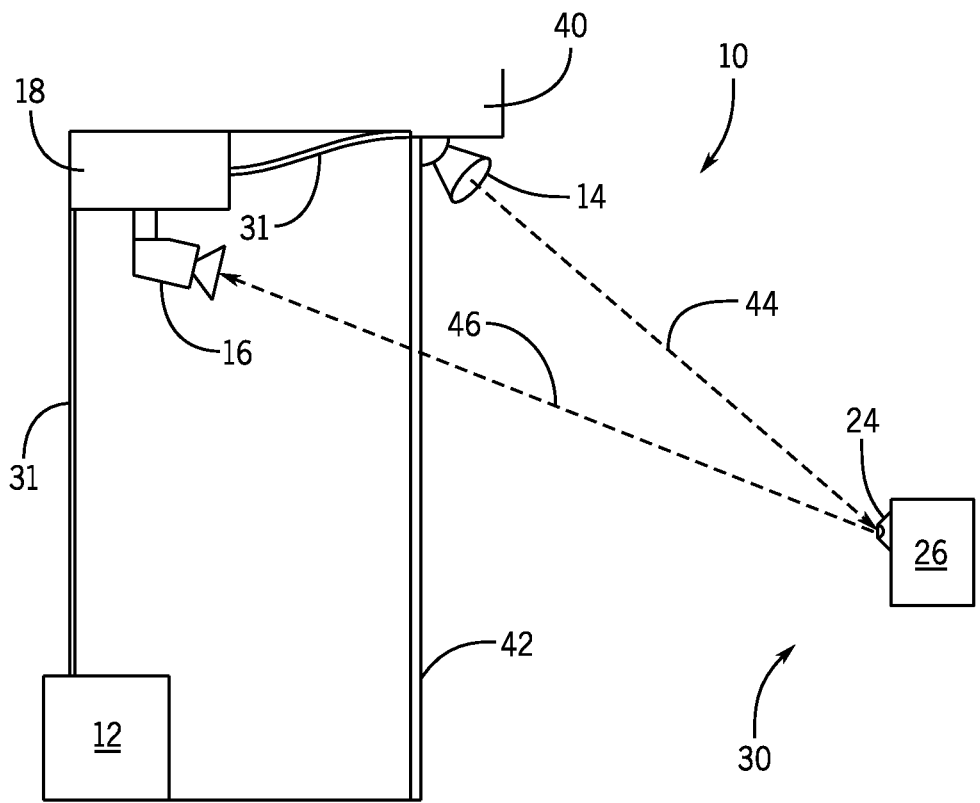
FIG. 2 is a schematic diagram of another tracking system utilizing a dynamic signal to noise ratio device to track objects, in accordance with an embodiment of the present disclosure.

By way of non-limiting example, in some embodiments, the emitter 14 and the detector 16 may be concentric. However, the detector 16 (e.g., an infrared camera) may be positioned in a different location with respect to the emitter 14, which may include an infrared light bulb, one or more diode emitters, or similar source. As illustrated in FIG. 2, the emitter 14 and detector 16 are separate and are positioned at different locations on an environmental feature 40 of an amusement attraction area (e.g., a wall or ceiling). Specifically, the emitter 14 of FIG. 2 is positioned outside of a window 42 of a storefront containing other components of the system 10. The detector 16 of FIG. 2 is positioned away from the emitter 14, but is still oriented to detect electromagnetic radiation reflected from the retro-reflective marker 24 and originating from the emitter 14.

For illustrative purposes, arrows 44, 46 represent a light beam (a beam of electromagnetic radiation) being emitted from the emitter 14 (arrow 44) into the detection area 30, retro-reflected by the retro-reflective marker 24 on the object 26 (arrow 46), and detected by the detector 16. The light beam represented by the arrow 44 is merely one of numerous electromagnetic radiation emissions (light beams) that flood or otherwise selectively illuminate the detection area 30 from the emitter 14. It should be noted that still other embodiments may utilize different arrangements of components of the system 10 and implementations in different environments in accordance with the present disclosure.

Figure 1:
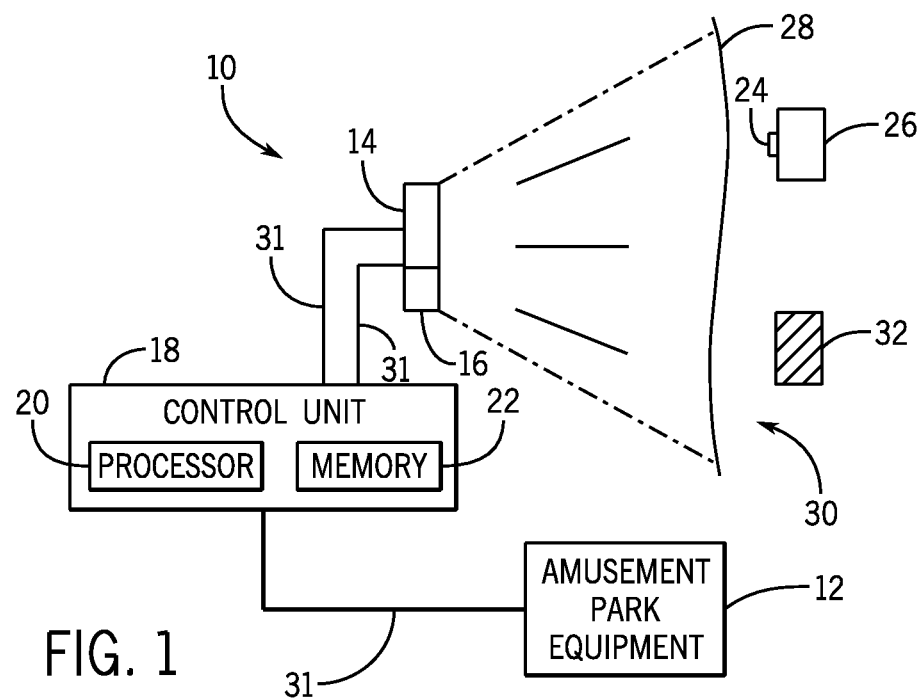
FIG. 1 is a schematic diagram of a tracking system utilizing a dynamic signal to noise ratio device to track objects, in accordance with an embodiment of the present disclosure.

Having now discussed the general operation of the tracking system 10 to detect a position of retro-reflective markers 24 and/or objects 32, as illustrated in FIG. 1, certain applications of the tracking system 10 will be described in further detail below. For example, it may be desirable to track the locations of people within a particular area through the use of the disclosed tracking systems. This may be useful, for example, for controlling lines in a ride vehicle loading area, controlling access to different areas, determining appropriate instances when show effects can be triggered, determining appropriate instances when certain automated machinery can be moved, and may also be useful for assisting a live show performance (e.g., blocking actors on a stage). That is, during performances, actors are supposed to be standing at particular positions on the stage at certain times. To ensure that the actors are hitting their appropriate positions at the right time, the tracking system 10 may be installed above the stage and used to track the positions and/or motion of all the actors on the stage. Feedback from the tracking system 10 may be utilized to evaluate how well the actors are hitting the desired spots on the stage.

In addition to blocking on a stage, the tracking system 10 may be used in contexts that involve tracking and/or evaluating shoppers in a store or other commercial setting. That is, a store may be outfitted with the disclosed tracking systems 10 in order to determine where guests are spending time within the store. Instead of triggering a show effect, such tracking systems 10 may be used to monitor the flow of people within the store and control the availability of certain items as a result, control the flow of movement of people, etc. For instance, information collected via the disclosed tracking systems 10 may be used to identify and evaluate which setups or displays within the store are most attractive, to determine what items for sale are the most popular, or to determine which areas of the store, if any, are too crowded. This information may be analyzed and used to improve the store layout, product development, and crowd management, among other things.

It should be noted that other applications may exist for tracking positions of people, objects, machines, etc. within an area other than those described above. Presently disclosed tracking systems 10 may be configured to identify and/or track the position and movement of people and/or objects within the detection area 30. The tracking system 10 may accomplish this tracking in several different ways, which were introduced above and are explained in further detail below. It should be noted that the tracking system 10 is configured to detect a position of one or more people, one or more objects 32, or a combination of different features, at the same time in the same detection area 30 using the single emitter 14, detector 16, and control unit 18. However, the use of multiple such emitters 14, detectors 16, and control units 18 is also within the scope of the present disclosure. Accordingly, there may be one or more of the emitters 14 and one or more of the detectors 16 in the detection area 30. Considerations such as the type of tracking to be performed, the desired range of tracking, for redundancy, and so forth, may at least partially determine whether multiple or a single emitter and/or detector are utilized.

For instance, as noted above, the tracking system 10 may generally be configured to track a target moving in space and in time (e.g., within the detection area 30 over time). When a single detection device (e.g., detector 16) is utilized, the tracking system 10 may monitor retro-reflected electromagnetic radiation from a defined orientation to track a person, object, etc. Because the detector 16 has only one perspective, such detection and tracking may, in some embodiments, be limited to performing tracking in only one plane of movement (e.g., the tracking is in two spatial dimensions). Such tracking may be utilized, as an example, in situations where the tracked target has a relatively low number of degrees of freedom, such as when movement is restricted to a constrained path (e.g., a track). In one such embodiment, the target has a determined vector orientation.

On the other hand, when multiple detection devices are utilized (e.g., two or more of the detectors 16) to track a target in both space and time, the tracking system 10 may monitor retro-reflected electromagnetic radiation from multiple orientations. Using these multiple vantage points, the tracking system 10 may be able to track targets having multiple degrees of freedom. In other words, the use of multiple detectors may provide both vector orientation and range for the tracked target. This type of tracking may be particularly useful in situations where it may be desirable to allow the tracked target to have unrestricted movement in space and time.

Multiple detectors may also be desirable for redundancy in the tracking. For example, multiple detection devices applied to scenarios where movement of the target is restricted, or not, may enhance the reliability of the tracking performed by the tracking system 10. The use of redundant detectors 16 may also enhance tracking accuracy, and may help prevent geometric occlusion of the target by complex geometric surfaces, such as winding pathways, hills, folded clothing, opening doors, and so on.

Figure 3:
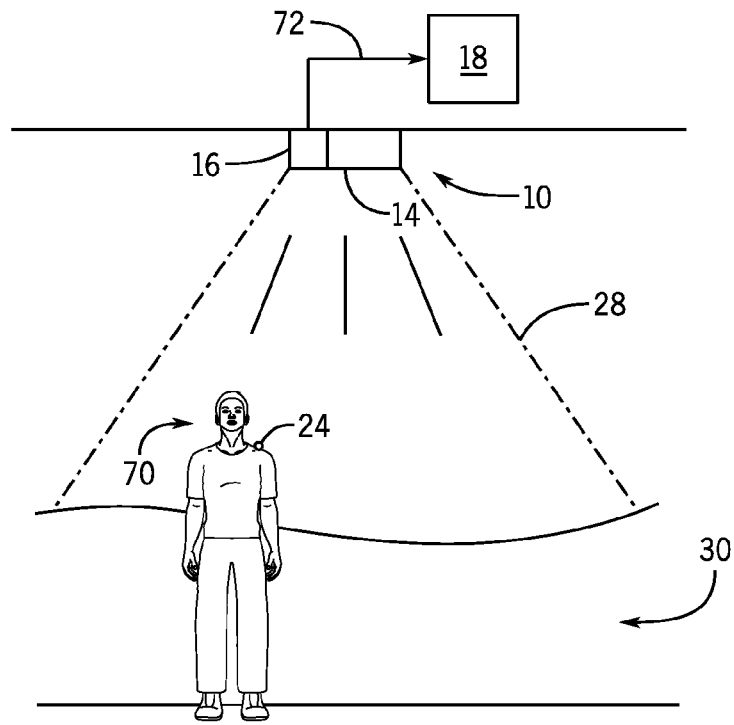
FIG. 3 is a schematic view of the tracking system of FIG. 1 tracking a retro-reflective marker on a person, in accordance with an embodiment of the present disclosure.

In accordance with one aspect of the present disclosure, the tracking system 10 may track relative positions of multiple targets (e.g., people, objects, machines) positioned within the detection area 30 through the use of the retro-reflective markers 24. As illustrated in FIG. 3, the retro-reflective markers 24 may be disposed on a person 70. Additionally or alternatively, the marker 24 may be positioned on a machine or other object (e.g., object 26). Accordingly, the techniques disclosed herein for tracking movement of the person 70 in space and time may also be applied to movement of an object in the amusement park, either in addition to the person 70 or as an alternative to the person 70. In such embodiments, the marker 24 may be positioned on an outside of the object 26 (e.g., a housing), as shown in FIG. 1.

In the illustrated embodiment of FIG. 3, the retro-reflective marker 24 is disposed on the outside of the person's clothing. For instance, the retro-reflective marker 24 may be applied as a strip of retro-reflective tape applied to an armband, headband, shirt, personal identification feature, or other article. Additionally or alternatively, the retro-reflective marker 24 may, in some embodiments, be sewn into clothing or applied to the clothing as a coating. The retro-reflective marker 24 may be disposed on the clothing of the person 70 in a position that is accessible to the electromagnetic radiation beam 28 being emitted from the emitter 14. As the person 70 walks about the detection area 30 (in the case of the object 32, the object 32 may move through the area 30), the electromagnetic radiation beam 28 reflects off the retro-reflective marker 24 and back to the detector 16. The detector 16 communicates with the control unit 18 by sending a signal 72 to the processor 20, this signal 72 being indicative of the reflected electromagnetic radiation detected via the detector 16. The tracking system 10 may interpret this signal 72 to track the position or path of the person 70 (or object 32) moving about a designated area (i.e., track the person or object in space and time). Again, depending on the number of detectors 16 utilized, the control unit 18 may determine vector magnitude, orientation, and sense of the person and/or object's movement based on the retro-reflected electromagnetic radiation received.

Figure 4:
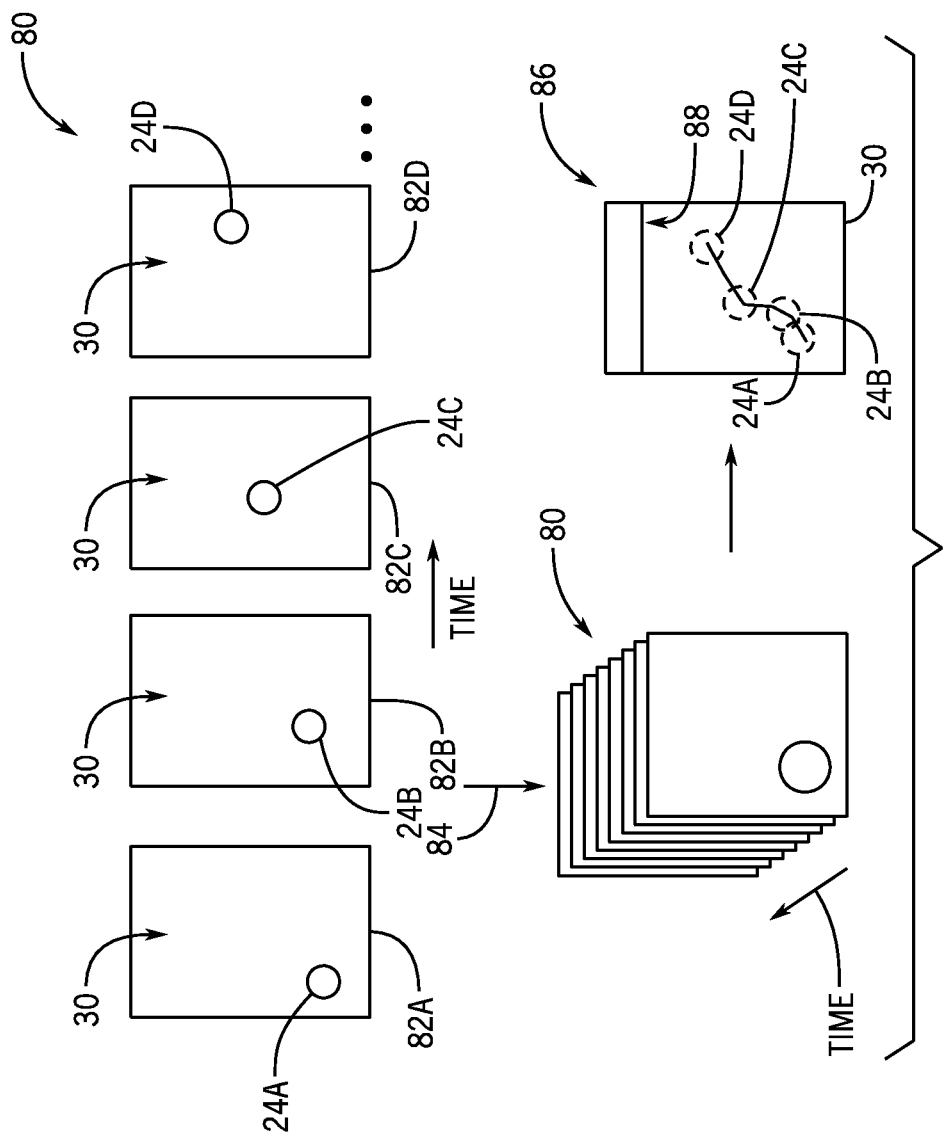
FIG. 4 is a schematic representation of an analysis performed by the tracking system of FIG. 1 in which position and movement of a person or object is tracked in space and time, in accordance with an embodiment of the present disclosure.

The tracking of the person 70 (which may also be representative of a moving object) is illustrated schematically in FIG. 4. More specifically, FIG. 4 illustrates a series 80 of frames 82 captured by the detector 16 (e.g., camera) over a period of time. As noted above, a plurality of such frames (e.g., between 30 and 60) may be generated every second in certain embodiments. It should be noted that FIG. 4 may not be an actual representation of outputs produced by the tracking system 10, but is described herein to facilitate an understanding of the tracking and monitoring performed by the control unit 18. The frames 82 each represent the detection area 30, and the position of the retro-reflective marker 24 within the area 30. Alternatively, the frames 82 may instead represent marker blockage within the area 30, for example where a grid of markers 24 are occluded by an object or person.

As shown, a first frame 82A includes a first instance of the retro-reflective marker, designated as 24A, having a first position. As the series 80 progresses in time, a second frame 82B includes a second instance of the retro-reflective marker 24B, which is displaced relative to the first instance, and so on (thereby producing third and fourth instances of the retro-reflective marker 24C and 24D). After a certain period of time, the control unit 18 has generated the series 80, where the operation of generating the series 80 is generally represented by arrow 84.

The series 80 may be evaluated by the control unit 18 in a number of different ways. In accordance with the illustrated embodiment, the control unit 18 may evaluate movement of the person 70 or object 32 by evaluating the positions of the marker 24 (or blockage of certain markers) over time. For example, the control unit 18 may obtain vector orientation, range, and sense, relating to the movement of the tracked target depending on the number of detectors 16 utilized to perform the tracking. In this way, the control unit 18 may be considered to evaluate a composite frame 86 representative of the movement of the tracked retro-reflective marker 24 (or tracked blockage of markers 24) over time within the detection area 30. Thus, the composite frame 86 includes the various instances of the retro-reflective marker 24 (including 24A, 24B, 24C, 24D), which may be analyzed to determine the overall movement of the marker 24 (and, therefore, the person 70 and/or object 26, whichever the case may be).

As also illustrated in FIG. 4, this monitoring may be performed relative to certain environmental elements 88, which may be fixed within the detection area 30 and/or may be associated with reflective materials. The control unit 18 may perform operations not only based on the detected positions of the marker 24, but also based on extrapolated movement (e.g., a projected path of the retro-reflective marker 24 through the detection area 30 or projected positions of marker grid occlusion) in relation to the environmental elements 88.

Figure 5:
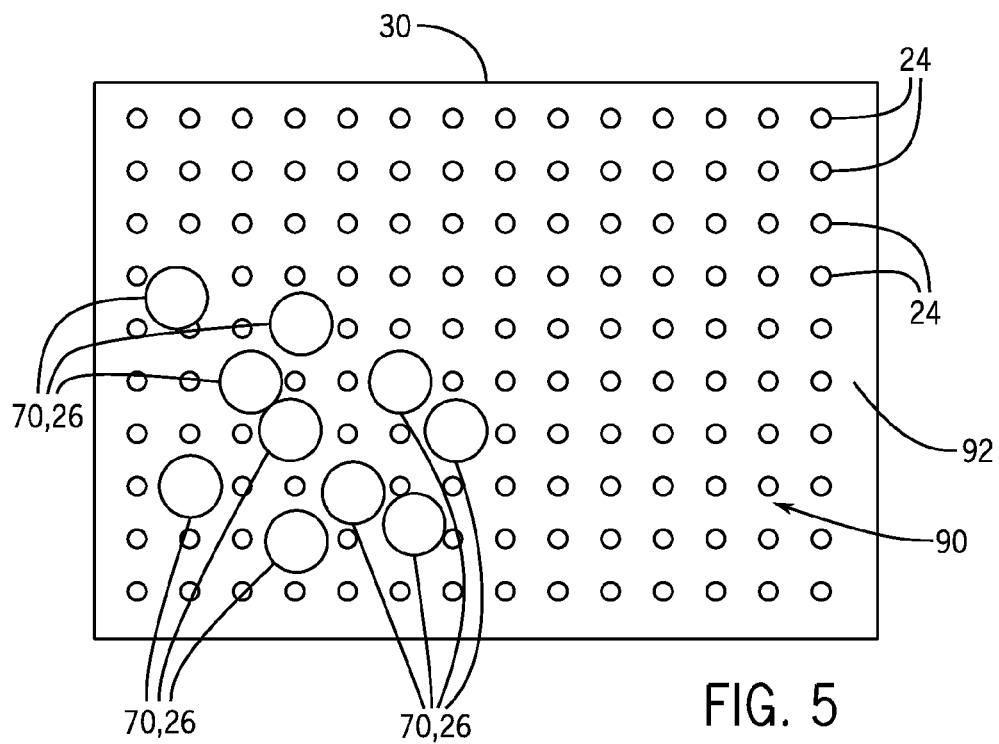
FIG. 5 is an overhead view of a room with a grid pattern of retro-reflective markers for tracking a position of people in the room via the tracking system of FIG. 1, in accordance with an embodiment of the present disclosure.

Another method for tracking one or more people 70 or objects 32 in an area is illustrated schematically in FIG. 5. Specifically, FIG. 5 represents an overhead view of a group of people 70 standing in the detection area 30. Although not illustrated, the tracking system 10 may be present directly above this detection area 30 in order to detect positions of people 70 (and other objects) present within the detection area 30 (e.g., to obtain a plan view of the detection area 30). In the illustrated embodiment, the retro-reflective markers 24 are positioned in a grid pattern 90 on a floor 92 of the detection area 30 (e.g., as a coating, pieces of tape, or similar attachment method). The retro-reflective markers 24 may be arranged in any desired pattern (e.g., grid, diamond, lines, circles, solid coating, etc.), which may be a regular pattern (e.g., repeating) or a random pattern.

This grid pattern 90 may be stored in the memory 22, and portions of the grid pattern 90 (e.g., individual markers 24) may be correlated to locations of certain environmental elements and amusement park features (e.g., the amusement park equipment 12). In this way, the position of each of the markers 24 relative to such elements may be known. Accordingly, when the markers 24 retro-reflect the electromagnetic radiation beam 28 to the detector 16, the location of the markers 24 that are reflecting may be determined and/or monitored by the control unit 18.

As illustrated, when the people 70 or objects 32 are positioned over one or more of the retro-reflective markers 24 on the floor 92, the occluded markers cannot reflect the emitted electromagnetic radiation back to the detector 16 above the floor 92. Indeed, in accordance with an embodiment, the grid pattern 90 may include retro-reflective markers 24 that are spaced apart by a distance that allows the people or objects positioned on the floor 92 to be detectable (e.g., blocking at least one of the retro-reflective markers 24). In other words, the distance between the markers 24 may be sufficiently small so that objects or people may be positioned over at least one of the retro-reflective markers 24.

In operation, the detector 16 may function to detect the electromagnetic radiation beam 28 retro-reflected from the retro-reflective markers 24 that are not covered up by people or objects located in the detection area 30. As discussed above, the detector 16 may then provide data associated with this detection to the control unit 18 for processing. The control unit 18 may perform a comparison of the detected electromagnetic radiation beam reflected off the uncovered retro-reflective markers 24 (e.g., a detected pattern) with stored positions of the completely uncovered grid pattern 90 (e.g., a stored pattern) and/or other known grid patterns resulting from blockage of certain markers 24. Based on this comparison, the control unit 18 may determine which markers 24 are covered to then approximate locations of the people 70 or objects 32 within the plane of the floor 92. Indeed, the use of a grid positioned on the floor 92 in conjunction with a single detector 16 may enable the tracking of movement in two dimensions. If higher order tracking is desired, additional grids and/or additional detectors 16 may be utilized. In certain embodiments, based on the locations of the people 70 or objects 32 in the detection area 30, the control unit 18 may adjust the operation of the amusement park equipment 12.

The process of emitting the electromagnetic radiation beam 28, sensing of the reflected electromagnetic radiation from the uncovered retro-reflective markers 24 on the floor 92, and determining a location of the people 70 may be performed by the control unit 18 numerous times over a short period in order to identify a series of locations of the people 70 moving about the floor 92 (to track motion of the group). Indeed, such procedures may essentially be performed continuously to facilitate identification of a path through which the people 70 have moved within the detection area 30 during a particular timeframe or simply in continuous series. Once the position or path one or more of the people 70 has been detected, the control unit 18 may further analyze the position or path to determine whether any actions should be performed by the equipment 12.

Figure 6:
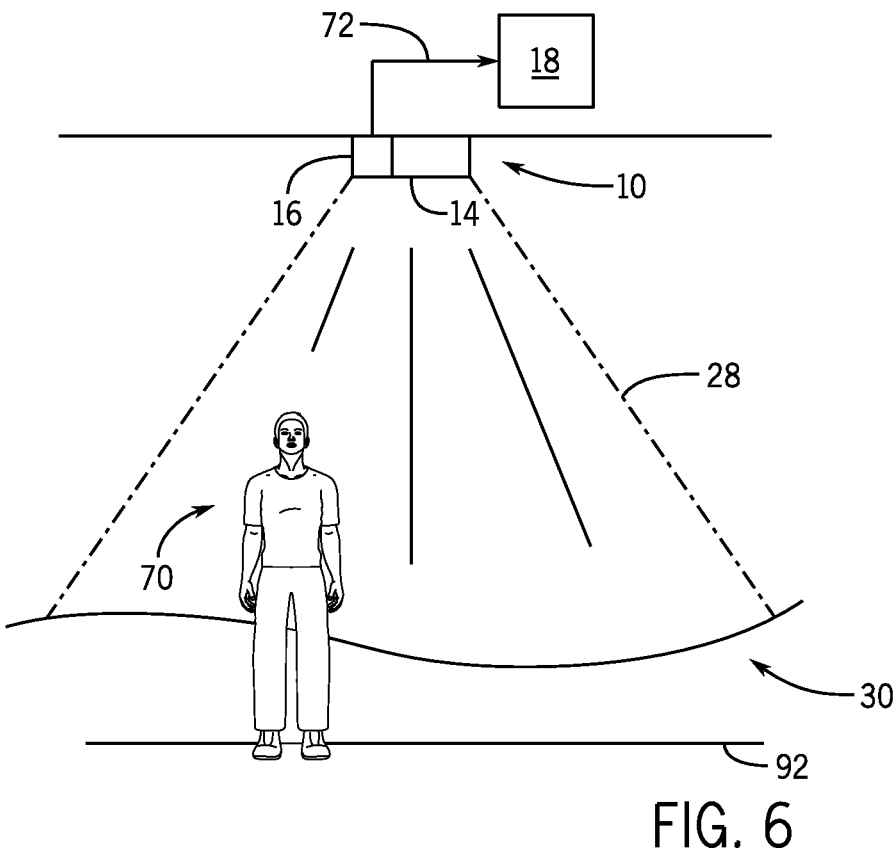
FIG. 6 is an elevational view of the tracking system of FIG. 1 tracking a person without tracking retro-reflective marker movement and without tracking retro-reflective marker occlusion, in accordance with an embodiment of the present disclosure.

As discussed in detail above with respect to FIG. 1, the control unit 18 may be configured to identify certain objects that are expected to cross the path of the electromagnetic radiation beam 28 within the detection area 30, including objects that are not marked with retro-reflective material. For example, as illustrated in FIG. 6, some embodiments of the tracking system 10 may be configured such that the control unit 18 is able to identify the person 70 (which is also intended to be representative of the object 32) located in the detection area 30, without the use of the retro-reflective markers 24. That is, the control unit 18 may receive data indicative of the electromagnetic radiation reflected back from the detection area 30, and the control unit 18 may compare a digital signature of the detected radiation to one or more possible data signatures stored in memory 22. That is, if the signature of electromagnetic radiation reflected back to the detector 16 matches closely enough to the signature of a person 70 or known object 32, then the control unit 18 may determine that the person 70 or object 32 is located in the detection area 30. For example, the control unit 18 may identify "dark spots," or regions where electromagnetic radiation was absorbed rather than reflected, within the detection area 30. These areas may have a geometry that the control unit 18 may analyze (e.g., by comparing to shapes, sizes, or other features of stored objects or people) to identify a presence, location, size, shape, etc., of an object (e.g., the person 70).

As may be appreciated with reference to FIGS. 1, 2, 3, and 6, the tracking system 10 may be positioned in a variety of locations to obtain different views of the detection area 30. Indeed, it is now recognized that different locations and combinations of locations of one or more of the tracking systems 10 (or one or more elements of the tracking system 10, such as multiple detectors 16) may be desirable for obtaining certain types of information relating to the retro-reflective markers 24 and the blockage thereof. For instance, in FIG. 1, the tracking system 10, and in particular the detector 16, is positioned to obtain an elevational view of at least the object 26 fitted with the retro-reflective marker 24 and the object 32. In FIG. 2, the detector 16 is positioned to obtain an overhead perspective view of the detection area 30, which enables detection of retro-reflective markers 24 positioned on a variety of environmental elements, moving objects, or people. In the embodiments of FIGS. 3 and 6, the detector 16 may be positioned to obtain a plan view of the detection area 30.

These different views may provide information that may be utilized by the control unit 18 for specific types of analyses and, in certain embodiments, control actions that may depend on the particular setting in which they are located. For example, in FIG. 7, the tracking system 10, and particularly the emitter 14 and the detector 16, are positioned to obtain a perspective view of the person 70 (or object 32) in the detection area 30. The detection area 30 includes the floor 92, but also includes a wall 93 on which the retro-reflective markers 24 are positioned to form the grid pattern 90. Here, the person 70 is blocking a subset of markers 24 positioned on the wall 93. The subset of markers 24 are unable to be illuminated by the emitter 14, are unable to retro-reflect the electromagnetic radiation back to the detector 16, or both, because the person 70 (also intended to represent an object) is positioned between the subset of markers 24 and the emitter 14 and/or detector 16.

The grid pattern 90 on the wall 93 may provide information not necessarily available from a plan view as shown in FIGS. 3 and 6. For example, the blockage of the retro-reflective markers 24 enables the control unit 18 to determine a height of the person 70, a profile of the person 70, or, in embodiments where there the object 32 is present, a size of the object 32, a profile of the object 32, and so forth. Such determinations may be made by the control unit 18 to evaluate whether the person 70 meets a height requirement for a ride, to evaluate whether the person 70 is associated with one or more objects 32 (e.g., bags, strollers), and may also be used to track movement of the person 70 or object 32 through the detection area 30 with a greater degree of accuracy compared to the plan view set forth in FIGS. 3 and 6. That is, the control unit 18 is better able to tie movement identified by blockage of the markers 24 to a particular person 70 by determining the person's profile, height, etc. Similarly, the control unit 18 is better able to track the movement of the object 32 through the detection area 30 by identifying the geometry of the object 32, and tying identified movement specifically to the object 32. In certain embodiments, tracking the height or profile of the person 70 may be performed by the tracking system 10 to enable the control unit 18 to provide recommendations to the person 70 based on an analysis of the person's evaluated height, profile, etc. Similar determinations and recommendations may be provided for objects 32, such as vehicles. For example, the control unit 18 may analyze a profile of guests at an entrance to a queue area for a ride. The control unit 18 may compare the overall size, height, etc., of the person 70 with ride specifications to warn individuals or provide a confirmation that they are able to ride the ride before spending time in the queue. Similarly, the control unit 18 may analyze the overall size, length, height, etc., of a vehicle to provide parking recommendations based on available space. Additionally or alternatively, the control unit 18 may analyze the overall size, profile, etc., of an automated piece equipment before allowing the equipment to perform a particular task (e.g., movement through a crowd of people).

The pattern 90 may also be positioned on both the wall 93 and the floor 92. Accordingly, the tracking system 10 may be able to receive retro-reflected electromagnetic radiation from markers 24 on the wall 93 and the floor 92, thereby enabling detection of marker blockage and monitoring of movement in three dimensions. Specifically, the wall 93 may provide information in a height direction 94, while the floor 92 may provide information in a depth direction 96. Information from both the height direction 94 and the depth direction 96 may be correlated to one another using information from a width direction 98, which is available from both the plan and elevational views.

Indeed, it is now recognized that if two objects 32 or people 70 overlap in the width direction 98, they may be at least partially resolved from one another using information obtained from the depth direction 96. Further, it is also now recognized that the use of multiple emitters 14 and detectors 16 in different positions (e.g., different positions in the width direction 98) may enable resolution of height and profile information when certain information may be lost or not easily resolved when only one emitter 14 and detector 16 are present. More specifically, using only one emitter 14 and detector 16 may result in a loss of certain information if there is overlap between objects 32 or people 70 in the width direction 98 (or, more generally, overlap in a direction between the markers 24 on the wall 93 and the detector 16). However, embodiments using multiple (e.g., at least two) detectors 16 and/or emitters 14 may cause distinct retro-reflective patterns to be produced by the markers 24 and observed from the detectors 16 and/or emitters 14 positioned at different perspectives. Indeed, because the markers 24 are retro-reflective, they will retro-reflect electromagnetic radiation back toward the electromagnetic radiation source, even when multiple sources emit at substantially the same time. Thus, electromagnetic radiation emitted from a first of the emitters 14 from a first perspective will be retro-reflected back toward the first of the emitters 14 by the markers 24, while electromagnetic radiation emitted from a second of the emitters 14 at a second perspective will be retro-reflected back toward the second of the emitters 14 by the markers 24, which enables multiple sets of tracking information to be produced and monitored by the control unit 18.

It is also now recognized that the retro-reflective markers 24 on the wall 93 and the floor 92 may be the same, or different. Indeed, the tracking system 10 may be configured to determine which electromagnetic radiation was reflected from the wall 93 versus which electromagnetic radiation was reflected from the floor 92 using a directionality of the retro-reflected electromagnetic radiation from the wall 93 and the floor 92. In other embodiments, different materials may be used for the markers 24 so that, for example, different wavelengths of electromagnetic radiation may be reflected back toward the emitter 14 and detector 16 by the different materials. As an example, the retro-reflective markers 24 on the floor 92 and the wall 93 may have the same retro-reflective elements, but different layers that act to filter or otherwise absorb portions of the emitted electromagnetic radiation so that electromagnetic radiation reflected by the retro-reflective markers 24 on the floor 92 and wall 93 have characteristic and different wavelengths. Because the different wavelengths would be retro-reflected, the detector 16 may detect these wavelengths and separate them from ambient electromagnetic radiation, which is filtered by filter elements within the detector 16.

Figure 8:
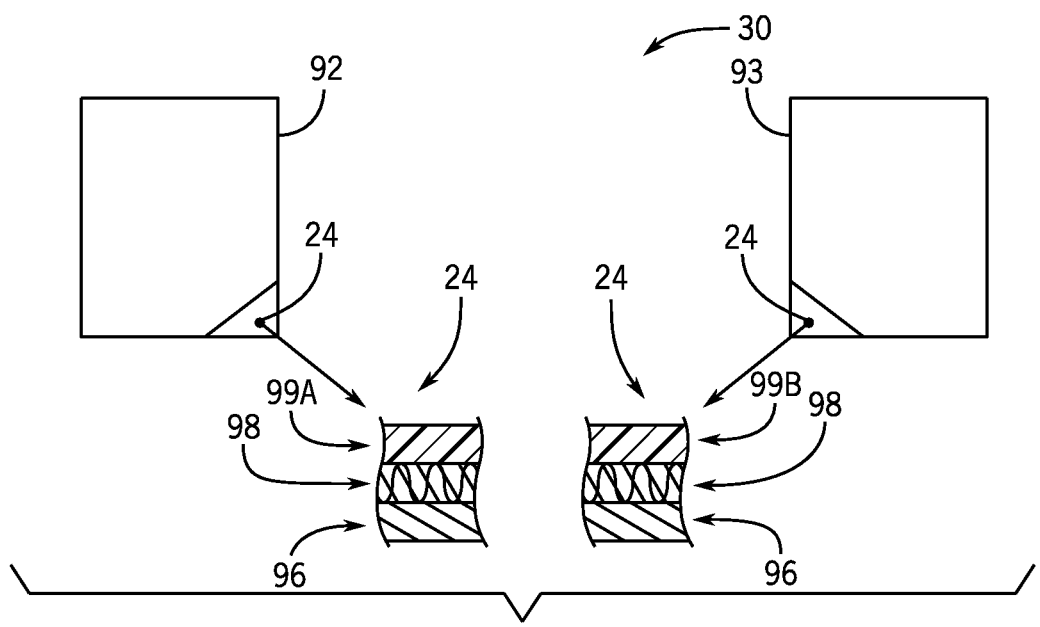
FIG. 8 illustrates cross-sections of retro-reflective markers having different coatings to enable different wavelengths of electromagnetic radiation to be reflected back toward the detector of the tracking system of FIG. 1, in accordance with an embodiment of the present disclosure.

To help illustrate, FIG. 8 depicts expanded cross-sectional views of example retro-reflective markers 24 disposed on the floor 92 and the wall 93 within the detection area 30. The markers 24 on the floor 92 and the wall 93 each include a reflective layer 96 and a retro-reflective material layer 98, which may be the same or different for the floor 92 and wall 93. In the illustrated embodiment, they are the same. During operation, electromagnetic radiation emitted by the emitter 14 may traverse a transmissive coating 99 before striking the retro-reflective material layer 98. Accordingly, the transmissive coating 99 may be used to adjust the wavelengths of electromagnetic radiation that are retro-reflected by the markers. In FIG. 8, the markers 24 on the floor 92 include a first transmissive coating 99A, which is different than a second transmissive coating 99B in the markers 24 on the wall 93. In certain embodiments, different optical properties between the first and second transmissive coatings 99A, 99B may cause a different bandwidth of electromagnetic radiation to be reflected by the markers 24 on the floor 92 and the markers 24 on the wall 93. While presented in the context of being disposed on the floor 92 and the wall 93, it should be noted that markers 24 having different optical properties may be used on a variety of different elements within the amusement park, such as on people and environmental elements, people and moving equipment, and so on, to facilitate separation for processing and monitoring by the control unit 18.

Any one or a combination of the techniques set forth above may be used to monitor a single object or person, or multiple objects or people. Indeed, it is presently recognized that a combination of multiple retro-reflective marker grids (e.g., on the floor 92 and wall 93 as set forth above), or a combination of one or more retro-reflective marker grids and one or more tracked retro-reflective markers 24 fixed on a movable object or person, may be utilized to enable three-dimensional tracking, even when only one detector 16 is utilized. Further, it is also recognized that using multiple retro-reflective markers 24 on the same person or object may enable the tracking system 10 to track both position and orientation.

Figure 7:
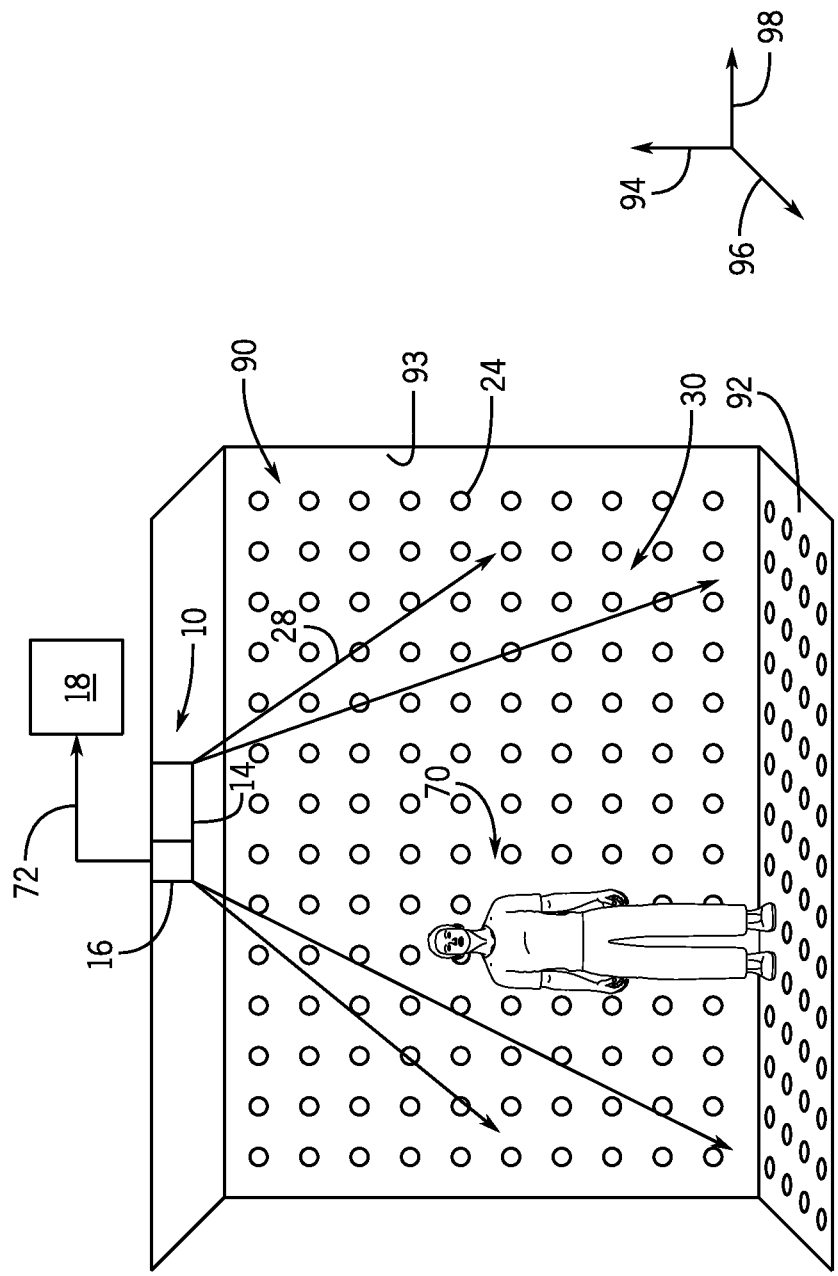
FIG. 7 is an elevational view of a room with a grid pattern of retro-reflective markers disposed on a wall and a floor of the room for tracking a position of people and objects in the room via the tracking system of FIG. 1, in accordance with an embodiment of the present disclosure.

In this regard, FIG. 9A illustrates an embodiment of the object 26 having multiple retro-reflective markers 24 positioned on different faces of the object 26. Specifically, in the illustrated embodiment, the retro-reflective markers 24 are disposed on three different points of the object 26 corresponding to three orthogonal directions (e.g., X, Y, and Z axes) of the object 26. However, it should be noted that other placements of the multiple retro-reflective markers 24 may be used in other embodiments. In addition, the tracking depicted in FIG. 9A may be performed as generally illustrated, or may also utilize a grid of the retro-reflective markers 24 as shown in FIG. 7.

As noted above, the tracking system 10 may include multiple detectors 16 configured to sense the electromagnetic radiation that is reflected back from the object 26, for example. Each of the retro-reflective markers 24 disposed on the object 26 may retro-reflect the emitted electromagnetic radiation beam 28 at a particular, predetermined frequency of the electromagnetic spectrum of the electromagnetic radiation beam 28. That is, the retro-reflective markers 24 may retro-reflect the same or different portions of the electromagnetic spectrum, as generally set forth above with respect to FIG. 8.

The control unit 18 is configured to detect and distinguish the electromagnetic radiation reflected at these particular frequencies and, thus, to track the motion of each of the separate retro-reflective markers 24. Specifically, the control unit 18 may analyze the detected locations of the separate retro-reflective markers 24 to track the roll (e.g., rotation about the Y axis), pitch (e.g., rotation about the X axis), and yaw (e.g., rotation about the Z axis) of the object 26. That is, instead of only determining the location of the object 26 in space relative to a particular coordinate system (e.g., defined by the detection area 30 or the detector 16), the control unit 18 may determine the orientation of the object 26 within the coordinate system, which enables the control unit 18 to perform enhanced tracking and analyses of the movement of the object 26 in space and time through the detection area 30. For instance, the control unit 18 may perform predictive analyses to estimate a future position of the object 26 within the detection area 30, which may enable enhanced control over the movement of the object 26 (e.g., to avoid collisions, to take a particular path through an area).

In certain embodiments, such as when the object 26 is a motorized object, the tracking system 10 may track the position and orientation of the object 26 (e.g., a ride vehicle, an automaton, an unmanned aerial vehicle) and control the object 26 to proceed along a path in a predetermined manner. The control unit 18 may, additionally or alternatively, compare the results to an expected position and orientation of the object 26, for example to determine whether the object 26 should be controlled to adjust its operation, and/or to determine whether the object 26 is operating properly or is in need of some sort of maintenance. In addition, the estimated position and orientation of the object 26, as determined via the tracking system 10, may be used to trigger actions (including preventing certain actions) by other amusement park equipment 12 (e.g., show effects). As one example, the object 26 may be a ride vehicle and the amusement park equipment 12 may be a show effect. In this example, it may be desirable to only trigger the amusement park equipment 12 when the object 26 is in the expected position and/or orientation.

Continuing with the manner in which tracking in three spatial dimensions may be preformed, FIG. 9B depicts an example of the object having a first marker 24A, a second marker 24B, and a third marker 24C positioned in similar positions as set forth in FIG. 9A. However, from the perspective of a single one of the detectors 16, the detector 16 may see a two-dimensional representation of the object 16, and the markers 24A, 24B, 24C. From this first perspective (e.g., overhead or bottom view), the control unit 18 may determine that the first and second markers 24A, 24B are separated by a first observed distance d1, the first and third markers 24A, 24C are separated by a second observed distance d2, and the second and third markers 24B, 24C are separated by a third observed distance d3. The control unit 18 may compare these distances to known or calibrated values to estimate an orientation of the object 26 in three spatial dimensions.

Moving to FIG. 9C, as the object 26 rotates, the detector 16 (and, correspondingly, the control unit 18) may detect that the apparent shape of the object 26 is different. However, the control unit 18 may also determine that the first and second markers 24A, 24B are separated by an adjusted first observed distance d1', the first and third markers 24A, 24C are separated by an adjusted second observed distance d2', and the second and third markers 24B, 24C are separated by an adjusted third observed distance d3'. The control unit 18 may determine a difference between the distances detected in the orientation in FIG. 9B and the distances detected in the orientation in FIG. 9C to determine how the orientation of the object 26 has changed to then determine the orientation of the object 26. Additionally or alternatively, the control unit 18 may compare the adjusted observed distances d1', d2', d3' resulting from rotation of the object 26 to stored values to estimate an orientation of the object 26 in three spatial dimensions, or to further refine an update to the orientation determined based on the change between the distances in FIGS. 9B and 9C.

As set forth above, present embodiments are directed to, among other things, the use of the disclosed tracking system 10 to track objects and/or people within an amusement park environment. As a result of this tracking, the control unit 18 may, in some embodiments, cause certain automated functions to be performed within various subsystems of the amusement park. Accordingly, having described the general operation of the disclosed tracking system 10, more specific embodiments of tracking and control operations are provided below to facilitate a better understanding of certain aspects of the present disclosure.

Figure 10:
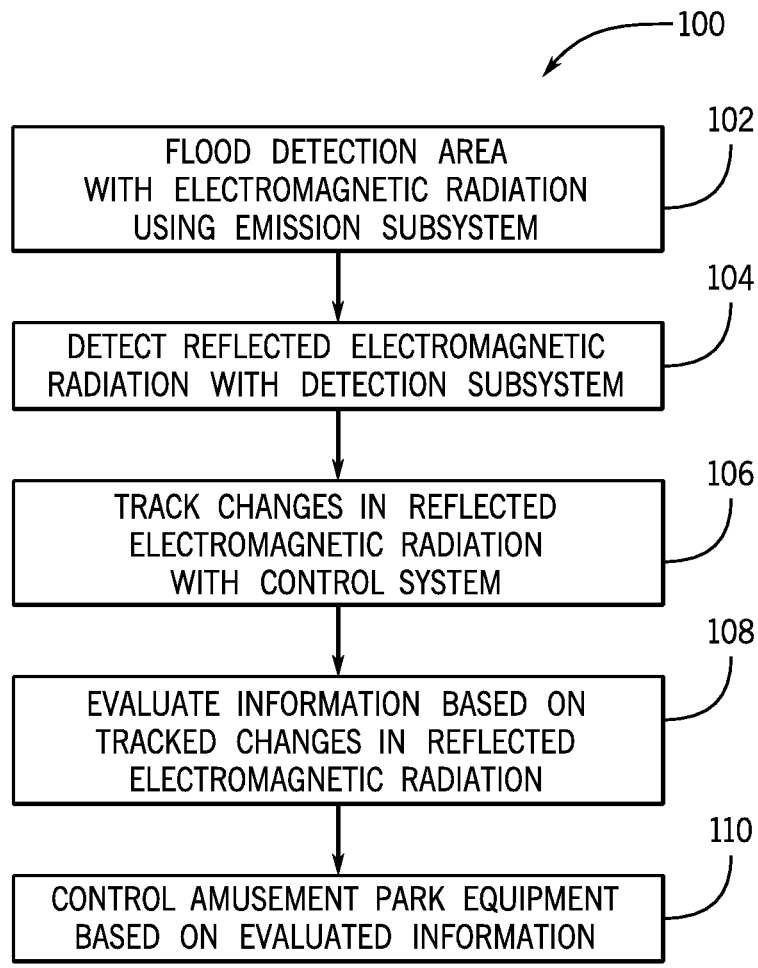
FIG. 10 is a flow diagram illustrating an embodiment of a method of tracking reflection and controlling amusement park elements based on the tracked reflection using the tracking system of FIG. 1, in accordance with an embodiment of the present disclosure.

Moving now to FIG. 10, an embodiment of a method 100 of monitoring changes in reflected electromagnetic radiation to track movement of a target and control amusement park equipment as result of this monitoring is illustrated as a flow diagram. Specifically, the method 100 includes the use of one or more of the emitters 14 (e.g., an emission subsystem) to flood (block 102) the detection area 30 with electromagnetic radiation (e.g., electromagnetic radiation beam 28) using the emission subsystem. For instance, the control unit 18 may cause one or more of the emitters 14 to intermittently or substantially continuously flood the detection area 30 with emitted electromagnetic radiation. Again, the electromagnetic radiation may be any appropriate wavelength that is able to be retro-reflected by the retro-reflective markers 24. This includes, but is not limited to, ultraviolet, infrared, and visible wavelengths of the electromagnetic spectrum. It will be appreciated that different emitters 14, and in some embodiments, different markers 24, may utilize different wavelengths of electromagnetic radiation to facilitate differentiation of various elements within the area 30.

After flooding the detection area 30 with electromagnetic radiation in accordance with the acts generally represented by block 102, the method 100 proceeds to detecting (block 104) electromagnetic radiation that has been reflected from one or more elements in the detection area 30 (e.g., the retro-reflective markers 24). The detection may be performed by one or more of the detectors 16, which may be positioned relative to the emitter 14 as generally set forth above with respect to FIGS. 1 and 2. As described above and set forth in further detail below, the features that perform the detection may be any appropriate element capable of and specifically configured to capture retro-reflected electromagnetic radiation and cause the captured retro-reflective electromagnetic radiation to be correlated to a region of the detector 16 so that information transmitted from the detector 16 to the control unit 18 retains position information regarding which of the markers 24 reflected electromagnetic radiation to the detector 16. As one specific but non-limiting example, one or more of the detectors 16 (e.g., present as a detection subsystem) may include charge coupled devices within an optical camera or similar feature.

As described above, during the course of operation of the tracking system 10, and while people 70 and/or objects 26, 32 are present within the detection area 30, it may be expected that changes in reflected electromagnetic radiation will occur. These changes may be tracked (block 106) using a combination of the one or more detectors 16 and routines performed by processing circuitry of the control unit 18. As one example, tracking changes in the reflected electromagnetic radiation in accordance with the acts generally represented by block 106 may include monitoring changes in reflected patterns from a grid over a certain period of time, monitoring changes in spectral signatures potentially caused by certain absorptive and/or diffusively or specularly reflective elements present within the detection area 30, or by monitoring certain moving retro-reflective elements. As described below, the control unit 18 may be configured to perform certain types of tracking of the changes in reflection depending on the nature of the control to be performed in a particular amusement park attraction environment.

At substantially the same time or shortly after tracking the changes in reflected electromagnetic radiation in accordance with the acts generally represented by block 106, certain information may be evaluated (block 108) as a result of these changes by the control unit 18. In accordance with one aspect of the present disclosure, the evaluated information may include information pertaining to one or more individuals (e.g., amusement park guests, amusement park employees) to enable the control unit 18 to monitor movement and positioning of various individuals, and/or make determinations relating to whether the person is appropriately positioned relative to certain amusement park features. In accordance with another aspect of the present disclosure, the information evaluated by the control unit 18 may include information relating to objects 26, 32, which may be environmental objects, moving objects, the amusement park equipment 12, or any other device, item, or other feature present within the detection area 30. Further details regarding the manner in which information may be evaluated is described in further detail below with reference to specific examples of amusement park equipment controlled at least in part by the control unit 18.

As illustrated, the method 100 also includes controlling (block 110) amusement park equipment based on the information (e.g., monitored and analyzed movement of people and/or objects) evaluated in accordance with acts generally represented by block 108. It should be noted that this control may be performed in conjunction with concurrent tracking and evaluation to enable the control unit 18 to perform many of the steps set forth in method 100 on a substantially continuous basis and in real-time (e.g., on the order of the rate of capture of the detector 16), as appropriate. In addition, the amusement park equipment controlled in accordance with the acts generally represented by block 110 may include automated equipment such as ride vehicles, access gates, point-of-sale kiosks, informational displays, or any other actuatable amusement park device. As another example, the control unit 18 may control certain show effects such as the ignition of a flame or a firework as a result of the tracking and evaluation performed in accordance with method 100. More details relating to certain of these specific examples are described in further detail below.

Figure 11:
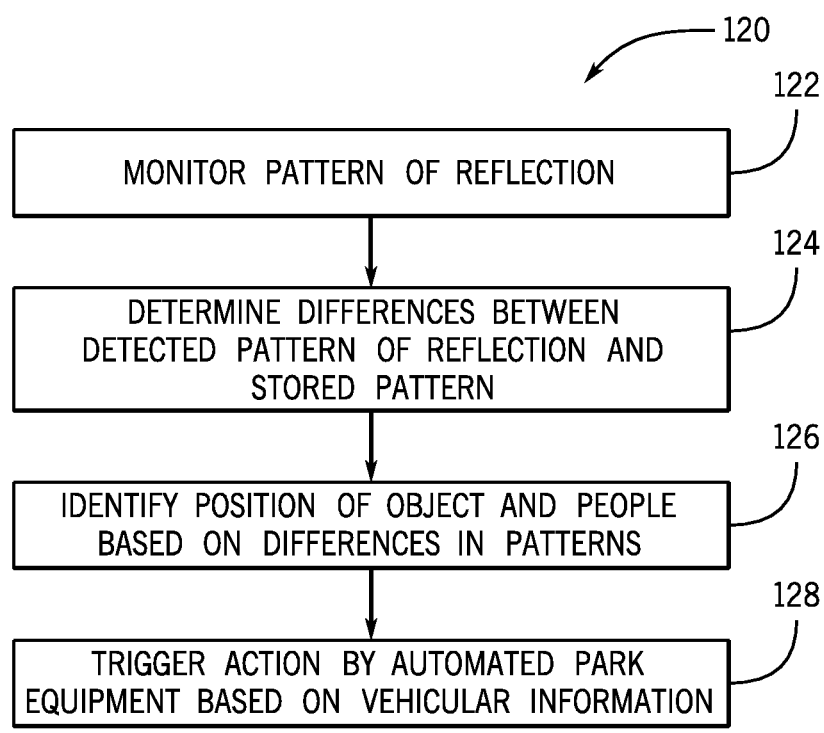
FIG. 11 is a flow diagram illustrating an embodiment of a method of tracking retro-reflection to evaluate information relating to machines and people, and controlling amusement park elements based on the evaluated information using the tracking system of FIG. 1, in accordance with an embodiment of the present disclosure.

In accordance with a more particular aspect of the present disclosure, the present embodiments relate to the tracking of certain objects 26, 32 and people 70 within an amusement park attraction area. In certain embodiments, park equipment may be controlled based on this information. The amusement park equipment controlled in accordance with present embodiments may include, by way of example, automatons, automated vehicles, unmanned aerial vehicles, show equipment (e.g., flames, fireworks), and so forth. In accordance with this aspect, FIG. 11 illustrates an embodiment of a method 120 for monitoring patterns of reflection to track and control automated amusement park equipment as a result of monitoring either or both of people within an amusement park area.

As illustrated, the method 120 includes monitoring (block 122) a pattern of reflection. The monitoring performed in accordance with the acts generally represented by block 122 may be considered to be performed using the tracking system 10, either alone or in combination with other features of an amusement park control system. To facilitate discussion, the disclosure set forth below may refer to a control system that is communicatively coupled to a number of different devices including the tracking system 10, as well as the amusement park equipment to be controlled.

Monitoring the pattern of reflection in accordance with block 122 may include monitoring a number of different features in the manner described above with respect to FIGS. 3-9. Accordingly, the monitoring performed in accordance with block 122 may include monitoring a pattern generated over time by a marker being tracked within the detection area 30, or may include monitoring a pattern of reflection generated at any one time instance by a plurality of retro-reflective markers 24 positioned within the detection area 30 (e.g., a grid), or a combination of these techniques. Further still, the monitoring performed in accordance with block 122 may not involve the use of the markers 24, such as in situations where the tracking system 10 is employed to track specular and/or diffuse reflection. In some embodiments, a combination of these patterns may be monitored in accordance with block 122, for example when one or more of the retro-reflective markers 24 is positioned on the person 70, while other retro-reflective markers 24 are positioned on other objects 32, the wall 93, the floor 92, or any other environmental feature in the detection area 30.

The method 120 also includes determining (block 124) differences between detected patterns of reflection and stored patterns of reflection. For example, a detected pattern may be considered to be a pattern generated either at any one instance (e.g. using a grid) or over time by a single or multiple tracked retro-reflective markers 24. The stored patterns may be considered to represent patterns stored in the memory 22 of the control unit 18, which may be correlated to different types of information, such as behavioral information, certain types of movement, orientations, and/or locations, height or other geometric information, or the like. In one embodiment, the control unit 18 may determine differences between the detected pattern of reflection and the stored pattern of reflection to further determine whether the detected pattern correlates to a particular control action associated with stored pattern, either based on this information alone or when the information is considered in conjunction with additional a priori information (e.g., prior knowledge of a desired travel path through an amusement park, prior knowledge of the size and shape of the object 26, 32).

The method 120 may also include using the identified position to cause triggering (including preventing) of automated park equipment (block 128). For example, an identified position may cause the control unit 18 to trigger a show effect, adjust an operational parameter of a ride vehicle, adjust an orientation, speed, etc., of a motorized object (e.g., a UAV), or similar actions. Further still, where certain show effects are associated with a controlled object (e.g., a controlled ride vehicle), the show effects may be triggered based, at least in part, on a position, orientation, speed, etc., of the controlled object.

Figure 12:
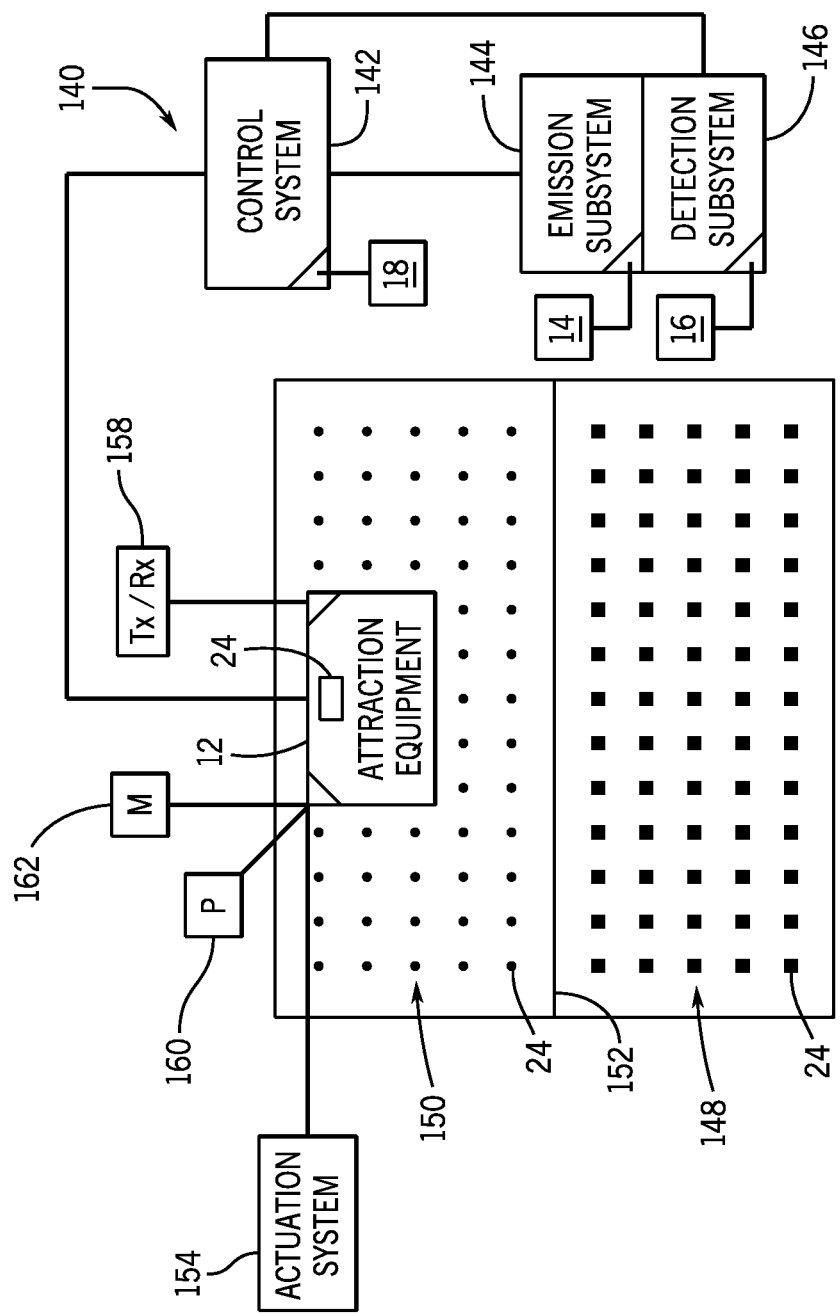
FIG. 12 is a schematic view of an embodiment of an amusement park attraction and control system configured to track attraction equipment in relation to other machines or people, in accordance with an embodiment of the present disclosure.

An example embodiment of an amusement park attraction and control system 140 that may perform all or part of method 120 is depicted in FIG. 12. Specifically, the system 140 of FIG. 12 includes a control system 142, which may include processing circuitry configured to perform functions that are specific to a particular park attraction and coordinate those actions with the tracking system 10. Indeed, as illustrated, the control system 142 may include the control unit 18. As also illustrated, the control system 142 is communicatively coupled to an emission subsystem 144, which includes one or more of the emitters 14, and a detection subsystem 146, which includes one or more of the detectors 16.

Using information obtained from the detection subsystem 146, as well as routines and reference information stored in the processing circuitry of the control unit 18, the control system 142 may track, and in some embodiments, control automated attraction equipment 12 to which it is communicatively and/or operatively coupled. The particular embodiment of the amusement park attraction and control system 140 illustrated in FIG. 12 is configured to perform various monitoring and control actions based at least in part on monitoring patterns of reflection obtained from retro-reflective markers 24 positioned on static and/or moving elements of the detection area 30. As an example, the detection area 30 may represent an attraction area of an amusement park where automated mobile objects are configured to move about the attraction area for entertainment purposes, interactivity purposes, and so forth. The operation of the attraction equipment 12 is described in further detail below.

In the particular embodiment illustrated in FIG. 12, the retro-reflective markers 24 may be considered to be divided into a first subset 148 and a second subset 150. Each marker 24 of the first subset 148 has a distance from the attraction equipment 12 that is at or below a threshold distance from the attraction equipment 12. Indeed, the first subset 148 of retro-reflective markers 24 may be considered to represent a proximity region of the attraction equipment 12, meaning that any object or person positioned over one or more of the retro-reflective markers 24 of the first subset 148 may be considered to be positioned in close proximity to the attraction equipment 12. On the other hand, the markers 24 of the second subset 150 have a distance that is outside of the predetermined distance defining the first subset 148. Accordingly, the second subset 150 of markers 24 may be considered to be beyond (e.g., outside of) a proximity boundary 152 associated with the attraction equipment 12. Any object or person positioned over the second subset 150 may therefore be considered to not be in a close proximity to the attraction equipment 12.

In accordance with an aspect of the present disclosure, the proximity boundary 152 may be determined based on the particular configuration of the attraction equipment 12. For example, if the attraction equipment 12 is a motorized or movable object, the proximity boundary 152 may move with the attraction equipment. Further, the degree of control of the attraction equipment 12 (e.g., the ability to perform fine control of movement of the attraction equipment 12) may also at least partially determine the distance of the proximity boundary 152 from the attraction equipment 12.

In operation, the control system 142 may monitor, using the emission subsystem 144 and the detection subsystem 146, blockage (occlusion) of certain of the retro-reflective markers 24. As one example, the control system 142 may monitor the first subset 148 of markers 24 and, as a result of any identification that one or more of the markers 24 of the first subset 148 is blocked by an object or person, may cause the attraction equipment 12 to trigger (e.g., move). This triggering may, additionally or alternatively, be triggering of a show effect, triggering of an automated gate, or similar action. However, the triggering of the attraction equipment 12 may not necessarily denote triggering of an amusement feature. For instance, triggering of the attraction equipment 12, in some instances, may cause certain fail-safes to be engaged that prevent certain actions by the attraction equipment 12. One example of such a control action might be to prevent movement of the attraction equipment 12 (e.g., prevention of movement of a robot). For example, as illustrated in FIG. 12, the attraction equipment 12 may include or be associated with an actuation system 154, which may include various electromechanical drives, brakes, rotors, pumps, propellant release systems, or any other system capable of producing a motive force to move the attraction equipment 12 through the detection area 30.

The attraction equipment 12 may, in some embodiments, include certain types of circuitry that facilitates communication and processing. For instance, while the attraction equipment 12 is shown as being in communication with the control system 142 via a communication line 156, the communication between these features may be wired or wireless. Accordingly, in certain embodiments, the attraction equipment 12 may include, for example, a transceiver 158 configured to enable the transmission and receipt of signals from and to the attraction equipment 12, respectively. The attraction equipment 12 may also include processing circuitry configured to process input signals and carry out instructions as a result of this processing. The processing circuitry is illustrated as including one or more processors 160 and one or more memory 162.

As an example, the control system 142 may relay position, orientation, and/or velocity information and instructions to the attraction equipment 12 via the transceiver 158 (and communication equipment associated with the control system 142), and the attraction equipment 12 may process this information and instructions to make position, orientation, and/or velocity adjustments using the actuation system 154.

Figure 13:
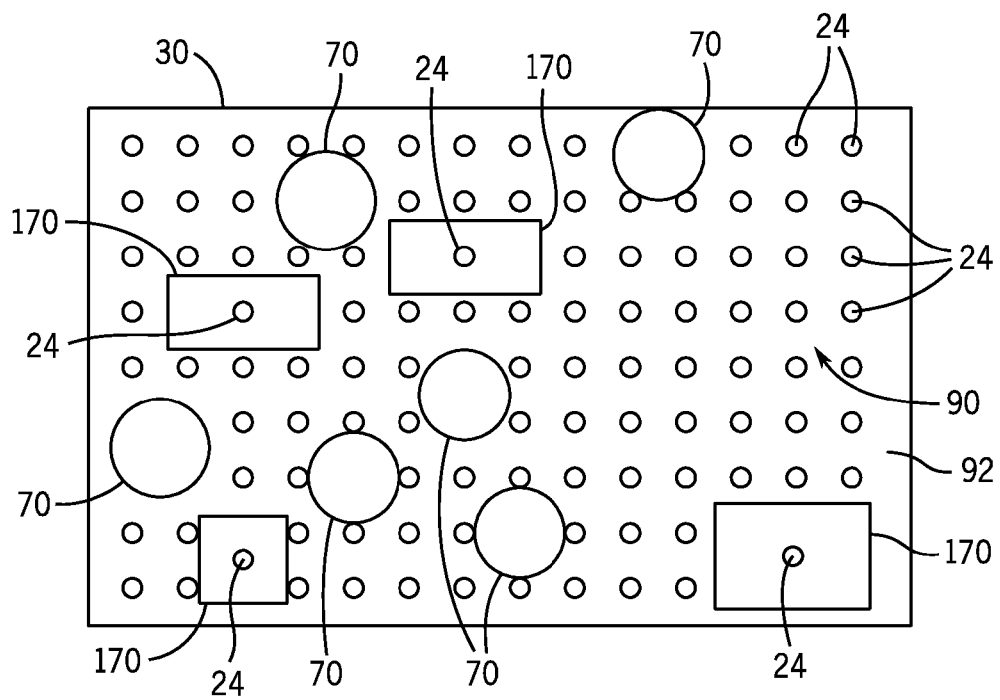
FIG. 13 is an overhead schematic view of a room with a grid pattern of retro-reflective markers for tracking a position of people and machines in the room via the tracking system of FIG. 1, in accordance with an embodiment of the present disclosure.

As set forth above, the presently disclosed tracking system 10 may be used to track one or several targets within the detection area 30, including multiple people 70 and multiple objects 26, 32 alone and in relation to each other and the amusement park equipment 12. Again, one or more emitters 14, one or more detectors 16, and one or more control units 18 may be utilized in combination with one another and in combination with the control system 142 to perform such tracking. FIG. 13 schematically illustrates an overhead view of an embodiment of the detection area 30 including the floor 92 with an embodiment of the grid 90 applied thereon (see, e.g., FIGS. 5 and 7). Specifically, FIG. 13 schematically illustrates the manner in which the tracking system 10 tracks the position and movement of both machines 170 (objects 26, 32) and people 70 within the detection area 30. The machines 170 may be considered to represent a particular embodiment of the amusement park equipment 12. For clarity, the people 70 are depicted as circles while the machines 170 are depicted as polygons.

The tracking schematically illustrated in FIG. 13 may be used in areas where the people 70 are expected to interact with or in close proximity to machines 170, such as a warehouse or factory floor, or an amusement attraction with interactive show elements and equipment. For instance, in a parade show, various robots may move about an amusement area, at least a part of which is the detection area 30. People 70 watching the parade may also be in the detection area 30. Similarly, in a factory setting, the people 70 may move about the floor 92 while the machines 170 are present.

In a typical parade or similar setting, people would remain behind a physical barrier that blocks the machines 170 and/or the people 70 from getting within a certain proximity of one another. However, it is now recognized that it may be desirable to remove physical barriers between the people 70 and the moving machinery 170. It is also now recognized that a distance barrier may be used to replace a physical barrier to enable the ability for the machines 170 and the control system 142 to react in time to be as effective as a physical barrier.

It is also now recognized that large physical barriers between machines 170 and people 70 can become pinch points for flow (e.g., people and/or machine traffic). In accordance with an embodiment of the present disclosure, the control system 142 may utilize built-in show reasons (e.g., reasons tied to the normal course of an entertainment show) to have a particular amount of space when the machine 170 is performing quick, complex movements, and then allow contact at other times when the machines 170 are at a resting state.

In an alternative setting, people 70 may work in conjunction with machines 170 (e.g., robots) in a factory setting to carry out certain tasks. In this case, the detection area 30 would be considered to represent a factory floor, for example. Typically, machinery and other equipment would be at least partially controlled by a human operator, for example as a fail-safe. It is now recognized that the present embodiments may be used to reduce the reliance on human operators to control equipment, which may enhance the efficiency of, for instance, manufacturing processes, inventory processes, and the like.

In the illustrated embodiment, the tracking system 10 is configured to track movement and position of the people 70 and the machines 170, and functions to act as all or a part of a machine guard that keeps the machines 170 from colliding with the people 70 within the detection area 30. To act as a machine guard system, the tracking system 10 may be configured to determine the presence and track the location of the people 70 and the machines 170 on the floor 92, and evaluate their positions relative to one another. In the illustrated embodiment, for example, the detection area 30 includes the grid pattern 90 of retro-reflective markers 24, as described in detail above with reference to FIGS. 5 and 7.

The control unit 18 may, for example, evaluate occlusion of the retro-reflective markers 24 by comparing reflective patterns currently detected to stored patterns to determine whether the occlusion is characteristic of one or a group of the people 70 or is characteristic of one or a group of the machines 170. For instance, the control unit 18 may evaluate a geometry of the feature causing occlusion of certain of the retro-reflective markers 24, and determine whether the geometry correlates more closely to the person 70 or the machine 170 (or groups thereof).

Although the illustrated embodiment includes the retro-reflective markers 24 disposed in a pattern on the floor 92, other embodiments may utilize different methods for detecting the presence of the people 70 and the machines 170 moving about the floor 92. For example, retro-reflective markers 24 may be disposed on the clothing of the people 70 (see, e.g., FIG. 3), or the tracking system 10 may be configured to identify and determine the location of the people 70 and/or the machines 170 without the use of retro-reflective markers 24 at all, as discussed with respect to FIG. 5.

The tracking system 10 may provide control signals to the various machines 170 that are operating on the floor based on the detected positions and movements of the people 70 on the floor (e.g., based on vector magnitude, vector orientation, and/or vector sense of the movement). As one example, the machines 170 may receive go/no-go signals from the control system 142 (e.g., control unit 18 of the tracking system 10). That is, the machines 170 may be operating to move along certain predetermined trajectories and perform desired functions according to a preprogrammed routine stored in the memory 162 (see FIG. 12). When the tracking system 10 detects a person 70 or another machine 170 about to cross the path of one of these machines 170, the tracking system may send a "no-go" signal to the machine 170, causing the machine 170 to stop its routine and wait until a go signal is provided again (e.g., remain stationary). Once the person 70 is out of the path of the machine 170, the control unit 18 may then send a "go" signal prompting the machine 170 to continue carrying out its intended operation (e.g., resume movement). In other embodiments, the machines 170 may receive specific dynamic instructions from the control system 142 (e.g., control unit 18) based on the detected positions and movements of the people 70 on the floor. For example, the tracking system 10 may prompt the machines 170 to switch from one operation to another or to redirect its trajectory along the floor 92 in response to the locations of the people 70 detected by the tracking system 10.

As also illustrated, certain of the retro-reflective markers 24 may be positioned on the machines 170 to provide additional tracking functionality and information. For example, a combination of grid occlusion information and tracking information relating to the moving retro-reflective markers 24 on the machines 170 may enable greater degrees of freedom of movement for the machines 170, as well as greater control over their motion by the control system 142. As one example, the retro-reflective markers 24 on the machines 170 may be configured to reflect the electromagnetic radiation beam 28 (or other electromagnetic radiation) back to the detector 16 (or group of detectors 16) at a different frequency than that of the retro-reflective markers 24 disposed on the floor using different retro-reflective elements different coatings, etc.

Figure 14:
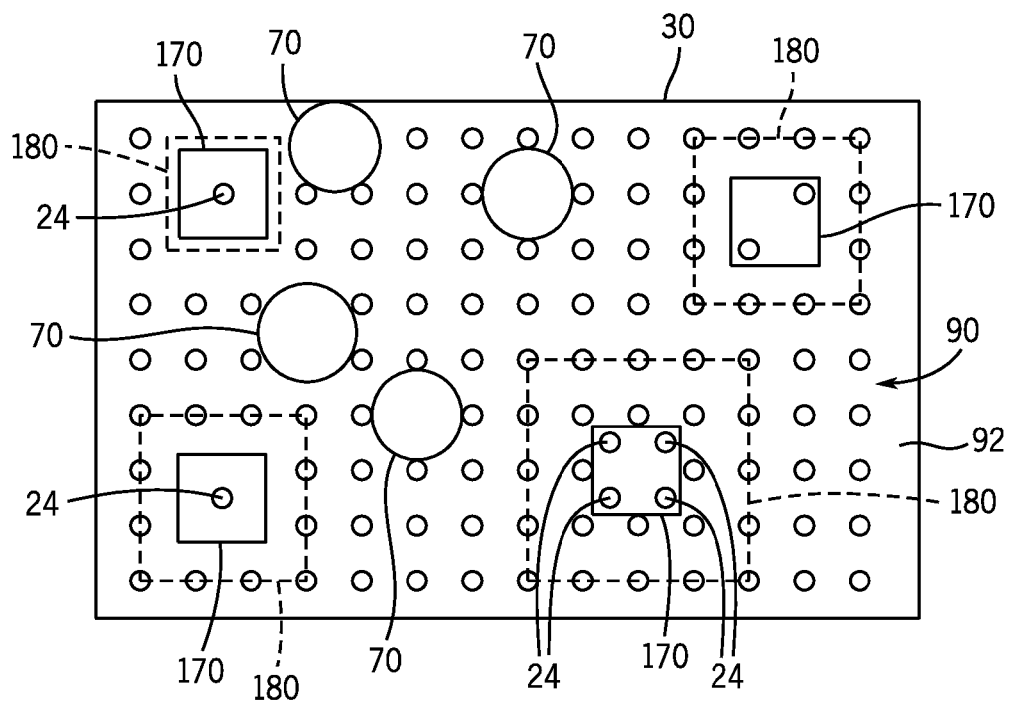
FIG. 14 is an overhead schematic view of a room with a grid pattern of retro-reflective markers for tracking a position of people relative to a boundary applied to machines via the tracking system of FIG. 1, in accordance with an embodiment of the present disclosure.

As set forth above with respect to FIG. 12, the tracking system 10 may monitor the location of people 70 and/or objects 26, 32 relative to certain attraction equipment 12, and may establish the proximity boundary 152 relative to the attraction equipment 12 that determines, for example, whether certain control actions might need to be performed. As illustrated in FIG. 14, multiple such proximity boundaries, illustrated as boundary regions 180, may be applied by the tracking system 10 around one or more of the machines 170 on the floor 92. The boundary regions 180 may each extend a certain distance away from the outer perimeter of a respective one of the machines 170, which are tracked by the tracking system 10. In accordance with this aspect of the present disclosure, it is now recognized that the boundary regions 180 may, in certain embodiments, altogether replace physical boundaries between people 70 and automated machinery 170 to enhance interactivity between the people 70 and the machines 170.

In accordance with certain embodiments, the boundary regions 180 may be defined relative to the detected locations of the retro-reflective markers 24 positioned on one of the machines 170. That is, for each machine 170, one boundary region 180 may be defined relative to the retro-reflective markers 24 positioned on that same machine 170. Additionally or alternatively, the boundary regions 180 may be defined by a distance relative to the detected boundaries of the machine 170, which may be discernable based on occlusion of the grid pattern 90. Indeed, rather than a specific distance as measured in meters, for instance, the tracking system 10 may define the boundary region 180 as extending from the machines 170 by a certain number of retro-reflective markers 24 of the grid 90.

The tracking system 10 may monitor the boundary region 180 of each of the machines 170, and when one of the people 70 or another machine 170 crosses into the boundary region 180, the control unit 18 may provide control signals to the machine 170 that may instruct the machine 170 to adjust its motion (e.g., stop, redirect). In some embodiments, different ranges, shapes, or distances of the boundary regions 180 extending from the machines 170 may be applied to each of the machines 170 located on the floor 92, for example based on their size, shape, maneuvering capabilities, and so forth. However, in other embodiments, the same distance of the boundary regions 180 extending from the machines 170 may be applied to all of the machines 170 on the floor. In still further embodiments, boundary regions 180 may be applied to both the machines 170 and to the people 70, such that when the boundary region 180 of one of the machines 170 intersects the boundary region 180 of one of the people 70, the control unit 18 sends control signals to the machine 170 to divert or cease the machine's operation (e.g., movement).

As noted above with respect to FIG. 9A, the use of the grid 90 in combination with a single one of the detectors 16 may, in certain embodiments, limit the ability of the tracking system 10 to track and control movement of an object in more than two spatial dimensions. However, using multiple detectors 16 and/or using grids 90 positioned on additional features (e.g., walls 93), and/or the retro-reflective markers 24 positioned on the machines 170, may enable the tracking system 10 to monitor and control the movement of the machines 170 in three spatial dimensions. For example, in embodiments where the machines 170 are capable of moving both in the plane of the floor 92 and crosswise relative to the plane of the floor 92 (e.g., upward), the tracking system 10 may cause the machines 170 to move within the plane of the floor 92, crosswise relative to the plane of the floor 92, or a combination of these, as appropriate. In this regard, the boundary regions 180 may be applied not only in directions along the plane of the floor 92, but also in directions crosswise relative to the floor 92 so that the tracking system 10 ensures a proper amount of clearance to avoid collisions. As described in further detail below, one such machine capable of this type of motion may include an unmanned aerial vehicle (UAV) controlled by or otherwise in communication with the control system 142 and the tracking system 10.

Figure 15:
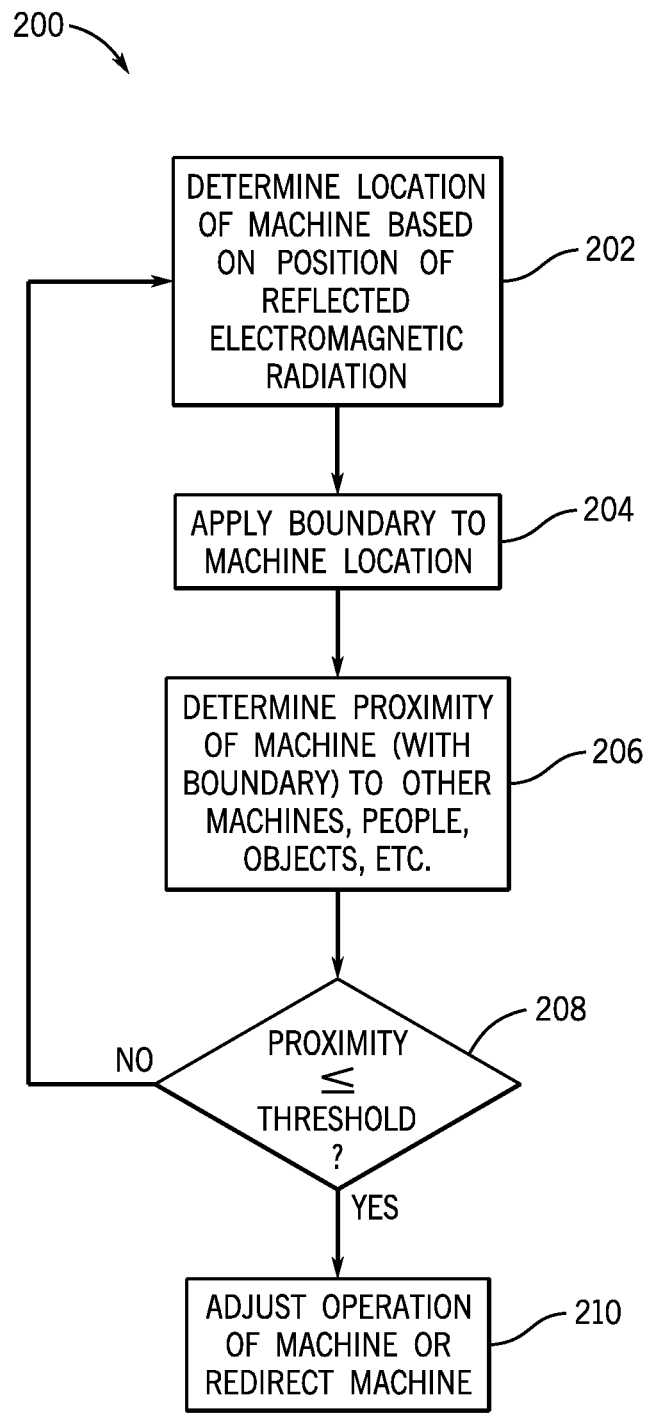
FIG. 15 is a process flow diagram of a method for controlling operation of the machines in the room of FIG. 13 via feedback from the tracking system, in accordance with an embodiment of the present disclosure.

FIG. 15 illustrates a method 200 for using the boundary regions 180 illustrated and described with reference to FIG. 14. The method 200 may include steps that are stored in the memory 22 and that are executable by one or more processors 20 of the control unit 18. The steps of the method 200 may be performed in different orders than those shown, or omitted altogether. In addition, some of the blocks illustrated may be performed in combination with each other. Further, although described from the standpoint of a single one of the machines 170, the method 200 may be applied to multiple machines 170 simultaneously.

In the illustrated embodiment, the method 200 includes determining (block 202) a location of the machine 170 based on a position of the reflected electromagnetic radiation received by the detector 16 of the tracking system 10. Again, this position may be determined based on a detection of electromagnetic radiation reflected from retro-reflective markers 24 (disposed on the floor and/or on the machine 170 itself), which includes the absence of such electromagnetic radiation where expected. In other embodiments, the control unit 18 may interpret a reflection of electromagnetic radiation received via the detector 16 as having a profile corresponding to the machine 170.

The method 200 also includes applying (block 204) a boundary (e.g., boundary region 180) to the machine location (and/or the location of the person, whichever the case may be). Again, the boundary region 180 may be applied in two or three spatial dimensions, and may involve not only scalar distance information but may, additionally or alternatively, include a number of retro-reflective makers 24 within the grid 90.

The method 200 further includes determining (block 206) a proximity of the machine 170 (with the boundary region 180) to other machines 170, people 70, stationary objects, and so forth, and any boundary regions associated with those tracked elements. The determination associated with block 206 may be performed, for example, by comparing identified locations of the two objects in question to one another, and estimating, modeling, etc., a distance between the two.

In addition, the method 200 includes determining (query 208) whether the identified proximity is less than or equal to a predetermined threshold value, which may correspond to a distance associated with the boundary region 180. Accordingly, this threshold may be the same for all of the machines 170, or the threshold may be different for certain machines 170.

If the determined proximity is less than or equal to the threshold distance, the method 200 includes adjusting (block 210) an operation of the machine 170 or redirecting the machine 170. As discussed above, the control unit 18 of the tracking system 10 may send a control signal to a controller of the machine 170 (e.g., in communication with or associated with the actuation system 154 of FIG. 12) to actuate this adjustment and/or redirection of the machine 170. If the determined proximity is greater than the threshold, however, no change is made and the method 200 repeats.

In some embodiments, there may be degrees of adjustment depending on the proximity determination associated with query 208. For instance, if the vector information associated with movement of the machine 170 suggests that the machine 170 has a certain probability of colliding with another feature or person in the detection area 30, the control unit 18 may cause a relatively minor adjustment to some aspect of the machine's movement that, over time, causes the machine 170 to avoid a collision with the other feature or person. In other words, the tracking system 10 may be involved in a certain amount of predictive control to mitigate situations where there is an affirmative answer to query 208. In this regard, other variations of the method 200 may be used in other embodiments. For example, in some embodiments, the method 200 may not include applying (block 204) the boundary 180 to the machine location, but may instead include estimating an outer edge of the machine 170 based on the electromagnetic radiation reflected onto the detector 16, and determining the proximity of this outer edge to other machines 170, people 70, and so forth.

Figure 16:
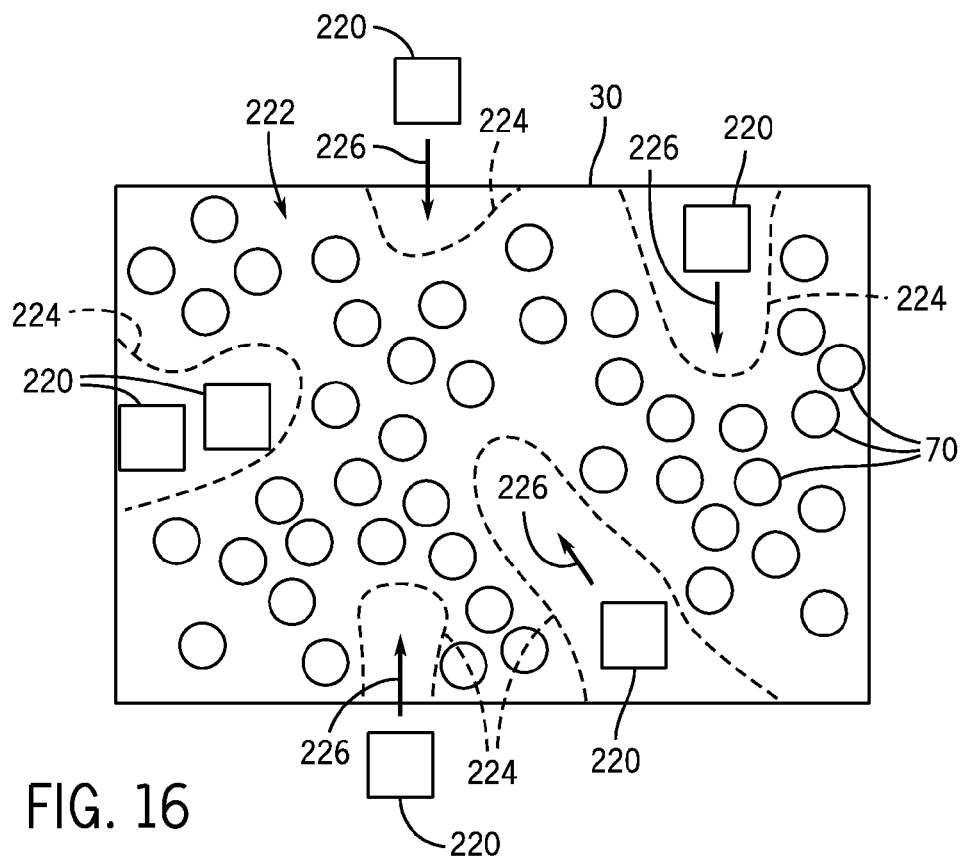
FIG. 16 is an overhead schematic view of machines being controlled to move through a crowd of people based on feedback received from the tracking system of FIG. 1, in accordance with an embodiment of the present disclosure.
Figure 17:
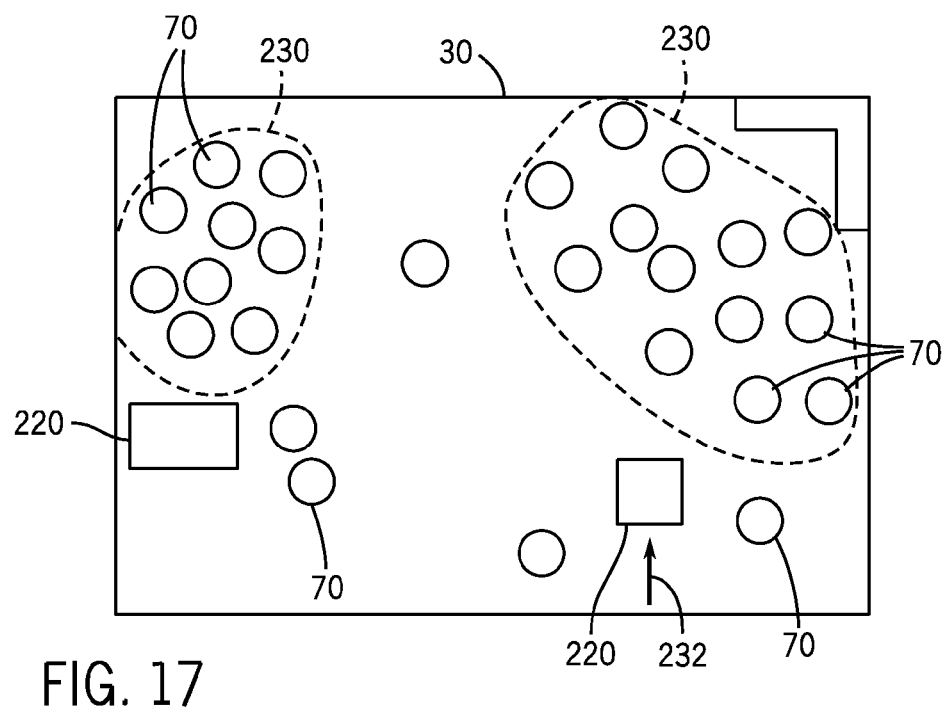
FIG. 17 is an overhead schematic view of machines being controlled to target groups of people based on feedback received from the tracking system of FIG. 1, in accordance with an embodiment of the present disclosure.

Continuing with the example noted above relating to the movement of automated park equipment in a parade context, the tracking system 10 may also evaluate information relating to groupings of people 70 relative to individual machines 170 to enhance interactivity between the people 70 and the machines 170 (e.g., by removing physical barriers or reducing reliance on them). More specifically, control system 142, using the tracking system 10, may monitor and control an interactive system where variably actuated and controlled embodiments of the amusement park equipment 12 engages with an audience. The tracking system 10 may be configured to provide control signals to the show action equipment 12, which causes actuation of the equipment 12 to engage or interact with the audience in a relatively efficient and dynamic manner. FIGS. 16 and 17 illustrate two instances in which the tracking system 10 may aid in controlling show action equipment 220 to engage with members of an audience 222. By way of non-limiting example, the show action equipment 220 may include various automated and mobile features such as robots, automatons, and the like. The audience 222 may include any number of people 70 that are standing within close proximity to one another.

As illustrated in FIG. 16, the audience 222 is dispersed throughout the detection area 30 and does not include a clearly delineable group, for example as would be expected when seating is available. The dynamic show action equipment 220 is configured to weave in and out of the audience 222, based on tracking performed in accordance with the embodiments set forth above. For instance, the tracking system 10 may identify the locations of the people 70 in the audience 222 by detecting the reflection of electromagnetic radiation off the people 70 themselves, by evaluating occlusion of the grid 90 on the floor 92, by tracking retro-reflection from retro-reflective markers 24 disposed on the people's clothing, or any combination thereof.

Using the detected positions of the people 70, the control system 142 (e.g., including tracking system 10) may identify the presence of gaps 224 that exist within the audience 222, and evaluate the gaps 224 to enable certain types of movement of the dynamic show action equipment 220. Upon identifying the gaps 224 in the audience 222 and any associated evaluation thereof (e.g., a comparison of the size of the gaps 224 to the size of the show action equipment 220, likelihood of the gaps 244 changing based on movement vectors of the people 70), the control system 142 (including tracking system 10) may provide control signals to the show action equipment 220 that actuate the show action equipment 220 to move into the gaps 224. As illustrated by arrows 226, the show action equipment 220 may move into the gaps 224 formed within the audience 222, and as the people 70 move into different positions around the show action equipment 220, the tracking system 10 may continue to dynamically determine the locations of gaps 224 in the audience 222 that the show action equipment 220 can fill. Thus, the control system 142 controls the show action equipment 220 to move in and out of open spaces, making the show action equipment 220 dynamically adapt to the audience 222.

In FIG. 17, the dynamic show action equipment 220 is configured to target, for enhanced interaction, a particular group 230 of people 70. According to the techniques disclosed above, the control system 142 (including tracking system 10) may identify the locations of the people 70 that are present in the detection area 30, by detecting the reflection of electromagnetic radiation off the people 70 themselves or off of retro-reflective markers 24 disposed in a pattern along the floor where the crowd people 70 are standing. Based on the detected positions of the people 70, the control system 142 (including tracking system 10) may detect the groups 230 of people 70 present within the area 30. That is, the control system 142 may determine, based on the locations of the people 70, where the people 70 are more densely gathered into groups 230 along the detection area 30. Upon identifying the groups 230, the control system 142 may provide control signals to the show action equipment 220 that actuate the show action equipment 220 to move into relatively close proximity to the groups 230. In some embodiments, the show action equipment 220 that is initially positioned away from the groups 230 may be actuated to move toward one of the identified groups 230, as illustrated by an arrow 232. In other embodiments, the control system 142 may send signals to the show action equipment 220 that is positioned nearby the identified groups 230 to trigger an effect via the show action equipment 220. When different pieces of the show action equipment 220 are positioned in certain orientations relative to one another, other actions (e.g., interactions between the pieces, effects, or stoppage) may be initiated.

It should be noted that in either form of dynamic show action equipment interaction with people 70, as illustrated in FIGS. 16 and 17, the show action equipment 220 may be controlled to maintain a desired threshold distance from the people 70 or other show action equipment 220 within the detection area 30. Specifically, the control system 142 may utilize a control scheme similar to that discussed above with reference to the method 200, for example to maintain a spatial barrier rather than a physical barrier around each piece of show action equipment 220. In some embodiments, a physical barrier may not be eliminated but may be less restrictive, allowing more enhanced interaction between the people 70 and the equipment 220.

Figure 18:
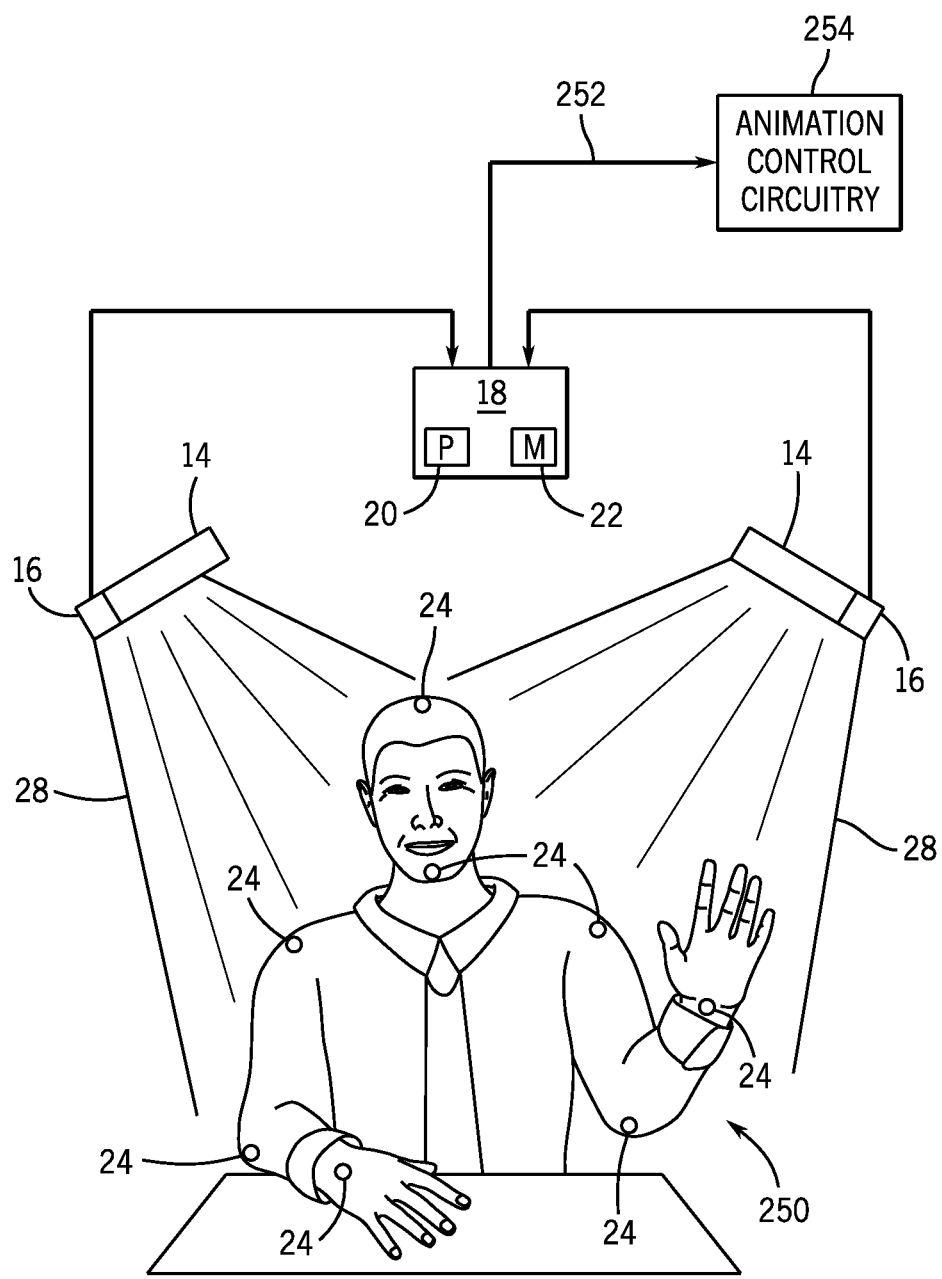
FIG. 18 is an illustration of an animated figure with retro-reflective markers disposed thereon for use with the tracking system of FIG. 1, in accordance with an embodiment of the present disclosure.

The enhanced interactivity afforded by embodiments of the disclosed tracking system 10 is not necessarily limited to the context of moving vehicles or similar equipment through a crowd of people. Indeed, the tracking system 10 may be used, in some embodiments, to provide feedback for evaluating animation quality of an animated figure, such as an automaton having human-like features. Other embodiments of an animated figure may include a robotic dog, cat, or other living organism whose movement may be mimicked using robotics. FIG. 18 illustrates an embodiment of an automaton 250 equipped with a plurality of the retro-reflective markers 24, each marker 24 of the plurality being placed at strategic points along the automaton 250 (e.g., top and bottom of the head, shoulders, elbows, and wrists). The placement of the retro-reflective markers 24 may enable tracking of the automaton's movements. As all or a portion of the automaton 250 moves through space and time, one or more of the emitters 14 may emit the electromagnetic radiation beam 28 toward the automaton 250, and one or more detectors 16 may detect the reflection of the electromagnetic radiation beam 28 off the retro-reflective markers 24. Based on data received from the one or more detectors 16, the control unit 18 may determine the approximate positions of the various limbs of the automaton 250, and compare these approximate positions to expected positions stored in the memory 22. Thus, the control unit 18 may determine whether the limbs of the automaton 250 are operating within predetermined constraints. Feedback 252 based on this analysis, or representative of raw or minimally processed data, may be provided from the control unit 18 to other amusement park processing and control features, such as animation control circuitry 254. Again, similar techniques may be applied to any desirable animated figure, not just one representative of a human. It should be noted that automatons 250 and other such moving equipment may be calibrated using techniques in accordance with present embodiments to, for example, provide consistently realistic motion. For example, the automatons 250 may be tracked according to the present techniques and matched to a movement template associated with realistic motion. The control unit 18 may perform re-calibration of the automatons 250 within the amusement park on a periodic basis according to the movement template by tracking movement of the retro-reflective markers 24 positioned on the automatons 250, and adjusting the movement of the automatons 250 so that the movements of the markers 24 substantially correspond with the movement template. Such calibration may be performed, for example, when no objects or people are expected to be located proximate or within view of the automatons 250.

Figure 19:
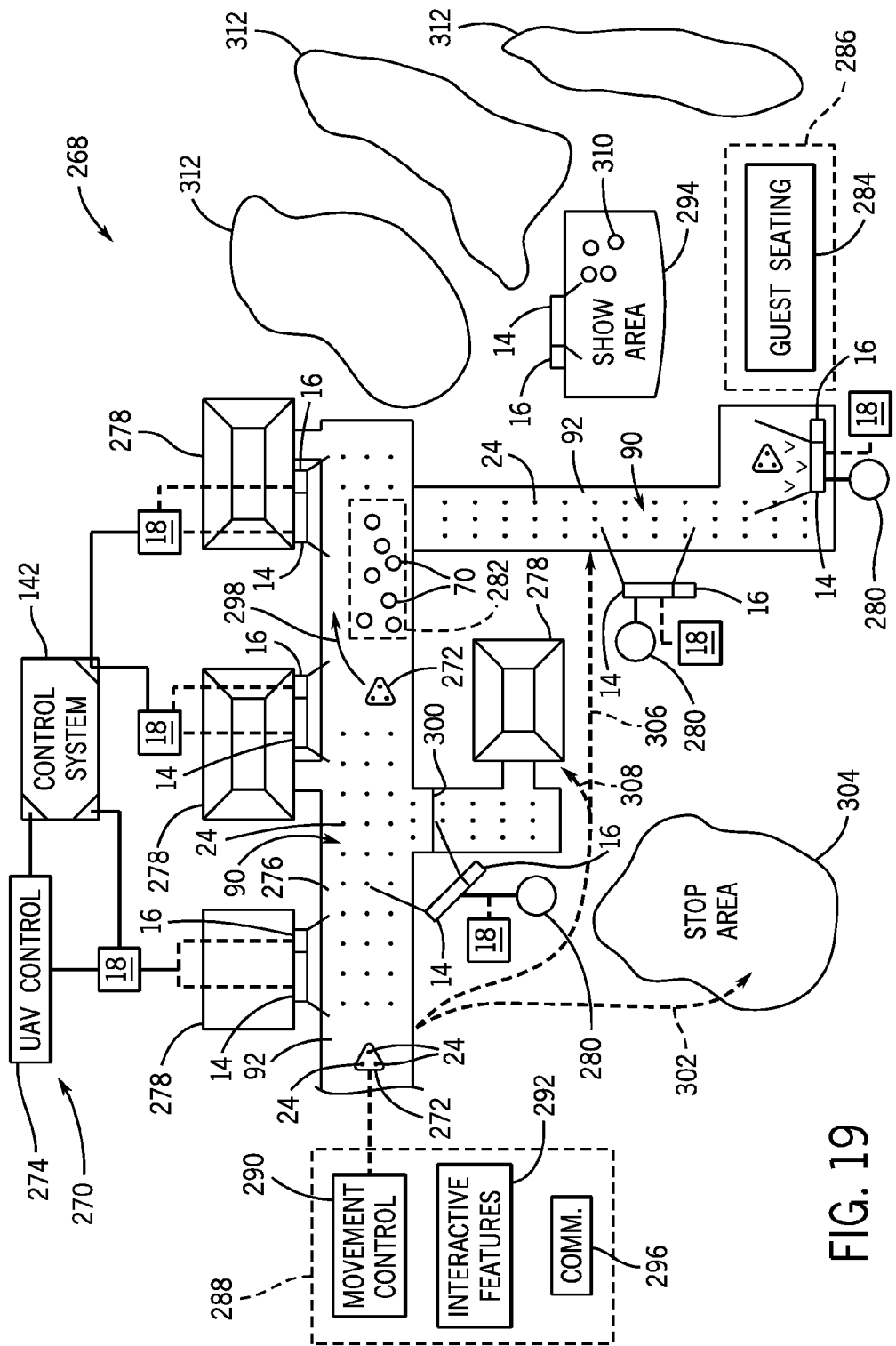
FIG. 19 is an overhead view of an amusement park having an unmanned aerial system (UAS) configured to direct unmanned aerial vehicles (UAVs) through the park using the tracking system of FIG. 1, in accordance with an embodiment of the present disclosure.

The control of machines in the manner set forth above may also be applied to amusement park equipment 12 capable of moving throughout an amusement park 268, as illustrated in the overhead view of FIG. 19. Indeed, as illustrated in FIG. 19, it is now recognized that the disclosed tracking system 10 may be used in conjunction with, for example, an unmanned aerial system (UAS) 270 to track the location and movement of one or more unmanned aerial vehicles (UAVs) 272 to, for example, provide all or a part of a light show, to enhance a themed show, to support special effects, for monitoring, to interact with people, to broadcast a wireless (e.g., WiFi) signal, and similar functions within the amusement park 268.

More specifically, FIG. 19 depicts an example layout of the amusement park 268 in which one or more UAVs 272 may be tracked in three spatial dimensions and in time using the disclosed tracking system 10. In accordance with certain embodiments, the tracking system 10 may track retro-reflective markers 24 positioned on (e.g., fixed on) the UAVs 272. The presence of multiple retro-reflective markers 24 on the UAVs 272 may enable the detector 16 to compare the electromagnetic signals that are retro-reflected from the different markers 24 to determine a location, orientation, velocity, etc., of each of the UAVs 272 in accordance with the embodiments discussed above with respect to FIG. 9A. As shown, the UAVs 272 each include three retro-reflective markers 24, though fewer or more retro-reflective markers 24 may be used depending on the tracking being performed by the tracking system 10 and the expected manner of movement of the UAVs 272.

Tracking the UAVs 272 in accordance with present embodiments may also enable automated control over their movement, for example by providing tracking information generated by the tracking system 10 as feedback for UAV control circuitry 274 associated with the control system 142. For instance, the UAV control circuitry 274 may be one or more sets of instructions stored on a memory of the control system 142 (e.g., a software package), such as memory 22 of the control unit 18, or may include one or more application specific integrated circuits (ASICs), one or more field programmable gate arrays (FPGAs), one or more general purpose processors, or any combination thereof. The UAV control circuitry 274 may also include communication devices configured to communicate with the UAVs 272, though it is presently contemplated that the UAVS 272 may utilize communication techniques shared by the tracking system 10 to facilitate processing and control of UAV positions, velocities, etc.

One or more of the tracking systems 10 may be positioned within the amusement park 268. Indeed, as set forth above, the use of multiple detection devices enables enhanced tracking capabilities, especially where the tracked target is expected to have several degrees of movement freedom. Accordingly, the amusement park 268 will generally at least include multiple detectors 16 so that the tracking system 10 is capable of obtaining signals from at least one of the retro-reflective markers 24 on the UAV 272 at any given time, regardless of the orientation of the UAV 272 relative to the ground. As illustrated, the UAVs 272 may move along a guest pathway 276, which people 70 may use to travel on foot (or on a conveyance) between certain attractions (e.g., buildings 278). Elements of the tracking system 10 may be positioned on some or all of the buildings 278, for example on portions of the buildings 278 that face toward the guest pathway 276. This may enable the emitters 14 to have overlapping electromagnetic emissions (e.g., light beams 28) so that the retro-reflective markers 24 are illuminated substantially continuously, thereby enabling the detectors 16 associated with the emitters 14 to have a substantially continuous view of the travelling UAVs 272. The emitter 14 and detectors 16 may, alternatively or additionally, be positioned on other environmental objects in the amusement park 268 or on their own support. For example, as shown in FIG. 19, one or more of the emitters 14 and one or more of the detectors 16 may be fixed to a post 280 positioned proximate the pathway 276 in a manner that enables the emitter 14 to emit the electromagnetic radiation beam 28 into or above the pathway 276 and the detector 16 to receive retro-reflected light from retro-reflective elements on the pathway 276 or on the UAVs 272.

The amusement park 268 may use a single one of the control units 18 that communicates (e.g., wirelessly) with several (e.g., some or all) of the emitters 14 and the detectors 16 positioned along the pathway 276, or may use several control units 18 as illustrated. As the UAVs 272 travel along the pathway 276, which may represent the detection area 30 of several of the tracking systems 10, they may travel through and beyond the detection areas 30 of each emitter/detector pair. Accordingly, the control system 142 may coordinate the hand-off between signals from one detector 16 to another detector 16 as the UAVs 272 travel along the pathway 276 to enable substantially continuous tracking of each UAV 272. Such hand-offs may also occur between control units 18 of the tracking systems 10. That is, as one tracking system 10 ceases to track one of the UAVs 272 because the UAV 272 has moved out of the detection area 30 associated with its emitters 14 and detectors 16, it may hand off the tracking of that UAV 272 to another tracking system 10 that is positioned along the predicted path of the UAV 272 (e.g., based on vector orientation and sense of the UAV's movement).

The tracking system 10 may also track occlusion of the grid 90 of retro-reflective markers 24 on the pathway 276, which may correspond to the floor 92 described above with respect to the tracking of people 70 and machines 170 in an area. Indeed, the tracking system 10 may be configured to track the presence and location of people 70, such as a group of people 70, along the pathway 276. Tracking the people 70 along the pathway 276 may be desirable for a number of reasons, for example to enable the UAV 272 to avoid collisions with the people 70 and to enable enhanced interactions with the people 70. Further, the tracking systems 10 may also use occlusion of the grid 90 as part of an overall tracking method used to track the UAVs 272. For example, one or more of the detectors 16 may have an overhead view of the pathway 276 and the UAVs 272 such that the UAVs 272 are positioned between the grid 90 and the detectors 16. Accordingly, in some embodiments, the tracking systems 10 may correlate certain patterns of grid occlusion to the UAVs 272.

The tracking system 10 may also, for example using the grid 90, associate a boundary 282 with groups of the people 70 to enable the tracking system and the UAV control system 274 to maintain the UAVs 272 a certain distance away from the people 70. The tracking system 10 may also monitor certain areas where the people 70 are expected to gather or group, such as a guest seating area 284, and may apply a boundary 286 to the same so that the UAV 272 maintains a certain distance away from the seating area 284.

In this regard, the UAV control system 274 may be configured to adjust a flight path of the UAVs 272 for a number of reasons, including approaching the boundaries 282, 286, or when the UAV control system 274 evaluates certain diagnostic information associated with the UAVs 272 and determines that one of the UAVs 272 is in need of maintenance.

To enable the enhanced interactions, flight path adjustments, and other aspects noted above relating to the UAVs 272, each of the UAVs 272 may have a variety of components 288, which may include various electrical and electromechanical systems, among others. As illustrated, in a general sense, the UAVs 272 may include a movement control system 290, which includes various electromechanical devices such as helicopter-like blades, various pumps associated with a propulsion system, or similar devices. In embodiments where the UAVs 272 uses a propulsion system, the propulsion system may use a compressed gas and/or a combustible fuel and oxidant. A lift system associated with the UAVs 272 might also include a propulsion-based lift system, or may use rotating blades to create lift as is done in a helicopter, or a combination of these features.

The components 288 may also include various interactive features 292, which enable enhanced interactions with the people 70, coordination of show effects and/or special effects with a show performed within, for example, a show area 294. By way of non-limiting example, the interactive features may include audio transducers such as speakers, or microphones, may include various electromagnetic radiation sources, such as lasers, light emitting diodes (LEDs), strobe lights, and so forth. Additionally or alternatively, the interactive features 292 may include other emitters that provide a discernable stimulus to the people 70, such as scent emitters configured to emit certain chemicals associated with certain types of scents, compressed gas emitters to emit bursts of compressed air for tactile stimulation, and so forth.

To enable the UAVs 272 to be controlled by the UAV control system 274, and in some embodiments to enable redundant tracking of the UAVs 272, the components 288 may also include a communication system 296. The communication system 296 may include various communication devices such as Wi-Fi transceivers, radiofrequency communication devices, or any other device capable of communication via certain bands of the electromagnetic spectrum. The communication system 296 may enable the UAVs 272 to communicate with the UAV control system 274, and vice-versa, to enable the UAV control system 274 to initiate adjustments of position using the movement control system 290, to cause the UAVs to trigger one or more show effects or other interactive elements using the interactive features 292, and so forth.

Having described various features of the UAVs 272 and the amusement park 268, various aspects relating to the operation of the UAVs 272 will be described in further detail herein to provide a better understanding of certain aspects of the present embodiments. For example, as the UAVs 272 travel along the pathway 276, they may be tracked by the tracking systems 10, based on their associated retro-reflective markers 24 and/or based on grid occlusion as described above. As the UAV 272 encounters objects or people, as shown by the group of people 70 proximate one of the buildings 278, the tracking system 10 may recognize that the UAV 272 has a trajectory that could potentially cause the UAV 272 to interfere with the people 70. Accordingly, the UAV control system 274 may communicate with the UAV 272 to instruct the UAV 272 to change its flight path around the boundary 282 associated with the group of people 70. The adjusted flight path of the UAV 272 is shown generally as an arrow 298.

The tracking systems 10 may also be used to maintain the UAVs 272 within certain areas of the amusement park 268. For example, the tracking system 10 may track the retro-reflective markers 24 on the UAV 272 relative to a known boundary 300, which may be considered to represent an area not in view of one or more of the tracking systems 10. Accordingly, if the tracking system 10 determines that the UAV 272 has gone outside or beyond the known boundary 300, the UAV control system 274 may send control signals to the UAV 272 that causes the UAV 272 to stop or to be directed to different areas. Similarly, the UAV 272 may include on-bard features that perform this operation, as described in further detail below.

As shown, the UAV 272 may be directed along a number of different pathways, which are depicted as dashed arrows leading to different environmental features of the amusement park 268. For example, the UAV 272 may be directed by the UAV control system 274 along a first path 302 to a stop area 304. The stop area 304 is generally intended to represent an area of the amusement park 268 that is away from areas where people 70 may be located, and/or away from where show attractions are located. In this way, the stop area 304 may also be intended to represent an emergency stop location.

The UAV 272 may be directed to the stop area 304 for a number of reasons. As one example, the UAV control system 274 may determine that the UAV 272, based on diagnostic information, requires repairs or is in need of maintenance. In these situations, the UAV 272 may be directed along the first path 302 to the stop area 304, which may be accessible to various technicians or other operators that can then repair the UAVs 272. Alternatively, the UAV 272 may include its own flight path adjustment instructions, which may be carried out by the movement control system 290 in certain situations. For instance, if the communication system 296 of the UAV 272 loses connection with the control system 274, the UAV 272 may direct itself to the nearest region that is considered to be away from guests and show attractions, in this case the stop area 304.

In other embodiments, the UAV 272 may be directed along a second pathway 306 back toward the guest pathway 276. For example, the UAV 272 may begin to travel along the first path 302 and, in response to certain updated instructions by the UAV control system 274, change its destination. For example, if the control system 274 determines that the UAV 272 is needed to assist in a show, the UAV control system 274 may send appropriate instructions to the UAV 272 to diverge from the first path 302 to the second path 306 and toward the guest pathway 276, which may lead to the show area 294. Accordingly, the UAV control system 274 may make real-time adjustments to the various flight paths of the UAV 272 as needed.

As still another example of the divergent flight paths, the UAV 272 may be diverted from the first path 302 to a third path 308 that leads to one of the buildings 278. Such a flight path adjustment may be made by the UAV control system 274 in response to an indication that the UAV 272 is out of a particular range of communication or out of a range of one or more of the tracking systems 10.

Accordingly, the UAV control system 274, in a general sense, may send signals to the UAV 272 that cause the UAV 272 to return to a particular region of the amusement park 268 to re-establish tracking by the tracking system 10. Further still, the UAV 272 may have automated routines that are carried out when certain connections are terminated between the UAV 272 and the UAV control system 274. In such an instance, the UAV 272 may follow an adjusted flight path, such as illustrated by third flight path 308, which directs the UAV 272 to a known location or location having a particular type of beacon recognizable by communication system 296 of the UAV 222.

The UAV control system 274 may also engage, in combination with one or more of the tracking systems 10 positioned at the show area 294, in coordinating actions of the UAV 272 with performers 310 in the show area 294. For example, the UAV control system 274, upon receipt of tracking information from the tracking system 10, may coordinate the movement of the UAV 272 with tracked movement of the performers 310 and/or any other objects within the show area 294. Further still, the UAVs 272 may provide enhanced interactivity with the guests in the guest seating 284 by moving from the show area 294, within the boundary 286 of the guest seating 284, and back. In situations where the UAV control system 274 determines that the UAV is not performing as intended or is beginning to drift out of a tracked location, or any other undesirable circumstance, the UAV control system 274 may direct the UAV 272 into one of a plurality of stop areas 312 and initiate a stop of the UAV 272. Within the stop areas 312, the initiated stop of the UAV 272 may cause the UAV 272 to shut down. As one example, the stop areas 312 may be islands surrounded by a body of water, or individual bodies of water, where no people 70 or other show objects are expected to be located.

Figure 20:
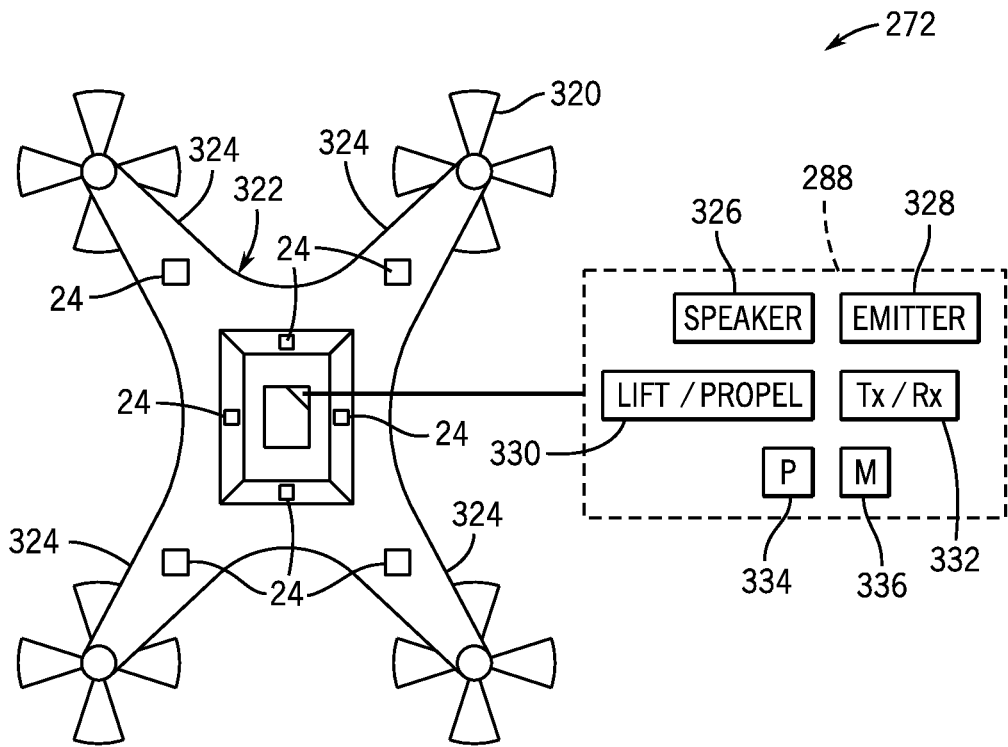
FIG. 20 is a bottom view of a UAV having interactive and position control components, in accordance with an embodiment of the present disclosure.
Figure 21:
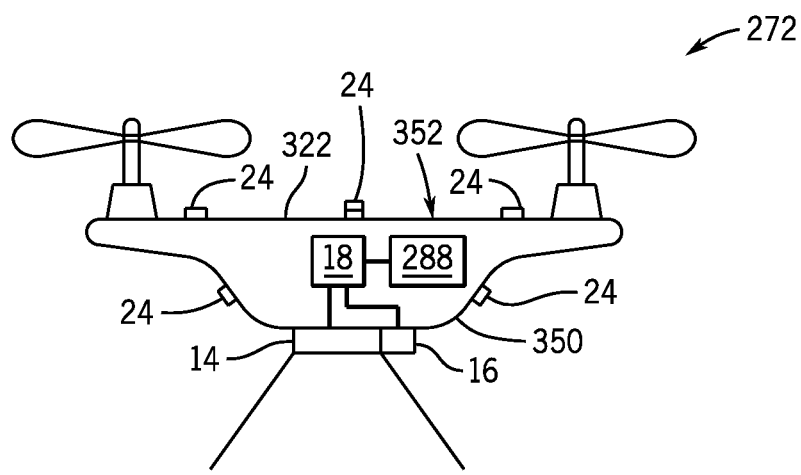
FIG. 21 is a front view of a UAV having the tracking system of FIG. 1 integrated onto its body, in accordance with an embodiment of the present disclosure.

Example configurations of the UAV 272 may be further appreciated with respect to FIGS. 20 and 21, which are bottom and elevational views, respectively, of different embodiments of the UAVs 272. Specifically, the bottom view of the embodiments of the UAV 272 illustrated in FIG. 20 depicts the UAV 272 as a quad copter having a plurality of lift and/or propulsion devices 320. The lift and/or propulsion devices 320 are attached to a body 322 of the UAV 272 via arms 324. However, it should be noted that the illustrated embodiment of the UAV 272 is but one example, and other configurations are also within the scope of the present disclosure. As depicted, the body 322 and the arms 324 may be fitted with one or more of the retro-reflective markers 24. Accordingly, the tracking system 10 may be configured to track three-dimensional spatial movement of the UAV 272 in time. For example, the UAV 272 may have at least one, at least two, or at least three of the retro-reflective markers 24. It is recognized that including several of the retro-reflective markers 24 may enable the tracking system 10 to track the UAVs 272 with a higher degree of precision and accuracy, including tracking an orientation of the UAV 272 based on relative perspective positioning of the retro-reflective markers 24. For example, the orientation of the UAV 272 may be tracked according to the techniques described above with respect to FIGS. 9B and 9C.

It should also be noted that the positioning of the retro-reflective markers on the UAV 272 (e.g. on the body 322 and/or the arms 324) may provide the tracking system 10 the ability to track a roll, a pitch, and a yaw of the UAV 272. This tracking may be useful for adjusting or otherwise controlling the flight path of the UAV 272 by, for example, the control unit 18 and/or the UAV control system 274.

The illustrated embodiment of the UAV 272 also includes specific examples of the components 288. The components 288, as shown, may include a speaker 326 that is part of the interactive features 292 depicted in FIG. 19, and the emitter 328 that is also part of the interactive features 292 in FIG. 19, lift and/or propulsion control circuitry 330, which may be a part of the movement control system 290 of FIG. 19, and a transceiver 332, which may be a part of the communication system 296 depicted in FIG. 19. The components 288 may also include processing circuitry including one or more processors 334 and one or more memory 336 for performing various analysis and control routines relating to the operation or information received from any one or combination of the components 288.

Moving now to the embodiment of the UAV 272 depicted in FIG. 21, as shown, the UAV 272 may include all or part of a tracking system 10 configured in accordance with present embodiments. For instance, the UAV 272 may incorporate at least one of the emitters 14 and at least one of the detectors 16 via attachment to the body 322, for example on a downward facing surface 350 of the body 322. The use of the tracking system 10 on the UAV 272 may be desirable, for example, to enable the UAV 272 to navigate through or otherwise follow a path of retro-reflective markers 24 disposed on, for instance, the pathway 276. Accordingly, the UAV 272 may be configured to at least partially move through the amusement park 268 using only instructions and tracking that are contained on or within the UAV 272. However, the present disclosure also includes embodiments in which the communication system 296 of the UAV 272 receives instructions from the UAV control system 274 (e.g. to update a destination), and the UAV 272 follows retro-reflective markers 24 to a particular destination. Accordingly, it should be appreciated that certain of the retro-reflective markers 24 forming a path may have different optical qualities that enable paths to be differentiated from one another. Furthermore, the UAV 272 may include the emitter 14 and the detector 16 and utilize them to track other devices or to track people using any one or a combination of the techniques described above.

The overall structure of the UAV 272 may also be further appreciated with respect to the illustration in FIG. 21. As illustrated, the UAV 272 includes a top surface 352, which may serve as a ledge or platform configured to carry certain of the special effect devices or equipment constituting all or part of the interactive features 292. Indeed, the features integrated onto the UAV 272 may be positioned on the top surface 352, on the downward facing part 350, or anywhere else on the UAV 272.

As set forth above, several different types of equipment, machinery, vehicles, etc., may be tracked in accordance with present embodiments using the tracking system 10. Indeed, in addition to tracking robots, UAVs, and so forth, the present embodiments may utilize the tracking system 10 to track the movement of a ride vehicle in space and time, either along a physically constrained path (e.g., a track or rail system) or along an unconstrained path (e.g., a path defined by environmental features). FIGS. 22-25 depict embodiments where a ride vehicle 360 (or multiple such vehicles 360) is positioned on a constrained path 362 and is tracked using the tracking system 10, while FIGS. 26-29 depict embodiments where ride vehicles 360 are positioned on an unconstrained path 363 and are tracked using the tracking system 10. The tracking may generally be performed in accordance with any one or a combination of the embodiments set forth above with respect to FIGS. 3-9 depending, for example, on whether the tracking will be for two-dimensional motion or three-dimensional motion.

In evaluating the operation of an amusement park attraction, it may be desirable to track the location of the ride vehicle 360 in space, in order to ensure that the ride vehicle 360 is moving and operating as expected. If the ride vehicle 360 is not at the desired position or orientation at a certain time, this may indicate that the ride vehicle 360 is not operating as desired and, thus, may benefit from preventative maintenance.

Figure 22:
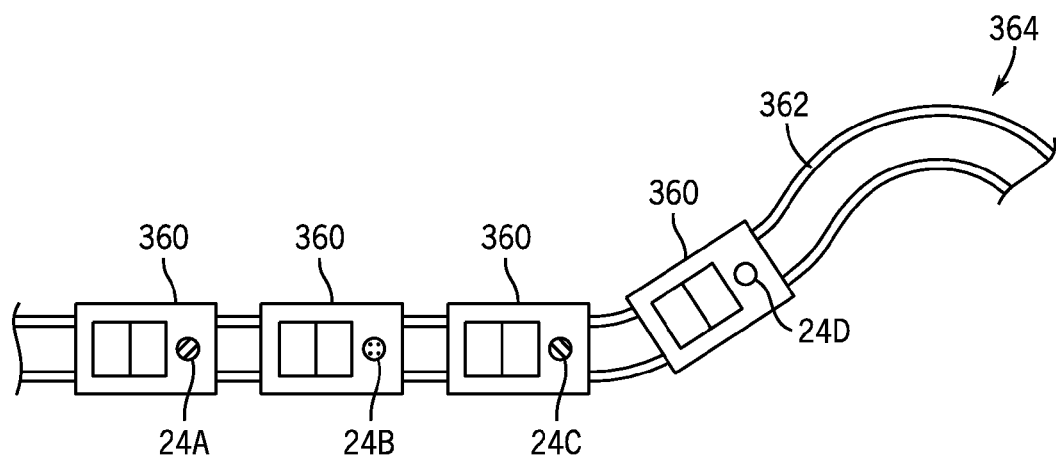
FIG. 22 is an overhead schematic view of a series of amusement park ride vehicles with markers used to convey embedded data to the tracking system of FIG. 1, in accordance with an embodiment of the present disclosure.

Starting first with tracking the ride vehicles 360 from an overhead perspective, and in two dimensions, FIG. 22 illustrates an embodiment where different ride vehicles 360 on the track 362, together forming a amusement attraction 364, each feature one of the retro-reflective markers 24A, 24B, 24C, and 24D. The markers 24A, 24B, 24C, and 24D are each configured to retro-reflect a different frequency of the electromagnetic radiation (e.g., electromagnetic radiation beam 28) back to the detector 16. The tracking system 10 may track the retro-reflective markers 24A, 24B, 24C, and 24D to distinguish the particular ride vehicles 360 from one another and to detect the approximate location of each of the ride vehicles 360, either relative to a coordinate frame or relative to each other, or both.

For instance, in some embodiments, the different ride vehicles 360 may be associated with different instructions or location information stored in the control unit 18 of the tracking system 10. In this example, the control unit 18 may be configured to send a control signal configured to cause actuation of certain of the amusement park equipment 12 when one of the ride vehicles 360 passes a certain point on the track 362. The control unit 18 may identify this ride vehicle 360 based on the frequency of electromagnetic radiation reflected by the retro-reflective marker 24 associated with the particular ride vehicle 360, thus triggering the amusement park equipment (e.g., an effect device) when the ride vehicle 360 passes the point on the track 362. In other embodiments, the particular qualities of the electromagnetic radiation (e.g., particular frequency, phase, wavelength) retro-reflected back by a particular retro-reflective marker 24 (e.g., 24A, 24B, 24C, or 24D) may signal the control unit 18 to utilize a different algorithm stored in the memory 22 (e.g., associate the ride vehicle 360 and its marker with a different effect device or different control parameters). It should be recognized that other types of systems and applications may utilize the tracking system 10 having the control unit 18 coded to follow a first set of instructions when the reflected electromagnetic radiation from the retro-reflective marker 24 is, for example, at a first frequency and to follow a second set of instructions when the electromagnetic radiation from the retro-reflective marker 24 is, for example, at a second frequency.

Figure 23:
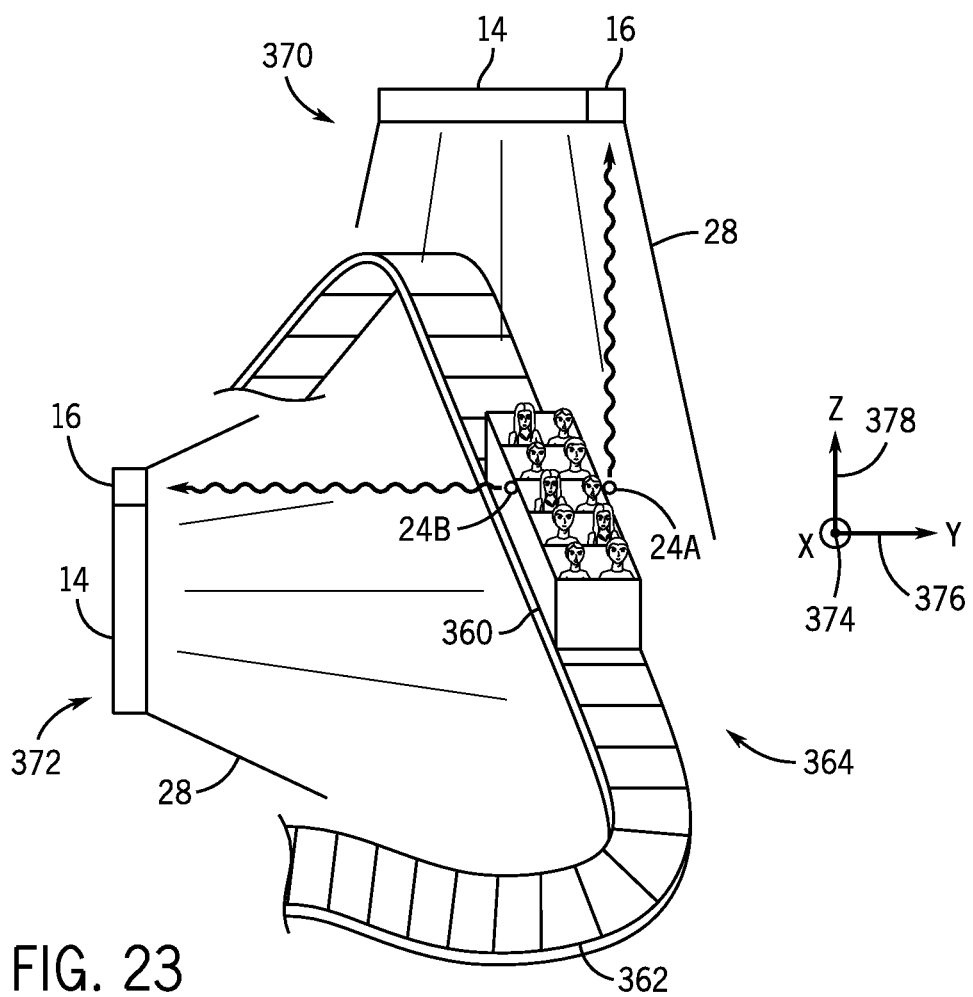
FIG. 23 is a perspective view of two orthogonally positioned tracking systems of FIG. 1 detecting a three dimensional location of an amusement attraction vehicle, in accordance with an embodiment of the present disclosure.

As also set forth above, for example with respect to FIG. 9A, multiple separate detectors 16 may be utilized to each detect retro-reflective markers 24 from different perspectives and/or to track a different frequency of electromagnetic radiation reflected by the retro-reflective markers 24. FIG. 23 illustrates one such embodiment of the tracking system 10 used to track the ride vehicle 360 in three dimensional space. Specifically, the tracking system 10 includes two sets of emitters 14 and detectors 16, illustrated as a first set 370 and a second set 372.

The first emitter/detector set 370 is disposed above the amusement attraction 364, and the second emitter/detector set 372 is disposed to the side of the amusement attraction 364. Thus, the first set 370 is configured to obtain an overhead (e.g., plan) view, while the second set 372 is configured to obtain an elevational view of the ride vehicle 360. Specifically, in the illustrated embodiment, the first set 370 is disposed such that the emitter 14 and the detector 16 are aligned with a plane formed by an X axis 374 and a Y axis 376 of the amusement attraction 364. In addition, the second set 372 is disposed such that the emitter 14 and the detector 16 are aligned with a plane formed by the X axis 374 and a Z axis 378. This way, the first set 370 may track the position of the ride vehicle 360 along the X-Y plane, while the second set 372 may track the position of the ride vehicle 360 along the X-Z plane, which is orthogonal to the X-Y plane. This may provide a relatively accurate approximation of the three dimensional position and/or orientation of the ride vehicle 360. In embodiments where the ride vehicle 360 operates in only a single plane (e.g., X-Y plane), only one of the sets 370, 372 of the emitter 14 and detector 16 may be used to track the two dimensional position of the ride vehicle 360. Alternatively, redundant sets of emitters 14 and detectors 16 may be utilized (e.g., to provide range).

Figure 24:
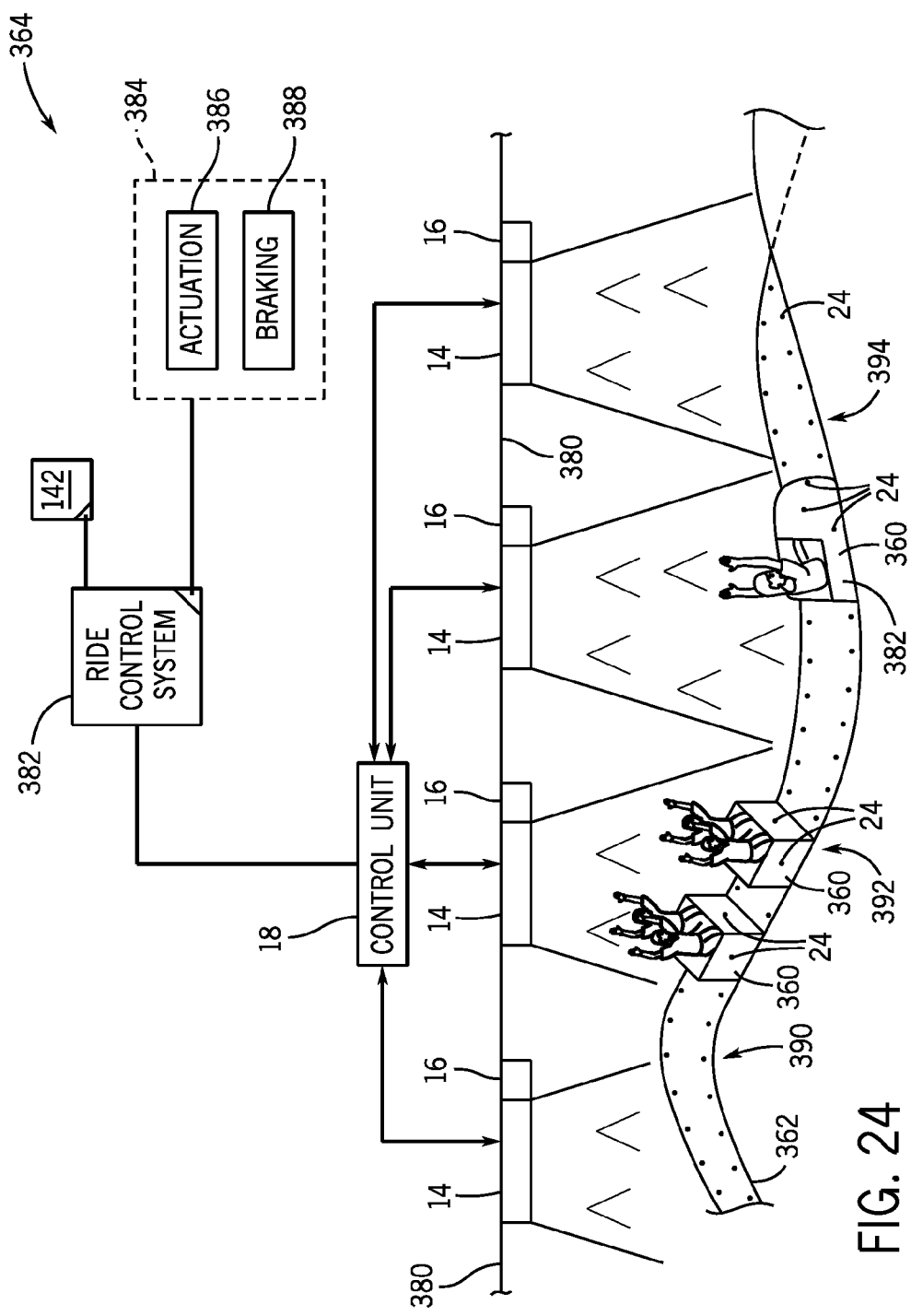
FIG. 24 is a perspective view of an amusement park ride vehicle traveling along a constrained path having retro-reflective markers on the path to enable the tracking system of FIG. 1 to evaluate the performance of the ride vehicle, in accordance with an embodiment of the present disclosure.

Moving now to FIG. 24, an embodiment of the amusement attraction 364 in which the track 362 is positioned indoors or proximate to a structure having a support mechanism for the tracking system 10 is illustrated. More specifically, FIG. 24 depicts the manner in which the track 362 may include complex turns, and how the tracking systems 10 of the present disclosure may be used to track movement of the ride vehicles 360 along the track 362.

The tracking system 10 may include one or more emitters 14 configured to emit the light beams 28 and detectors 16 configured to detect the electromagnetic radiation reflected from objects in the detector's field of view. In the illustrated embodiment, the emitters 14 and detectors 16 are positioned on a ceiling 380 of the amusement attraction 364. In other embodiments, however, the emitters 14 and detectors 16 may be positioned along other stationary components of the amusement attraction 364 facing toward the track 362. The ride vehicles 360 may each include retro-reflective markers 24 on their outer surfaces 382. In this context, the tracking system 10 may be used to determine and keep an accurate count of the number of ride vehicles 360 present on the particular amusement attraction 364, and tie tracking information to the particular ride vehicles 360 (e.g., when the ride vehicles 360 include retro-reflective markers 24 with different optical qualities).

The multiple emitters 14 and detectors 16 may provide redundancy while monitoring the ride vehicles 360 as they travel along the track 362. Some detectors 16 may be better positioned than others to detect electromagnetic radiation retro-reflected from certain areas of the amusement attraction 364. In some embodiments, the multiple emitters 14 and detectors 16 may be disposed at different angles throughout the amusement attraction 364 to provide a redundant and, therefore, more accurate tracking of the various retro-reflective markers 24 disposed within the amusement attraction 364. The multiple sets of emitters 14 and detectors 16 may be communicatively coupled to the same control unit 18, or different control units 18, for comparing the results from the different detectors 16. However, it should be noted that single detectors 16 may also be used to track three-dimensional orientation of the ride vehicles 360, for example according to the techniques described above with respect to FIGS. 9B and 9C.

As illustrated, the track 362 may include a series of complex curvatures that may otherwise be difficult to track using existing tracking technologies, such as linear encoders. However, in accordance with present embodiments, the track 362 may include a plurality of the retro-reflective markers 24 positioned thereon, and the tracking system 10 (including multiple emitters 14 and detectors 16) may track and evaluate occlusion of these retro-reflective markers 24 to evaluate the performance of the ride vehicles 360 on the track 362.

The illustrated amusement attraction 364 also includes a ride control system 382 in communication with the control unit 18, and the ride control system 382 includes control circuitry 384 configured to adjust various operational parameters of one or more of the ride vehicles 360. Specifically, the control circuitry of the ride control system 382 may include actuation control circuitry 386 and braking control circuitry 388. The actuation control circuitry 386 may be implemented as software code stored in memory and executed by one or more processors associated within the control system 142 of the amusement park, or may be implemented as control logic circuits that are local to the amusement attraction 364.

In accordance with present embodiments, the amusement attraction 364 includes these features described above to enable the control unit 18 and the ride control system 382 to monitor the operation of the ride vehicles 360 as they move along the track 362. The control unit 18 and ride control system 382 may also, as appropriate, adjust speed, braking, or other operational parameters associated with the ride vehicles 360 as a result of the monitoring performed by the tracking system 10.

As illustrated, the track 362 includes the complex curvatures noted above, specifically a hill 390, a curve 392, and a combination of a hill and a curve, denoted as a curved hill or curved slope 394. Again, it may be difficult for traditional tracking features, such as linear encoders, to track movement along the track 362. Indeed, these traditional tracking features are typically used for tracking motion along straight lines. Accordingly, it is now recognized that the use of the retro-reflective markers 24 positioned along the track 362 may provide enhanced tracking of the movement of the ride vehicles 360 along the track 362.

As an example of the operation of the amusement attraction 364 and its associated tracking system 10 and ride control system 362, the emitters 14 and the detectors 16 may operate to detect reflected electromagnetic radiation from the markers 24 positioned on the track 362 and on the ride vehicles 360, where present. When the ride vehicles move along the track 362, the ride vehicles 360 occlude certain of the retro-reflective markers 24 disposed along the track 362. In certain embodiments, when the ride vehicle 360 is operating properly, the retro-reflective markers 24 occluded by the ride vehicles 360 may not be visible to any of the detectors 16. However, in embodiments where the ride vehicles 360 slightly lift away from the track 362 (e.g., at high speeds and tight turns), all or a portion of one or more retro-reflective markers 24 that should be occluded by the ride vehicle 360 may be visible to at least one of the detectors 16, which may receive retro-reflected electromagnetic radiation from the un-occluded marker 24. In this instance, the tracking system 10, and more specifically the control unit 18, may identify a pattern associated with this type of situation, which may be further appreciated with reference to the illustration in FIG. 25.

Figure 25:
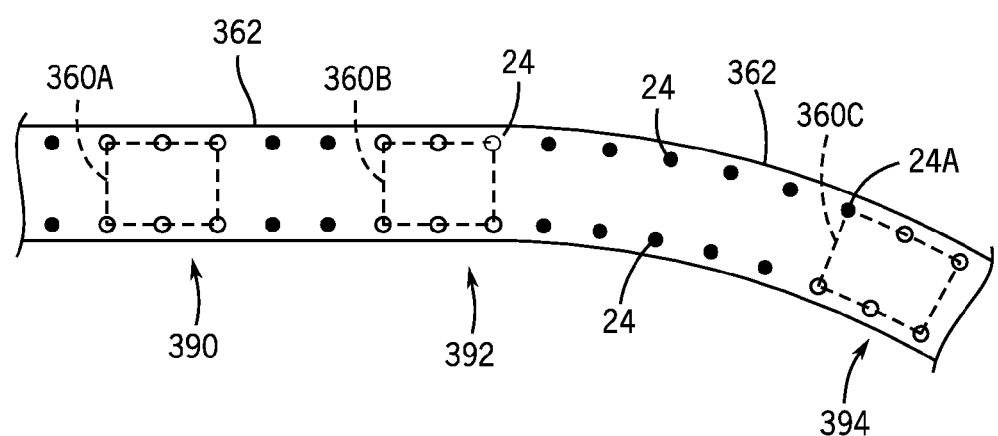
FIG. 25 is an overhead view of a portion of the constrained path of FIG. 24 and schematically illustrating occlusion and non-occlusion of the retro-reflective markers on the path by the ride vehicles travelling along the path, in accordance with an embodiment of the present disclosure.

Specifically, FIG. 25 depicts an overhead view of the track 362 in FIG. 24. As shown, a leftmost ride vehicle illustrated with dashed lines 360A may occlude certain of the retro-reflective markers 24, which is illustrated as a 3 by 3 pattern of occluded retro-reflective markers (i.e., a pattern in which three adjacent markers are occluded in two rows). As may be appreciated from the illustration, un-occluded or visible retro-reflective markers 24 are depicted as solid/filled circles, while occluded retro-reflective markers 24 are depicted as un-filled circles. A second of the ride vehicles 360B is also illustrated as occluding all retro-reflective markers 24 on the track 362 corresponding to the geometry of the ride vehicle 360. Accordingly, the tracking unit 18 may determine that the ride vehicle 360 is moving appropriately (e.g., an appropriate speed) along the track 262.

On the other hand, the complex curve associated with the curved slope 394 may at times be difficult for ride vehicles 360 moving at a relatively fast velocity to properly navigate. Thus, as shown, a third of the ride vehicles 360C is depicted as occluding only some of the retro-reflective markers 24 corresponding to its geometry. This is shown in FIG. 25 as a 2 by 3 set of occluded retro-reflective markers 24 (i.e., a first row of two adjacent occluded markers across from a second row of three adjacent occluded markers), with one of the retro-reflective markers 24A being shown as not occluded or not fully occluded based on the view of one or more of the detectors 16. The tracking unit 18 may process this tracking data and determine that the speed of the ride vehicle 360 was too high going in to the curved slope 394, and may adjust, via the ride control system 382, a speed of the ride vehicle 360. In embodiments where the tracking unit 18 and/or the ride control system 382 and/or the control system 142 determines that such speed adjustments do not have an effect on the occlusion of the retro-reflective marker 24A, the tracking unit 18 and/or the ride control system 382 and/or the control system 142 may determine that the ride vehicle 360 is in need of maintenance, or that the track 362 may need to be adjusted.

Figure 26:
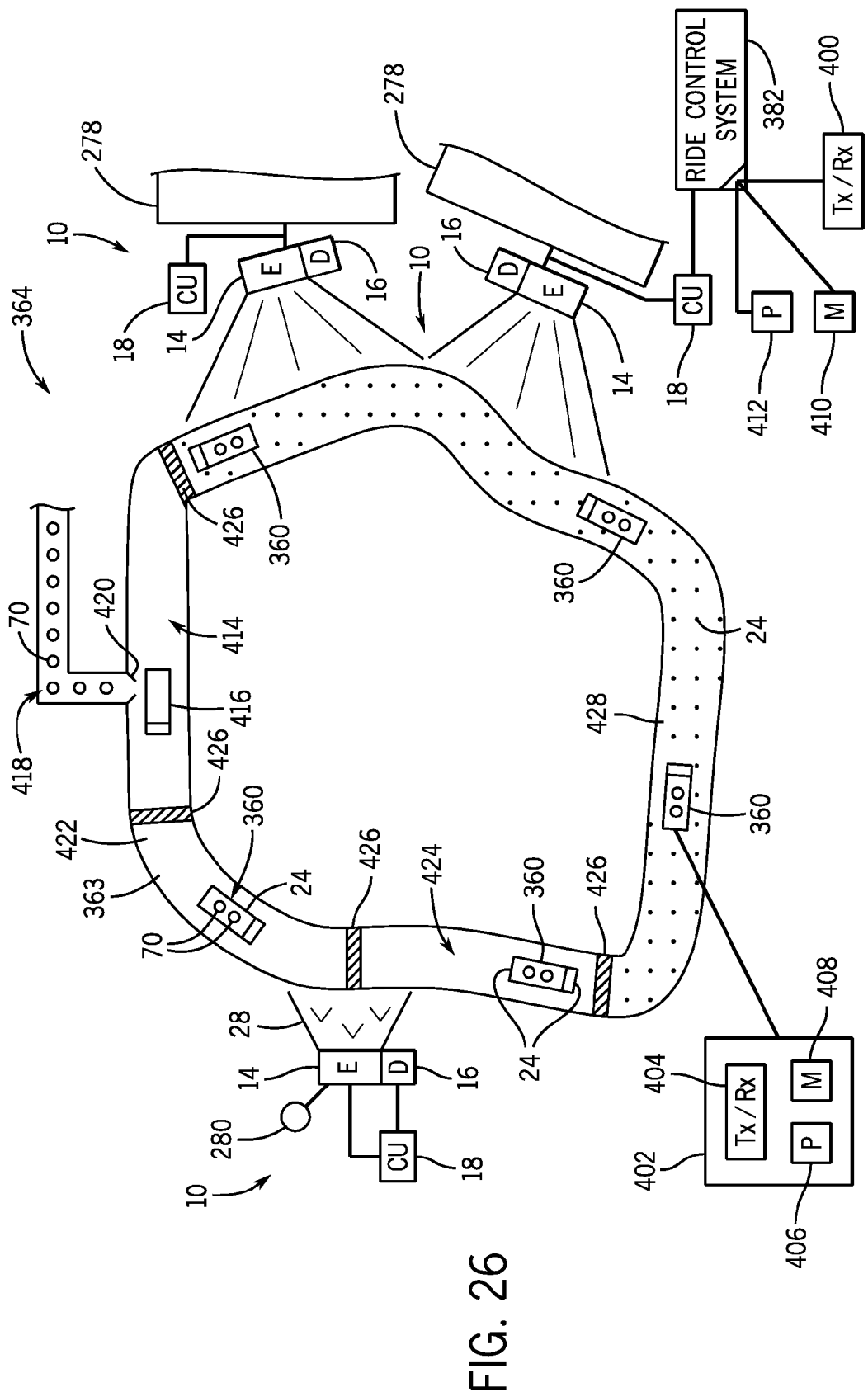
FIG. 26 is an overhead view of an unconstrained path having retro-reflective markers positioned at various points along the path to enable the tracking system of FIG. 1 to perform at least a portion of block zone control of ride vehicle positions, in accordance with an embodiment of the present disclosure.

Moving now to embodiments where the ride path for the ride vehicles 360 is not constrained by the track 362, the illustrated embodiment of the amusement attraction 364 in FIG. 26 includes the unconstrained ride path 363, as noted above. The unconstrained ride path 363 may be considered to be unconstrained because the path 363 is constrained only by environmental elements bounding the path through which the ride vehicles 360 may travel (not by engagement between wheel assemblies and rails, such as on a typical roller coaster). As with certain of the embodiments set forth above, the emitters 14 and the detectors 16 may be positioned on a variety of different environmental features of the amusement attraction 364. For example, as illustrated, the emitters 14 and the detectors 16 may be positioned on buildings 278, posts 280, or similar structures enabling a view of the path 363.

As shown, the tracking system 10 may be more intimately involved in the motion of the ride vehicles 360 compared to the embodiments set forth above with respect to FIGS. 22-25. That is, the ride vehicles 360 shown in FIG. 26 may be controlled in substantially real-time by the ride control system 382. More specifically, ride control system 382 may include communication circuitry 400 such as a transceiver configured to communicate with respective control units 402 of the ride vehicles 360. As illustrated, the respective control circuitry 402 of the ride vehicles 360 may include communication circuitry 404 such as a transceiver, one or more processors 406 and one or more memory 408, which are configured to execute various control routines in response to instructions received from the ride control system 382. For instance, the control circuitry 402 of the ride vehicles 360 may be configured to adjust speed and/or direction of the ride vehicles along the path 363.

The instructions provided to the control circuitry 402 by the ride control system 382 may depend on tracking information provided by one or more control units 18 associated with the one or more tracking systems 10 disposed throughout the amusement attraction 364. For instance, the ride control system 382 may, upon receipt of tracking information, perform various routines stored on memory 410 using one or more associated processors 412 to adjust the operation of one or more of the ride vehicles 360.

The tracking information provided by the tracking systems 10 disposed throughout the attraction area may include, by way of example, information relating to retro-reflective markers 24 positioned on an outside of the ride vehicles 360 and/or retro-reflective paint used as retro-reflective markers 24 on the vehicle 360. The tracking information may be as generally set forth above with respect to FIGS. 3-9, where the tracking systems 10 use one or more of the detectors 16 to track the ride vehicles 360 in space and time in two dimensions or three dimensions as appropriate. Because the ride path 363 is unconstrained, it may be desirable to track the ride vehicles 360 in space and time in three spatial dimensions.

In accordance with certain embodiments of the present disclosure, the tracking system 10 and the ride control system 382 may coordinate to perform block control, where the path 363 is divided into blocks or zones in which a predetermined number of ride vehicles 360 are allowed (e.g., by way of rules stored in memory 22) to occupy a particular block. Accordingly, the path 363 is illustrated by way of example as including a plurality of such blocks, including a first block 414 associated with loading of an empty ride vehicle 416 (e.g., associated with a loading area 418 of the amusement attraction 364 where people 70 are queued behind an entrance 420). The plurality of blocks also includes a second block 422 and a third block 424 separated from each other, and other blocks, by retro-reflective boundary lines 426. The tracking system 10 may be configured to track occlusion of the boundary lines 426 to determine whether ride vehicles 360 have crossed between certain of the blocks to determine if an appropriate number of vehicles 360 are positioned within each of the blocks. Additionally or alternatively, the tracking system 10 may monitor a position of each of the vehicles 360 via retro-reflective makers 24 positioned on the vehicles 360 relative to the boundary lines 426. If the tracking system 10 determines that there are too many vehicles 360 present within certain blocks, or in close proximity thereto, the tracking system 10 may cause certain of the vehicles 360 to stop until the vehicles 360 in that particular block have cleared. In other embodiments, the ride control system 382 may initiate actuation of a feature that causes additional pathways to be opened to certain of the vehicles 360. Indeed, such block control may be applied not only to an unconstrained path 363, but also to the constrained path 362 as described above.

Continuing with the embodiment illustrated in FIG. 26, the path 363 may include an embodiment of the grid 90 within a fourth block 428 to enable the tracking system 10 to monitor occlusion of the markers 24 and track positions and movement of the vehicles 360. The tracking system 10 may, in certain embodiments, apply a boundary to each of the vehicles 360 in the fourth block 428 (or any other block) to maintain a certain distance between the vehicles 360 to avoid collisions and maintain a substantial movement of the vehicles 360 along the path, for example as set forth above with respect to FIGS. 13-17. Further, the tracking system 10 may utilize the grid 90 to give riders a sense of complete freedom to drive the vehicle 360 within an open area that is actually electronically constrained. Indeed, riders may be allowed to direct the vehicles 360 anywhere within the grid but not outside of it.

The tracking system 10, in certain embodiments, may cause one of the vehicles 360 (e.g., via the ride control system 382) to stop. For example, the tracking system 10 may determine that the vehicle 360 proximate the boundary line 426 between the first and fourth blocks 414, 428 is too close to the first block 414 because the unoccupied vehicle 416 has not yet loaded. In this scenario, the tracking system 10 may cause the vehicle 360 to stop (e.g., via ride control system 382). However, the tracking system 10 may also cause one or more show effects to trigger so that the stop appears to be intentional (i.e., part of the ride) to the people on the stopped vehicle 360. Once the tracking system 10 determines that the vehicle 416 is loaded and begins moving, the tracking system 10 may also re-initiate (or re-allow) movement of the vehicle 360. Indeed, the tracking system 10 may, rather than controlling all aspects of the movement of the vehicles 360, only send "go" or "no-go" signals that allow or disallow movement as appropriate.

FIG. 27 illustrates another embodiment of the manner in which the tracking system 10 may be used to control movement of the ride vehicles 360. Specifically, FIG. 27 is an elevational view of an embodiment of the attraction 364 in which the ride vehicle 360 is guided along a guidance path 440, which may be considered to represent a more specific embodiment of the unconstrained path 363. The guidance path 440, as illustrated, includes a plurality of the retro-reflective markers 24 in a funnel-like pattern 442, which may ultimately function to cause the ride vehicle 360 to be guided along a particular trajectory along the path 440 and toward a predetermined location 444.

More specifically, the illustrated pattern 442 is formed by a first plurality of retro-reflective markers 446 positioned at a first side 448 of the path 440, and a second plurality of retro-reflective markers 450 positioned at a second side 452 of the path 440. The first and second pluralities of retro-reflective markers 446, 450 are spaced apart by a distance that changes along a direction extending toward the predetermined location 444. As illustrated toward the left side of the path 440, the distance is depicted as W1, representing a first width, and, moving to the right and toward the predetermined location 444, the width changes to a second width W2, which is smaller than the first width W1. In this way, the converging pluralities of retro-reflective markers 446, 450 define a tapered space 454 where no retro-reflective markers 24 are present. As described in further detail below, the tracking system 10 and the ride control system 382 may operate to constrain the ride vehicle 360 to within this tapered space 454.

As also illustrated, the ride vehicle 360 may include various features that enable the person 70 within the ride vehicle 360 to move the ride vehicle 360 in a number of different directions. Generally, these features of the ride vehicle 360 function to allow the person 70 to feel as if they are in full control over the ride vehicle 360 while the vehicle 360, in reality, is being directed in the general direction toward the predetermined location 444. The features include, by way of example, a vehicle drive system 456 that may be in communication with the tracking system 10 and/or the ride control system 382 via the transceiver 404.

The vehicle drive system 456 generally includes a drive system 458 and a steering system 460, which are configured to move the vehicle 360 along the path 440 and also allow the person 70 a degree of control over the movement of the vehicle 360. The drive system 458 may include one or more electromechanical drives (e.g., electric motors) and associated power systems, one or more combustion engines, one or more propulsion devices, and so forth. The steering system 460 may include any suitable set of features that enable the vehicle 360 to be steered, such as, for instance, a rack and pinion system, steering column, etc.

As set forth above, the tracking system 10 and the ride control system 382 may operate in conjunction with the vehicle drive system 456 to adjust the degree of control that the person 70 driving the ride vehicle 360 has over the overall direction in which the ride vehicle 360 travels. For example, the tracking system 10 may track the location and movement of the ride vehicle 360 and send this tracking information to the ride control system 382. Alternatively, the tracking system 10 may process the tracking data to provide an instruction input to the ride control system 382.

As an example of the manner in which the amusement attraction 364 functions, the ride vehicle 360 may travel along the path 440, while being tracked by the tracking system 10 using any one or a combination of the techniques described above. The tracking system 10 may also, for example, treat the first and second pluralities of retro-reflective markers 446, 450 as boundary features, where the tracking system 10 monitors the location of the vehicle 360 relative to the first and second pluralities of retro-reflective markers 446, 450, and determines whether the vehicle 360 has encroached into either of the pluralities or may, based upon a determined trajectory, encroach into either of the pluralities.

If the tracking system 10 determines that the vehicle 360 requires adjustment (e.g., according to a stored set of instructions or rules associated with the attraction 364), the tracking system 10 may send appropriate instructions to the ride control system 382 to cause the vector orientation or magnitude of the vehicle's movement to be adjusted. In accordance with the illustrated embodiment, the adjustment may be made so that the vehicle 360 is urged in a direction toward the predetermined location 444. Accordingly, while the person 70 may believe that they are in complete control over the vehicle 360, they are slowly being urged toward the location 444.

The amusement attraction 364 may also include amusement park equipment 12 to create show reasons for the vehicle 360 to move along the path 440 toward the location 444. For example, as shown, the person 70 may, upon identification of the amusement park equipment 12 such as a show effect (e.g., a flame, a display), steer the ride vehicle 360 toward the equipment 12. In doing so, the person 70 causes the vehicle 360 to be directed further into the tapered area 454, and therefore directed closer to the location 444.

Figure 28:
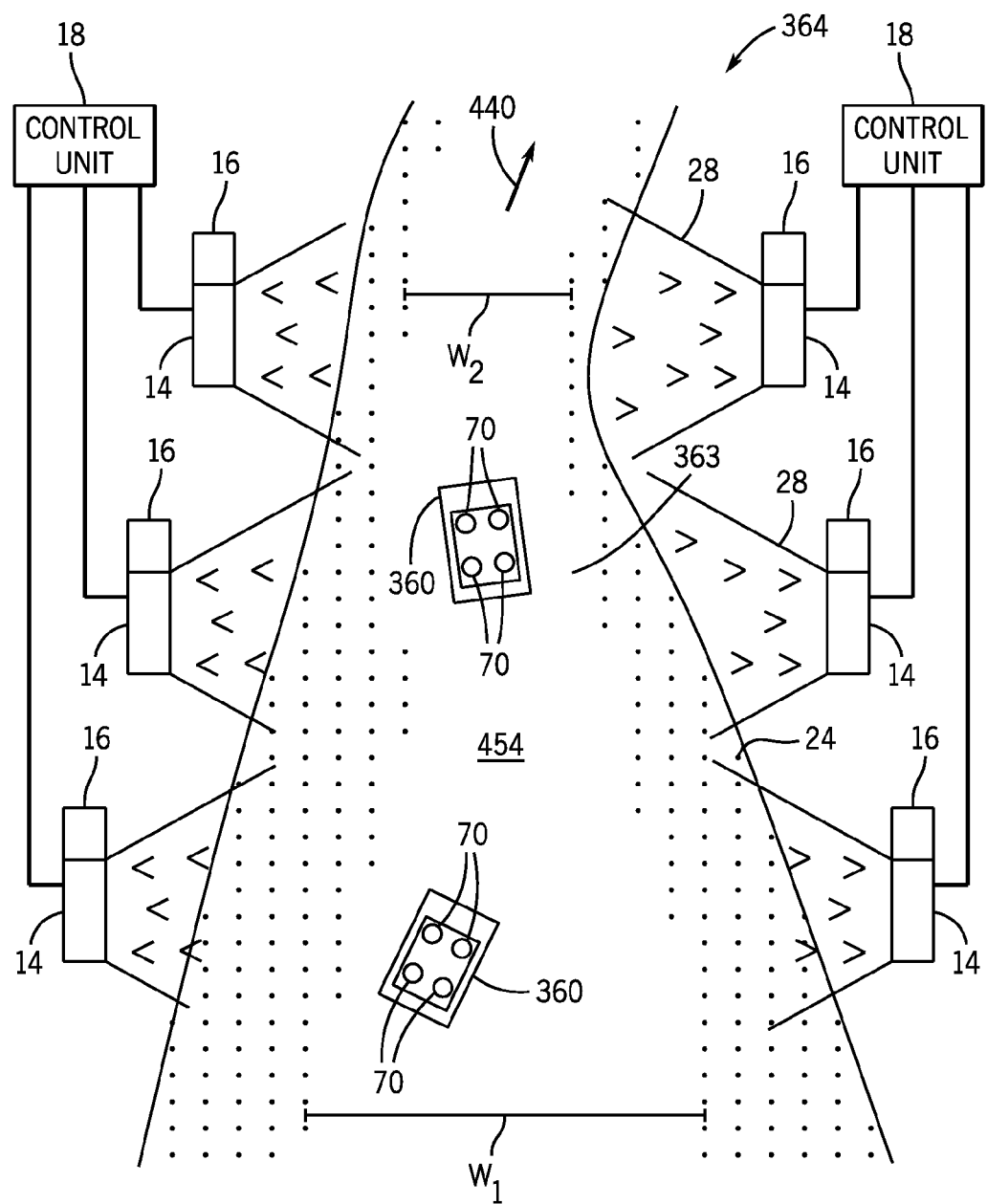
FIG. 28 is an overhead view of the path of FIG. 27 and depicting further details of the manner in which the retro-reflective markers are positioned to guide the ride vehicle, in accordance with an embodiment of the present disclosure.

Further embodiments of the path 440 are depicted in the overhead views of FIGS. 28 and 29. Specifically, in FIG. 28, the path 440 may be considered to be an overhead view of the path 440 in FIG. 27, where movement of the vehicle 360 is constrained to within the tapered area 454 where retro-reflective markers 24 are not present. As also shown in FIG. 28, the tracking system 10 may utilize multiple emitters 14 and detectors 16 to enable the control unit 18 to determine vector orientation of the vehicle 360 through the path 440 and also to provide range.

As illustrated in FIG. 29, in certain embodiments, layers of different retro-reflective markers 24 may be used. Specifically, FIG. 29 illustrates an embodiment of the guide path 440 in which the first plurality of markers 446 and the second plurality of markers 450 each include a first subset of retro-reflective markers 464 and a second subset of retro-reflective markers 466 that include different retro-reflective elements or retro-reflect different wavelengths. The first subset of retro-reflective markers 464 may and the second subset of retro-reflective markers 466 are positioned at different lateral positions relative to the guide path 440, and may be considered to serve as layers used to encourage motion of the ride vehicles 360 along the path 440 toward the predetermined location 444 in distinct ways, even though riders in the vehicles 360 may believe that the vehicles can travel outside of the path 440, as generally depicted by arrows 470.

For example, as shown with respect to the first ride vehicle 360A, the tracking system 10 may detect that the first ride vehicle 360A has occluded a portion of the first subset of retro-reflective markers 464, and may initiate a first response in the first vehicle 360A, such as sputtering of the first vehicle 360A, slowing of the first vehicle 360A, or some other haptic feedback that encourages the riders to direct the first vehicle 360A back into the path 440. In situations where the riders continue to direct vehicles 360 outside of the path 440, as illustrated with respect to the second ride vehicle 360B, the tracking system 10 may detect that the second ride vehicle 360B has occluded a portion of the second subset of retro-reflective markers 466, and may initiate a second response in the second vehicle 360B, that is more severe than the first response, such as stopping the second vehicle 360B, turning the second vehicle 360B, or some other control that moves the second vehicle 360B back into the path 440.

FIG. 30 depicts an embodiment of the guide path 440 where, rather than constraining the vehicle to a tapered area in which retro-reflective markers are not present as in FIGS. 27-29, the amusement attraction 364 instead uses the tracking system 10 to ensure that the vehicle 360 remains over a grid path 480 established by a particular pattern of retro-reflective markers 24. The retro-reflective markers 24, as shown, are formed into a tapered pattern such that to remain over at least some of the markers 24, the vehicle 360 must travel generally along a predetermined trajectory 482, and not along a trajectory 484 that causes the vehicle 360 to stop occluding at least some of the markers 24. To taper the path 440 in a similar manner as set forth above with respect to FIGS. 27 and 28, the grid path 480 tapers from the first width W1 and to the second width W2. The tracking system 10, accordingly, may monitor grid occlusion to determine vector magnitude, orientation, and sense information relating to the movement of the vehicle 360, and may make certain adjustments to these or other parameters (e.g., using the ride control system 382) if the tracking system 10 determines that the vehicle 360 has or is likely to move off of the grid path 480.

While only certain features of the present embodiments have been illustrated and described herein, many modifications and changes will occur to those skilled in the art. It is, therefore, to be understood that the appended claims are intended to cover all such modifications and changes as fall within the true spirit of the invention.

The invention claimed is:

1. An amusement park ride system, comprising:
a ride vehicle positioned on a ride path and configured to move along the ride path;
a plurality of retro-reflective markers positioned on the ride vehicle, along the ride path, or both;
an emission subsystem configured to emit electromagnetic radiation toward the plurality of retro-reflective markers;
a detection subsystem configured to detect a pattern of retro-reflection of the electromagnetic radiation from the plurality of retro-reflective markers while filtering electromagnetic radiation that is not retro-reflected; and
a control system communicatively coupled to the detection subsystem and comprising processing circuitry configured to:
monitor the pattern of retro-reflection of the electromagnetic radiation from the plurality of retro-reflective markers for changes; and
track movement of the ride vehicle in space and time based on changes in the pattern of retro-reflected electromagnetic radiation detected by the detection subsystem.

2. The system of claim 1, wherein the detection subsystem comprises at least one detection camera having at least one optical filter and an overhead view of the ride path, wherein the at least one optical filter is configured to filter electromagnetic radiation that is not retro-reflected while not filtering electromagnetic radiation that is retro-reflected by the plurality of retro-reflective markers.

3. The system of claim 1, wherein the ride path comprises a rail system, and the plurality of retro-reflective markers comprises retro-reflective markers positioned on the rail system wherein the processing circuitry of the control system is configured to monitor retro-reflected electromagnetic radiation from the retro-reflective markers on the track for a change from a first pattern of retro-reflected electromagnetic radiation to a second pattern of retro-reflected electromagnetic radiation.

4. The system of claim 3, wherein the processing circuitry of the control system is configured to:
correlate portions of the first pattern no longer present in the second pattern with a pattern of retro-reflective markers on the track occluded by the ride vehicle over time; and
determine a vector orientation of the movement of the ride vehicle on the track based on the pattern of retro-reflective markers on the track occluded by the ride vehicle.

5. The system of claim 4, wherein the processing circuitry is configured to maintain a predetermined relationship between the vector orientation and the track.

6. The system of claim 3, wherein the processing circuitry of the control system is configured to:
correlate portions of the first pattern no longer present in the second pattern with a pattern of retro-reflective markers on the track occluded by the ride vehicle;
compare the pattern of retro-reflective markers on the track occluded by the ride vehicle with a stored geometry of the ride vehicle; and
identify whether the stored geometry of the ride vehicle and the pattern of retro-reflective markers on the track occluded by the ride vehicle have a predetermined geometric relationship.

7. The system of claim 6, wherein the processing circuitry of the control system is configured to control at least one operating parameter of the ride vehicle to maintain the predetermined geometric relationship.

8. The system of claim 1, comprising an effect device positioned along the track and in communication with the control system, and wherein the processing circuitry of the control system is configured to determine, based on the tracked location and movement of the ride vehicle and a stored location of the effect device, a location of the ride vehicle relative to the effect device, and wherein the processing circuitry of the control system is configured to trigger the effect device when the location of the ride vehicle is within a predetermined distance to the effect device.

9. The system of claim 1, wherein:
the plurality of retro-reflective markers comprises a set of retro-reflective markers positioned on the path in a predetermined relationship relative to a direction of intended travel of the ride vehicle, the direction of intended travel being oriented toward a predetermined location along the path;
the ride vehicle comprises communication circuitry configured to communicate with the control system and a drive system configured to enable steering and velocity control of the ride vehicle; and
the processing circuitry of the control system is configured to maintain the ride vehicle generally along the direction of intended travel, over time, based on monitored retro-reflection from the retro-reflective markers on the path.

10. The system of claim 9, wherein the plurality of retro-reflective markers comprises a first set of retro-reflective markers positioned on a first side of the path and a second set of retro-reflective markers positioned on a second side of the path, the first and second sides of the path being at opposite lateral extents of the path relative to the direction of intended travel of the ride vehicle, and wherein the processing circuitry is configured to:
identify occlusion of retro-reflective markers of the first set of retro-reflective markers or second set of retro-reflective markers, or both, based on a change from a first pattern of retro-reflected electromagnetic radiation to a second pattern of retro-reflected electromagnetic radiation in which a portion of the first pattern is no longer present;
correlate the occlusion of the retro-reflective markers with the presence of the ride vehicle; and
adjust a movement vector of the ride vehicle to return the ride vehicle to a region of the path between the first and second sets of retro-reflective markers using the drive system of the ride vehicle.

11. The system of claim 10, wherein the first and second sets of retro-reflective markers converge toward one another such that the region of the path between the first and second sets of retro-reflective markers tapers toward the predetermined location.

12. The system of claim 9, wherein the plurality of retro-reflective markers comprises a set of retro-reflective markers positioned along the direction of intended travel of the ride vehicle and in a tapered geometry, and wherein the tapered geometry of the set of retro-reflective markers tapers toward the predetermined location.

13. The system of claim 1, wherein the processing circuitry is configured to:
    identify occlusion of retro-reflective markers of the set of retro-reflective markers based on a change from a first pattern of retro-reflected electromagnetic radiation to a second pattern of retro-reflected electromagnetic radiation in which a portion of the first pattern is no longer present;
    correlate the occlusion of the retro-reflective markers with the presence of the ride vehicle; and
    maintain occlusion of at least a portion of the set of retro-reflective markers by the ride vehicle using the drive system of the ride vehicle to maintain a vector orientation of the movement of the ride vehicle generally along the direction of intended travel.

14. The system of claim 1, wherein the plurality of retro-reflective markers comprises at least three retro-reflective markers positioned on different sides of the ride vehicle, and wherein the detection subsystem comprises at least two detector cameras configured to detect retro-reflected electromagnetic radiation from the at least three retro-reflective markers while filtering out electromagnetic radiation that is not retro-reflected, and wherein the processing circuitry of the control system is configured to track the ride vehicle in space and time in three spatial dimensions based on the retro-reflected electromagnetic radiation from the at least three retro-reflective markers.

15. The system of claim 14, wherein the processing circuitry of the control system is configured to track the ride vehicle in space and time in the three spatial dimensions relative to the path.

16. A method of tracking and controlling an amusement park ride vehicle, comprising:
    flooding a ride vehicle path of an amusement park attraction with electromagnetic radiation using an emission subsystem comprising one or more emitters;
    detecting wavelengths of electromagnetic radiation retro-reflected from within the ride vehicle path while filtering wavelengths of electromagnetic radiation not retro-reflected from within the guest attraction area using a detection subsystem having one or more optical filters; and
    tracking, in space and time, a movement and a location of a ride vehicle on the ride vehicle path based on changes in the retro-reflected electromagnetic radiation with a control system communicatively coupled to the detection subsystem.

17. The method of claim 16, comprising controlling at least one operating parameter of the ride vehicle based on the tracked movement and location of the ride vehicle on the ride vehicle path using the control system, wherein tracking, in space and time, the movement and the location of the ride vehicle on the ride vehicle path comprises:
    tracking patterns of retro-reflected electromagnetic radiation produced from retro-reflection by the retro-reflective markers positioned on the ride vehicle path;
    identifying changes in the patterns of retro-reflected electromagnetic radiation in which a first pattern of retro-reflected electromagnetic radiation changes to a second pattern of retro-reflected electromagnetic radiation in which portions of the first pattern of retro-reflected electromagnetic radiation are no longer present; and
    correlating the portions of the first pattern of retro-reflected electromagnetic radiation no longer present in the second pattern with occlusion of retro-reflective markers positioned on the ride vehicle path by the ride vehicle; and
    wherein controlling at least one operating parameter of the ride vehicle based on the tracked movement and location of the ride vehicle on the ride vehicle path using the control system comprises controlling the at least one operating parameter to maintain a predetermined degree of occlusion of the retro-reflective markers on the path by the ride vehicle.

18. The method of claim 16, comprising:
    retro-reflecting the electromagnetic radiation using at least three retro-reflective markers positioned on different sides of the ride vehicle;
    detecting, from different perspectives, retro-reflected electromagnetic radiation from the at least three retro-reflective markers while filtering out electromagnetic radiation that is not retro-reflected using at least two detector cameras of the detection subsystem; and
    tracking the ride vehicle in space and time in three spatial dimensions based on the retro-reflected electromagnetic radiation from the at least three retro-reflective markers using the control system.

19. The method of claim 16, comprising triggering an effect device when the tracked location and movement of the ride vehicle indicates that the ride vehicle is within a predetermined distance of the effect device.

* * * * *